(12) United States Patent
Sturrock et al.

(10) Patent No.: US 10,277,495 B2
(45) Date of Patent: *Apr. 30, 2019

(54) METHOD AND SYSTEM FOR DATA TRANSMISSION

(71) Applicant: Open Text SA ULC, Halifax (CA)

(72) Inventors: Oliver Sturrock, London (GB); Timothy John Wentford, Pinner (GB)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,786

(22) Filed: Dec. 5, 2017

(65) Prior Publication Data

US 2018/0097717 A1    Apr. 5, 2018

Related U.S. Application Data

(63) Continuation of application No. 13/860,364, filed on Apr. 10, 2013, now Pat. No. 9,887,900, which is a
(Continued)

(30) Foreign Application Priority Data

Aug. 18, 2004  (GB) ................................. 0418374.5

(51) Int. Cl.
*G06F 15/173*      (2006.01)
*H04L 12/26*       (2006.01)
(Continued)

(52) U.S. Cl.
CPC ............ *H04L 43/18* (2013.01); *H04L 1/0002* (2013.01); *H04L 41/0896* (2013.01);
(Continued)

(58) Field of Classification Search
CPC ......... H04L 47/10; H04L 47/11; H04L 47/12; H04L 47/14; H04L 47/25; H04L 47/31;
(Continued)

(56) References Cited

U.S. PATENT DOCUMENTS

| 4,569,042 A | 2/1986 | Larson |
| 5,819,048 A | 10/1998 | Okazaki et al. |

(Continued)

FOREIGN PATENT DOCUMENTS

| EP | 0522211 | 6/1991 |
| EP | 1280297 | 1/2003 |

(Continued)

OTHER PUBLICATIONS

European Search Report for Great Britain Application No. GB0418374. 5, dated Jan. 7, 2005, 1 pg.
(Continued)

*Primary Examiner* — Frantz B Jean
(74) *Attorney, Agent, or Firm* — Sprinkle IP Law Group

(57) ABSTRACT

Embodiments as disclosed provided methods or systems for sending data over a network. Specifically, in certain embodiments, data is received and a datagram comprising at least a portion of the data can be created and sent to a terminal. Control data can be received from the terminal and the sending of the data to the terminal adjusted based on the received control data. In certain embodiments both the datagram and the control data may be sent over an unreliable protocol. Thus, embodiments as disclosed may provide an increased level of reliability and adaptability to differing network conditions in conjunction with the use of an unreliable protocol.

21 Claims, 44 Drawing Sheets

Related U.S. Application Data continuation of application No. 10/929,029, filed on Aug. 27, 2004, now Pat. No. 9,210,064.

(51) Int. Cl.

| | | |
|---|---|---|
| *H04L 12/24* | (2006.01) | |
| *H04L 12/801* | (2013.01) | |
| *H04L 12/853* | (2013.01) | |
| *H04L 12/825* | (2013.01) | |
| *H04L 12/841* | (2013.01) | |
| *H04L 12/833* | (2013.01) | |
| *H04W 24/00* | (2009.01) | |
| *H04L 1/00* | (2006.01) | |

(52) U.S. Cl.
CPC .......... *H04L 43/0852* (2013.01); *H04L 43/10* (2013.01); *H04L 47/10* (2013.01); *H04L 47/11* (2013.01); *H04L 47/12* (2013.01); *H04L 47/14* (2013.01); *H04L 47/2416* (2013.01); *H04L 47/25* (2013.01); *H04L 47/283* (2013.01); *H04L 47/31* (2013.01); *H04W 24/00* (2013.01)

(58) Field of Classification Search
CPC ... H04L 47/283; H04L 47/2416; H04L 43/10; H04L 43/18; H04L 43/0852; H04L 41/096; H04L 1/0002; H04W 24/00
USPC .......................................... 709/224, 217, 219
See application file for complete search history.

(56) References Cited

U.S. PATENT DOCUMENTS

| | | | |
|---|---|---|---|
| 5,987,011 A | 11/1999 | Toh | |
| 6,012,096 A | 1/2000 | Link et al. | |
| 6,029,205 A | 2/2000 | Alferness et al. | |
| 6,061,722 A | 5/2000 | Lipa et al. | |
| 6,091,709 A | 7/2000 | Harrison et al. | |
| 6,246,684 B1 | 6/2001 | Chapman et al. | |
| 6,321,264 B1 | 11/2001 | Fletcher et al. | |
| 6,363,056 B1 | 3/2002 | Beigi et al. | |
| 6,535,553 B1 | 3/2003 | Limberg et al. | |
| 6,654,463 B1 | 11/2003 | Leonidov et al. | |
| 6,657,954 B1 | 12/2003 | Bird et al. | |
| 6,662,223 B1 | 12/2003 | Zhang et al. | |
| 6,687,247 B1 | 2/2004 | Wilford et al. | |
| 6,721,316 B1 | 4/2004 | Epps et al. | |
| 6,820,133 B1 | 11/2004 | Grove et al. | |
| 6,839,767 B1 | 1/2005 | Davies et al. | |
| 6,868,094 B1 | 3/2005 | Bordonaro et al. | |
| 6,904,286 B1 | 6/2005 | Dantu | |
| 6,993,578 B1 | 1/2006 | Dmitroca | |
| 7,020,719 B1 | 3/2006 | Grove et al. | |
| 7,088,706 B2 | 8/2006 | Zhang et al. | |
| 7,151,764 B1 | 12/2006 | Heinonen et al. | |
| 7,239,630 B1 | 7/2007 | Lim et al. | |
| 7,243,163 B1 | 7/2007 | Friend et al. | |
| 7,260,640 B1 | 8/2007 | Kramer et al. | |
| 7,287,097 B1 | 10/2007 | Friend et al. | |
| 7,346,678 B1 | 3/2008 | Zhu et al. | |
| 7,360,075 B2 | 4/2008 | VanHeyningen et al. | |
| 7,415,652 B1 | 8/2008 | Szeremi | |
| 7,447,775 B1 | 11/2008 | Zhu et al. | |
| 7,551,623 B1 | 6/2009 | Feroz et al. | |
| 9,037,734 B2 | 5/2015 | Kim et al. | |
| 9,135,209 B2 | 9/2015 | Park | |
| 9,210,064 B2 | 12/2015 | Sturrock et al. | |
| 9,386,127 B2 | 7/2016 | Dajani et al. | |
| 9,614,937 B2 | 4/2017 | Dajani et al. | |
| 9,621,473 B2 | 4/2017 | Copsey et al. | |
| 9,800,695 B2 | 10/2017 | Dajani et al. | |
| 9,887,899 B2 | 2/2018 | Sturrock et al. | |
| 9,887,900 B2 | 2/2018 | Sturrock et al. | |
| 10,154,120 B2 | 12/2018 | Dajani et al. | |
| 2001/0012288 A1 | 8/2001 | Yu | |
| 2002/0075895 A1 | 6/2002 | Yamaguchi et al. | |
| 2002/0112152 A1 | 8/2002 | VanHeyningen et al. | |
| 2002/0120727 A1 | 8/2002 | Curley et al. | |
| 2002/0145981 A1 | 10/2002 | Klinker et al. | |
| 2002/0177448 A1 | 11/2002 | Moran et al. | |
| 2003/0083870 A1 | 5/2003 | Lee et al. | |
| 2003/0112966 A1 | 6/2003 | Halder et al. | |
| 2003/0115321 A1 | 6/2003 | Edmison et al. | |
| 2003/0131128 A1* | 7/2003 | Stanton | H04L 12/46 709/238 |
| 2003/0156550 A1* | 8/2003 | Burmeister | H04L 1/16 370/252 |
| 2003/0235244 A1 | 12/2003 | Pessoa et al. | |
| 2003/0235294 A1 | 12/2003 | Dyba et al. | |
| 2003/0235312 A1 | 12/2003 | Pessoa et al. | |
| 2004/0039938 A1 | 2/2004 | Katz et al. | |
| 2004/0052259 A1 | 3/2004 | Garcia et al. | |
| 2004/0063454 A1 | 4/2004 | Sasaki | |
| 2004/0145516 A1 | 7/2004 | Large et al. | |
| 2004/0160938 A1 | 8/2004 | Lee | |
| 2004/0162051 A1 | 8/2004 | Elsey et al. | |
| 2004/0184464 A1 | 9/2004 | Holden | |
| 2004/0184470 A1 | 9/2004 | Holden | |
| 2004/0199659 A1 | 10/2004 | Ishikawa et al. | |
| 2004/0203820 A1 | 10/2004 | Billhartz | |
| 2005/0005020 A1 | 1/2005 | Rey et al. | |
| 2005/0018703 A1 | 1/2005 | Blasco Claret et al. | |
| 2005/0021830 A1 | 1/2005 | Urzaiz et al. | |
| 2005/0063307 A1 | 3/2005 | Samuels et al. | |
| 2005/0071423 A1 | 3/2005 | Rajaniemi | |
| 2005/0101306 A1 | 5/2005 | Zabawskyj et al. | |
| 2005/0123003 A1 | 6/2005 | Bordonaro et al. | |
| 2005/0148314 A1 | 7/2005 | Taglienti et al. | |
| 2006/0007882 A1 | 1/2006 | Zeng et al. | |
| 2006/0104288 A1 | 5/2006 | Yim et al. | |
| 2007/0081498 A1 | 4/2007 | Niwano | |
| 2007/0091498 A1 | 4/2007 | Fujimori | |
| 2007/0133418 A1 | 6/2007 | Agarwal | |
| 2008/0101598 A1 | 5/2008 | Dillaway | |
| 2008/0104598 A1 | 5/2008 | Chang | |
| 2008/0144660 A1 | 6/2008 | Godlewski | |
| 2009/0028168 A1 | 1/2009 | Somekh et al. | |
| 2009/0049189 A1 | 2/2009 | Zhu et al. | |
| 2009/0241005 A1 | 9/2009 | Hong et al. | |
| 2010/0202451 A1 | 8/2010 | Glover et al. | |
| 2011/0069616 A1* | 3/2011 | Revels | H04L 47/10 370/236 |
| 2011/0113169 A1* | 5/2011 | Maeng | H04L 12/12 710/106 |
| 2011/0267952 A1 | 11/2011 | Ko et al. | |
| 2012/0324046 A1 | 12/2012 | Park | |
| 2013/0246565 A1 | 9/2013 | Froelicher et al. | |
| 2014/0201388 A1 | 7/2014 | Dajani et al. | |
| 2017/0163542 A1 | 6/2017 | Dajani et al. | |
| 2017/0163714 A1 | 6/2017 | Copsey et al. | |
| 2018/0027099 A1 | 1/2018 | Dajani et al. | |

FOREIGN PATENT DOCUMENTS

| | | |
|---|---|---|
| EP | 1480483 | 11/2004 |
| GB | 2394628 | 4/2004 |
| WO | WO0025487 | 5/2000 |
| WO | WO03053002 | 6/2003 |

OTHER PUBLICATIONS

Rejaie et al., RAP: An End-to end Rate-based Congestion Control Mechanism for Realtime Streams in the Internet, University of Southern California, Marina Del Rey, CA, Jul. 20, 1998, 27 pgs.

European Search Report for Great Britain Application No. GB05255074.6, dated Feb. 28, 2006, 11 pgs.

Office Action for U.S. Appl. No. 10/929,029, dated Apr. 21, 2008, 9 pgs.

Office Action for U.S. Appl. No. 10/929,029, dated Nov. 19, 2008, 10 pgs.

Office Action for U.S. Appl. No. 10/929,029, dated Jun. 23, 2009, 9 pgs.

(56) References Cited

OTHER PUBLICATIONS

Office Action for U.S. Appl. No. 10/929,029, dated Feb. 2, 2010, 9 pgs.
Office Action for U.S. Appl. No. 10/929,029, dated Mar. 3, 2011, 9 pgs.
Office Action for U.S. Appl. No. 10/929,029, dated Aug. 30, 2011, 10 pgs.
Office Action for U.S. Appl. No. 10/929,029, dated Apr. 11, 2013, 10 pgs.
Office Action for U.S. Appl. No. 10/929,029, dated Dec. 2, 2013, 12 pgs.
Office Action for U.S. Appl. No. 13/610,573, dated May 2, 2014, 35 pgs.
Padhye et al., A Model Based TCP-Friendly Rate Control Protocol, Proceeding of NOSSDAV '99, Jun. 23, 1999, 15 pgs.
Office Action for U.S. Appl. No. 10/929,029, dated Jun. 4, 2014, 13 pgs.
Office Action for U.S. Appl. No. 13/610,573, dated Oct. 9, 2014, 38 pgs.
Xiao et al., A TCP-Friendly Congestion Control Mechanism Combined with the Routers, Proceedings of the Sixth Int'l Conf. on Machine Learning and Cybernetics, Aug. 19-22, 2007, IEEE, pp. 3223-3228.
Office Action for U.S. Appl. No. 13/737,793, dated May 5, 2015, 10 pgs.
Office Action for U.S. Appl. No. 13/860,364, dated May 6, 2015, 9 pgs.
Office Action for U.S. Appl. No. 13/610,573, dated Apr. 27, 2015, 30 pgs.
Office Action for U.S. Appl. No. 13/863,635, dated Jul. 14, 2015, 26 pgs.
Office Action for U.S. Appl. No. 13/610,573, dated Sep. 10, 2015, 30 pgs.
Office Action for U.S. Appl. No. 13/863,635, dated Nov. 5, 2015, 34 pgs.
Office Action for U.S. Appl. No. 13/737,793, dated Nov. 18, 2015, 13 pgs.
Office Action for U.S. Appl. No. 13/860,364, dated Nov. 18, 2015, 13 pgs.
Office Action for U.S. Appl. No. 14/070,157, dated Jan. 6, 2016, 14 pgs.
Office Action for U.S. Appl. No. 13/863,635, dated May 25, 2016, 34 pgs.
Office Action for U.S. Appl. No. 14/070,157, dated May 31, 2016, 17 pgs.
Office Action for U.S. Appl. No. 13/737,793, dated Sep. 27, 2016, 14 pgs.
Office Action for U.S. Appl. No. 13/860,364, dated Sep. 27, 2016, 13 pgs.
Office Action for U.S. Appl. No. 15/133,886, dated Oct. 27, 2016, 23 pgs.
Office Action for U.S. Appl. No. 13/737,793, dated May 5, 2017, 14 pgs.
Office Action for U.S. Appl. No. 13/860,364, dated May 5, 2017, 13 pgs.
Office Action for U.S. Appl. No. 15/442,427, dated Dec. 7, 2017, 28 pgs.
Office Action for U.S. Appl. No. 15/442,372, dated Feb. 14, 2018, 32 pgs.
Office Action for U.S. Appl. No. 15/442,427, dated Jun. 26, 2018, 11 pgs.
Notice of Allowance for U.S. Appl. No. 15/442,372, dated Sep. 20, 2018, 7 pgs.

\* cited by examiner

METHOD AND SYSTEM FOR DATA TRANSMISSION

CROSS-REFERENCE TO RELATED APPLICATIONS

This application is a continuation of, and claims a benefit of priority under 35 U.S.C. 120 of the filing date of, U.S. patent application Ser. No. 13/860,364, filed on Apr. 10, 2013, now issued as U.S. Pat. No. 9,877,900, by inventors Oliver Sturrock and Timothy John Wentford, entitled "Method and System for Data Transmission", which is a continuation of, and claims a benefit of priority under 35 U.S.C. 120 of the filing date of, U.S. patent application Ser. No. 10/929,029, filed on Aug. 27, 2004, now issued as U.S. Pat. No. 9,210,064, by inventors Oliver Sturrock and Timothy John Wentford, entitled "Measuring Latency Over a Network", which claims priority to Great Britain Application No. 0418374.5, filed Aug. 18, 2004, by inventors Oliver Sturrock and Timothy John Wentford, the entire contents of which are hereby expressly incorporated by reference for all purposes.

FIELD OF THE INVENTION

The invention relates to measuring the latency of packets transmitted over a network.

DESCRIPTION OF THE RELATED ART

Protocols are known for transmitting data over networks, including the Internet. However, in such protocols it is difficult to accurately measure latency (the time it takes to transmit from one computer to another over the network). Clock synchronisation is possible when using a small number of computers, but not when transmitting to a very large number. An alternative method is measuring how long it takes to receive an acknowledgement of a packet. However, this time includes the time taken to process a packet and produce an acknowledgement, which distorts the measurement, particularly when the production of an acknowledgement is delayed for some reason.

BRIEF SUMMARY OF THE INVENTION

Embodiments as disclosed provide methods or systems for sending data over a network. Specifically, in certain embodiments, data is received and a datagram comprising at least a portion of the data can be created and sent to a terminal. Control data can be received from the terminal and the sending of the data to the terminal adjusted based on the received control data. In certain embodiments, both the datagram and the control data may be sent over an unreliable protocol. Thus, embodiments as disclosed may provide an increased level of reliability and adaptability to differing network conditions in conjunction with the use of an unreliable protocol.

WRITTEN DESCRIPTION OF THE BEST MODE FOR CARRYING OUT THE INVENTION

FIG. 1

Figure 1:
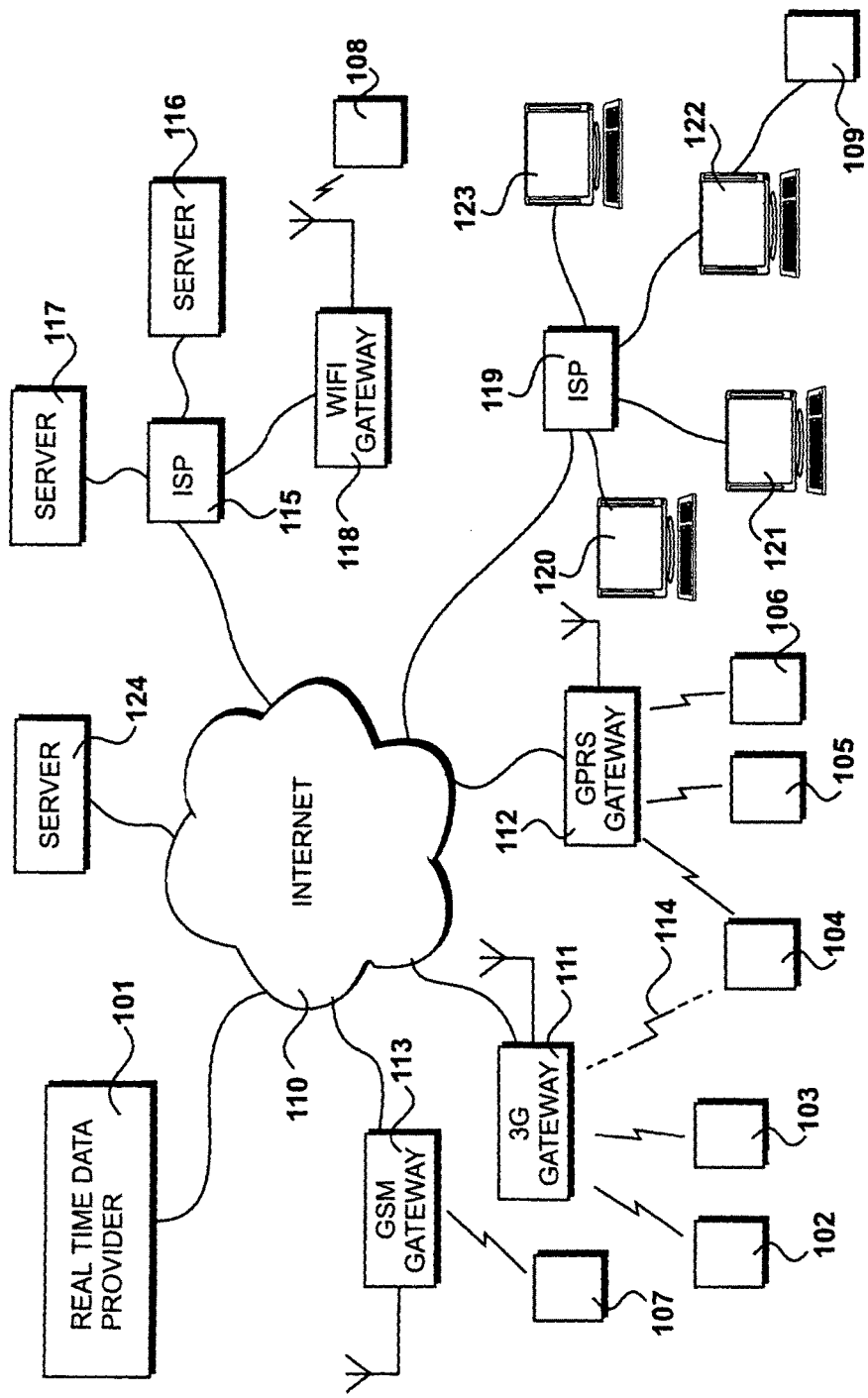
FIG. 1 illustrates a networked environment.

FIG. 1 illustrates a networked environment in which the invention may be used. A Real Time Data Provider 101 provides data to a number of terminals 102, 103, 104, 105, 106, 107, 108 and 109 via the Internet 110. The data can be separated into at least two types. The first type is streamed data, which comprises updates of certain information that a user of a terminal has indicated that he is interested in. This could be, for example, financial data such as stock prices or exchange rates, sports data such as the latest football scores, news items and so on. A second type of data is transactional data. This comprises any data forming a transaction, which could be a financial transaction such as placing a bid to trade stocks or placing a bet on a sports fixture. Transactional data can also include logging-on or user profile activities.

The data is provided over a variety of networks, including radio networks such as mobile telephony networks or wireless networks. A Third Generation (3G) mobile telephony network, connected to the Internet 110, includes a gateway 111 which provides connectivity to a network of base stations. Terminals 102 and 103 are each connected to one of these base stations. A General Packet Radio Service (GPRS) gateway 112 is connected to the Internet 110 and provides connection to a network of GPRS base stations. Terminals 104 to 106 are each connected to one of these stations. A GSM gateway 113 is connected to the Internet 110, providing connectivity for terminal 107. A terminal could, when possible, switch between connections as shown by dotted line 114.

Internet Service Provider (ISP) 115 is connected to the Internet 110 and provides internet access for server 116, server 117 and a Wireless Network or Wireless Fidelity (WiFi) gateway 118. Terminal 108 has a link to gateway 118. ISP 119 is connected to the Internet 110 and provides internet access for computer systems 120, 121, 122 and 123 via wire links. Terminal 109 is connected by an ethernet wire link, possibly using a docking cradle, to computer system 122. Alternatively, server 124 is connected directly to the Internet 110.

Thus there is a number of ways in which a terminal may link to the Internet 110 in order to receive data from RTDP 101. There are, of course, other methods of connection and the rate of technological advance means that in the future there will be further methods. This description should not be construed as limiting connection methods to those described here. However, the number of methods makes the task of providing real time data difficult. While it is, for example, relatively easy to provide data quickly to terminals 108 and 109, terminals 102 to 107 use relatively low bandwidth, high latency and high variability connections over which it is very difficult to provide real time data.

Mobile telephony systems such as those provided by gateways 111 to 113 are used to provide data. For example, mobile telephone users are able to browse the Internet 110. However, the rate of data supply can be extremely slow. This is merely inconvenient when browsing. However, if data on the basis of which decisions are to be made is required, for example financial data, it must be provided in a timely fashion. This means that the data should arrive at the terminal quickly, and preferably it should be possible to indicate to a user how up-to-date the information is.

FIG. 2

Figure 2:
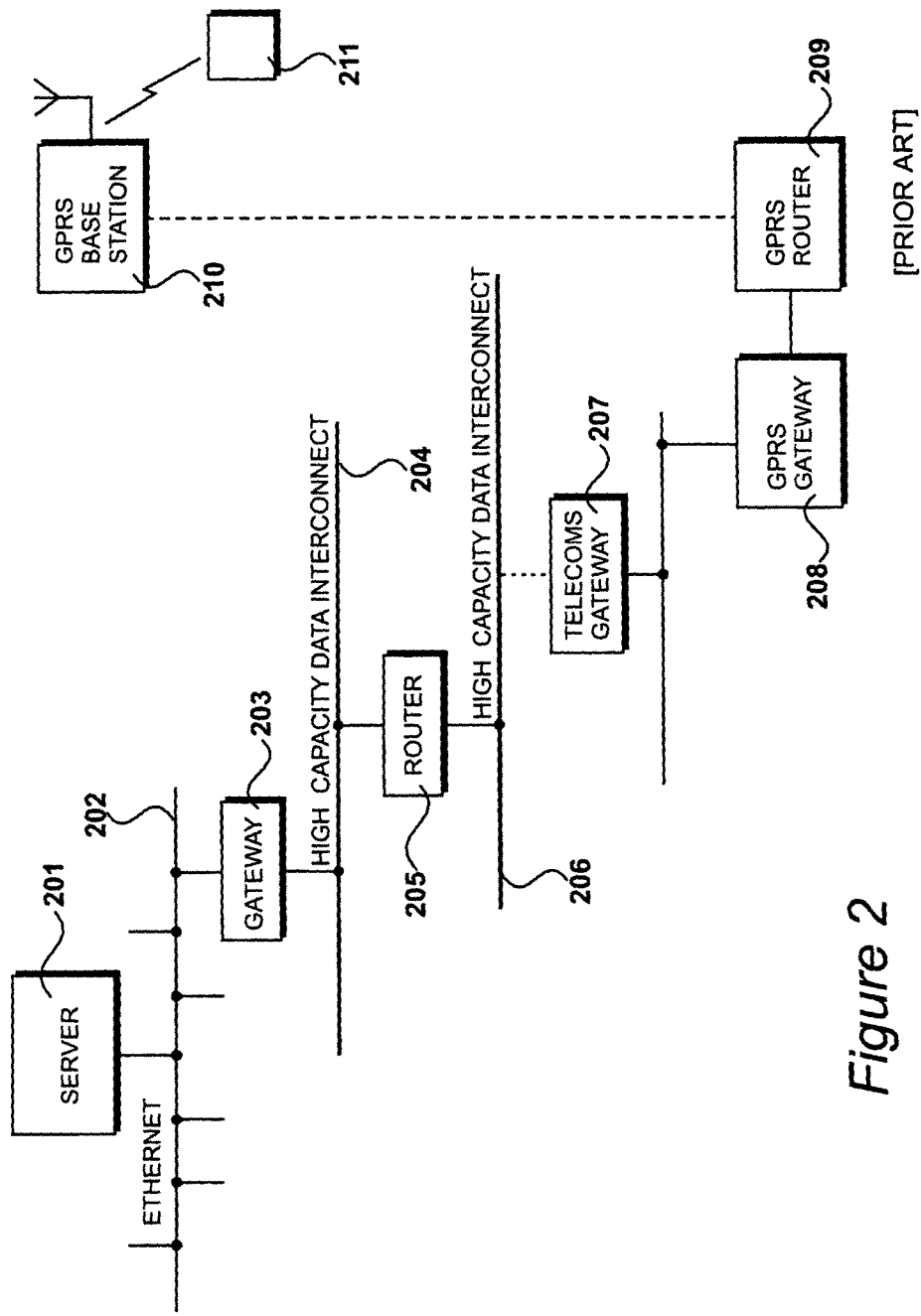
FIG. 2 illustrates a prior art method of supplying data from a server to a terminal over a telephony network.

FIG. 2 illustrates a prior art method of supplying data from a server to a terminal over a telephony network. A server 201 on an ethernet network 202 supplies data packets to a first gateway 203, where the data packets are placed on a high capacity data interconnect 204. A router 205 receives these packets and supplies them to another network 206. Eventually the packets arrive at a telecoms gateway 207, where a telecoms provider can select which of several wireless networks to supply the packets to. A GPRS gateway 208 then supplies the packets to a GPRS router 209, which routes the packets to the base station 210 to which the terminal 211 is currently connected.

This journey across several networks is facilitated by the Internet Protocol (IP) which provides a header at the start of every packet defining the destination IP address. Other information is also provided in the IP header, such as the size of the packet, but its primary function is to define an address that gateways and routers can read, and decide where the packet should be sent next. Packets are sent separately, and may end up taking different routes. It is therefore possible for packets to arrive out of order.

In order to maintain a dialogue between server 201 and terminal 211, an additional protocol must be used. Most commonly, this protocol is the Transport Control Protocol (TCP). This enables a two-way link to be set up between two systems on the Internet 110. Messages are sent, and TCP provides functionality such as acknowledging and resending data, if necessary, and reordering packets if they arrive in the wrong order. TCP was designed to be used on networks that have a high data capacity and low latency, but can suffer from congestion. However mobile telephony networks have different characteristics and TCP handles certain of these characteristics in an ineffective way.

In the communication chain shown in FIG. 2, TCP (and other protocols) achieve effective communication across high-capacity parts of the Internet 110. However, the final link to terminal 211, over a low-capacity wireless connection, is extremely vulnerable. TCP fails to address these vulnerabilities effectively, since it was not designed for that purpose.

FIG. 3

Figure 3:
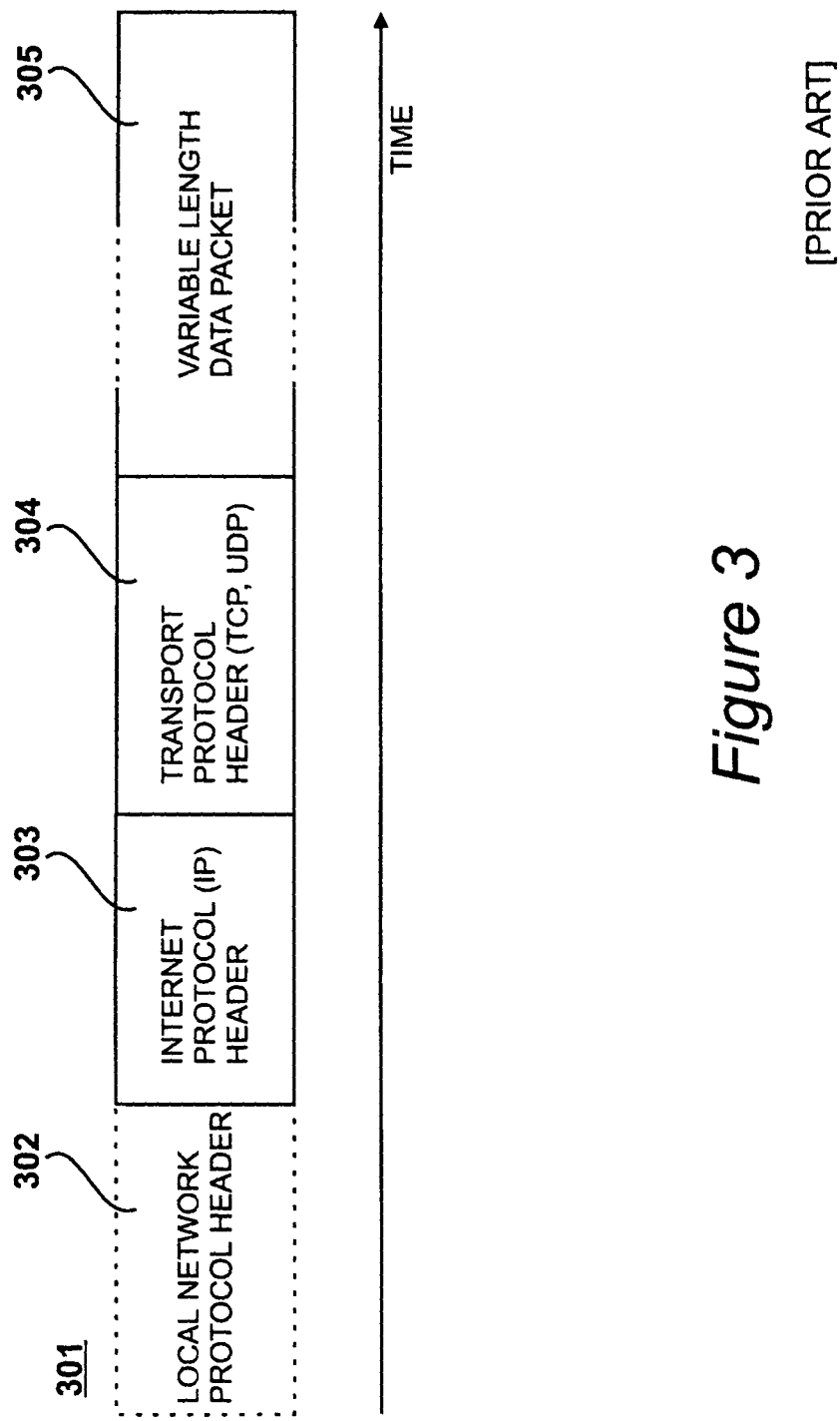
FIG. 3 shows a prior art graph of data against time.

FIG. 3 shows a prior art graph of data against time for packets that are sent over the Internet 110. Graph 301 illustrates the headers of a packet sent using a transport protocol such as TCP. The Internet 110 comprises many interconnected networks. As a packet is sent over each individual network, a local network protocol header 302 is attached to it, generally to transfer it from one part of the network to another. At the point of exit from the network, the network gateway will strip the local network protocol header 302, leaving the IP header 303. From this the next destination on a neighbouring network is determined (the router uses various algorithms to work out the next intermediate destination). The local network protocol header is transient, and changes as the packet traverses the Internet 110.

The IP header 303 defines the destination IP address for the packet. After this, there is the transport protocol header 304, which is typically used by the communication client and server to form a connection over which communications can take place. Finally the remainder of the data packet 305 is the data payload. Some packets do not have data, and simply consist of signalling in the transport header 304, for example an acknowledgement packet that tells the recipient that some data has been successfully received. Typically, though, acknowledgements are combined with data to reduce traffic.

An example of a transport protocol is TCP, as described with reference to FIG. 2. TCP forms reliable connections and is often combined with higher protocols such as the File Transfer Protocol (FTP) or Hypertext Transport Protocol (HTTP).

FIG. 4

Figure 4:
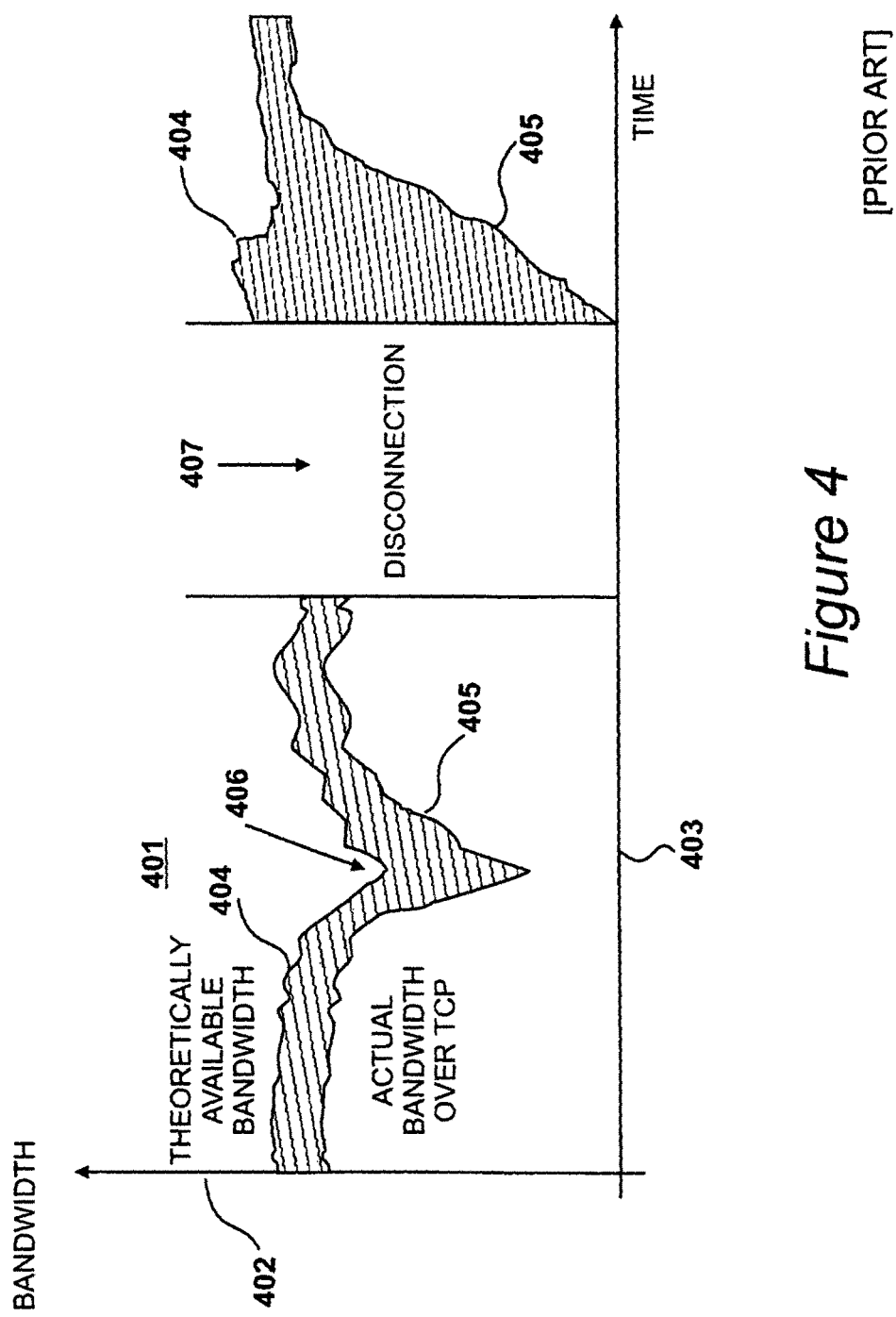
FIG. 4 illustrates a typical performance of transport control protocol (TCP) over a mobile telephony network.

FIG. 4 (prior art) illustrates a typical performance of TCP over a mobile telephony network. Graph 401 plots bandwidth 402 against time 403. The upper line 404 shows theoretically available bandwidth over the network, while the lower line 405 shows the use made of the bandwidth using TCP.

TCP's performance is always less than 100%. When there are significant changes in network availability, TCP compensates inefficiently, because its underlying mechanisms make assumptions about the network that are invalid for a mobile connection. When bandwidth falls off, for example at point 406, the amount of data sent using TCP falls much faster, because data packets that have been lost need to be resent, resulting in a downward spiral of lost bandwidth. TCP cannot anticipate or compensate fast enough to avoid such inefficiencies.

When a disconnection occurs, such as at point 407, TCP takes a long time to re-establish data flow when the link is reconnected. When using a terminal on a mobile telephony network, such disconnections are frequent, for example when the user goes through a tunnel.

TCP presents another problem to real time data provision. When a disconnection takes place (as at point 407), a wireless service provider will often perform a service known as "IP spoofing". This involves a proxy server being used to maintain the TCP connection with a server, even though the wireless connection is broken. When the connection is re-established data can be sent from where it is cached on the proxy server to the terminal. The telecoms provider does this so that a data transfer can continue, rather than being restarted every time the connection is lost.

This operation is helpful for internet browsing and downloading of large files to mobile telephones. However, it presents two problems to RTDP 101. The first is that if the telecoms provider caches a large amount of streamed data and sends it all to a terminal upon reconnection this can overload the connection. This is especially inappropriate given that much of it may be out of date. The second problem is that the RTDP 101 might send transactional data to, for example, terminal 102 while it is disconnected from 3G gateway 110. The 3G network, spoofing terminal 102, will acknowledge this data. However, if terminal 102 does not reconnect, which might happen for one of many reasons, then the cached transactional data will never be forwarded. This results in RTDP 101 wrongly concluding that terminal 102 has received the data.

A further problem with TCP is that it is a connection-oriented protocol. When a client moves between wireless base stations its IP address can change, resulting in a requirement to set up a new TCP connection. This can interfere with communications. In particular, a secure transaction could be terminated. This also prevents a terminal from using a higher-bandwidth, lower latency network that may become available without terminating a connection, for example when a terminal connected to GPRS gateway 112 comes within range of 3G gateway 111, or moves into the radius of a WiFi gateway 118.

FIG. 5

Figure 5:
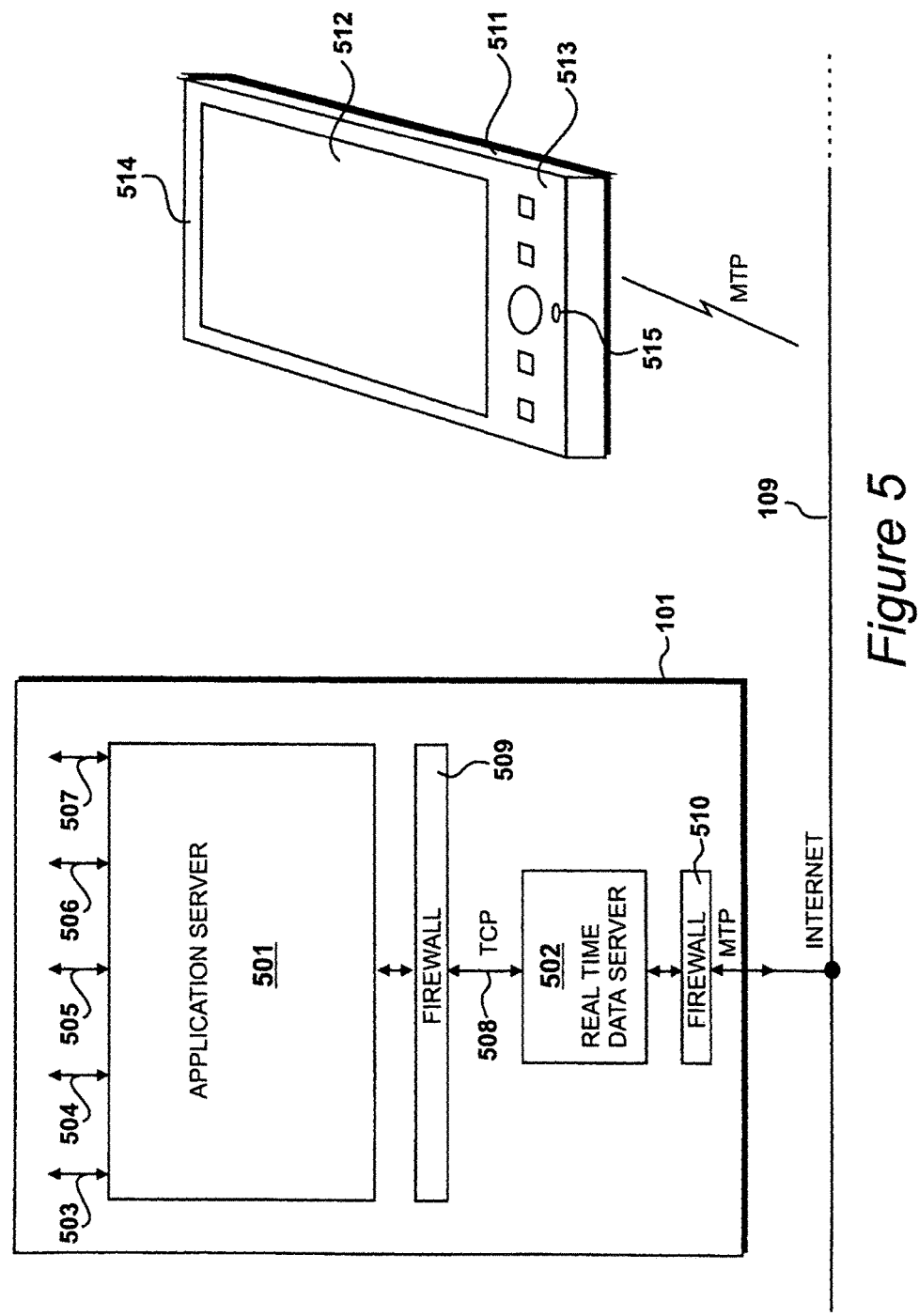
FIG. 5 shows a real time data provider shown in FIG. 1.

FIG. 5 shows RTDP 101 which comprises an application server 501 and a real time data server 502. The real time data server communicates with a large number (potentially thousands) of terminals. It facilitates communications between the application server 501 and the terminals. Terminals can have a variety of types of connection, including high speed WiFi or wire. The real time data server 502 manages communications with all these types of connections. A terminal need not be mobile to take advantage of the system.

The application server 501 receives data from a number of data feeds. These are illustrated by two-way arrows, as data is provided to application server 501 but the server may also send information back, for example details of a financial transaction or an information request. Financial transaction services data feed 503 provides communications for making stock-market-based transactions. Sports transaction services data feed 504 provides communications for making sports-based transactions. Financial data feed 505 provides real time updates of, for example, share prices and exchange rates, while sports data feed 506 provides real time updates of sports scores. News data feed 507 provides news headlines and stories. It will be appreciated that the data feeds illustrated in FIG. 5 are representative of the type of data that a Real Time Data Server might provide to clients. Other data types and feeds are contemplated and included in this description.

The application server 501 communicates with the real time data server 502 over an outbound-initiated TCP-based link 508. The connection between the two systems is made via a high-speed Gigabit Ethernet connection. In other embodiments, the two servers could use the same processing system. However, this provides less security.

The application server 501 is protected by a first firewall 509, so as to resist any security vulnerabilities that may exist in the real time data server 502, which has its own firewall 510. The real time data server 502 takes data from the application server 501 and supplies it to terminals via the Internet 110 using a custom protocol called the Mobile Transport Protocol (MTP). This protocol addresses the needs of real time data services for mobile client terminals.

In the embodiment described herein the terminals are Personal Digital Assistants (PDAs) such as PDA 511. These are small portable devices including a display screen 512, control buttons 513, a speaker 514 and a microphone 515. The display 512 may be touch-sensitive, allowing the PDA 511 to be controlled using a stylus on the screen instead of buttons 513. A typical PDA is supplied with software providing the functionality of, inter alia, a mobile telephone, word processing and other office-related capabilities, a calendar and address book, email and internet access, games, and so on. The skilled reader will appreciate that the PDAs illustrated in this document are not the only terminals that can be used. For example, a mobile telephone with enough storage and memory could be used, or other devices which can communicate over mobile telephony networks.

PDA 511 may communicate with the real time data server 502 to obtain access to data provided by any of data feeds 503 to 507, or to obtain software downloads for installation. The application server 501 facilitates several different types of service. In particular, the efficient provision of multiple types of data having different characteristics is enabled using the custom protocol MTP.

The two main types of data are transactional data and streamed data. For transactional data, a two-way communication between the PDA 511 and the real time data server 502 facilitates the making of a secure transaction. Data delivery must be guaranteed even if a connection is broken. Such data may be several kilobytes for each message, requiring multiple datagrams to be transmitted before a message is complete. These packets, or datagrams, must be reassembled in the right order before use.

Streamed data comprises updates, for example of financial or sporting data. These may be provided at a fixed regular rate, or may be provided at an irregular rate as the data becomes available. Each update or message is contained in a single datagram (although a datagram may contain more than one message). For this reason it is not necessary for streamed datagrams to be ordered at the terminal.

Because of these different data types, each of which has its own issues to be addressed, MTP provides two types of data communication, transactional communication and streamed communication. It facilitates communication of both types over the same communication link. The data types are differentiated, such that the bandwidth utilisation is maximised without compromising transactional communications. It specifically addresses the need for bandwidth efficiency, latency measurement, multiple data types and continuous updates over a low bandwidth, high latency, high variability wireless mobile link. Also, because by its nature a mobile terminal such as a PDA has low storage and memory capabilities, it minimises the computational requirements of the terminal.

FIG. 6

Figure 6:
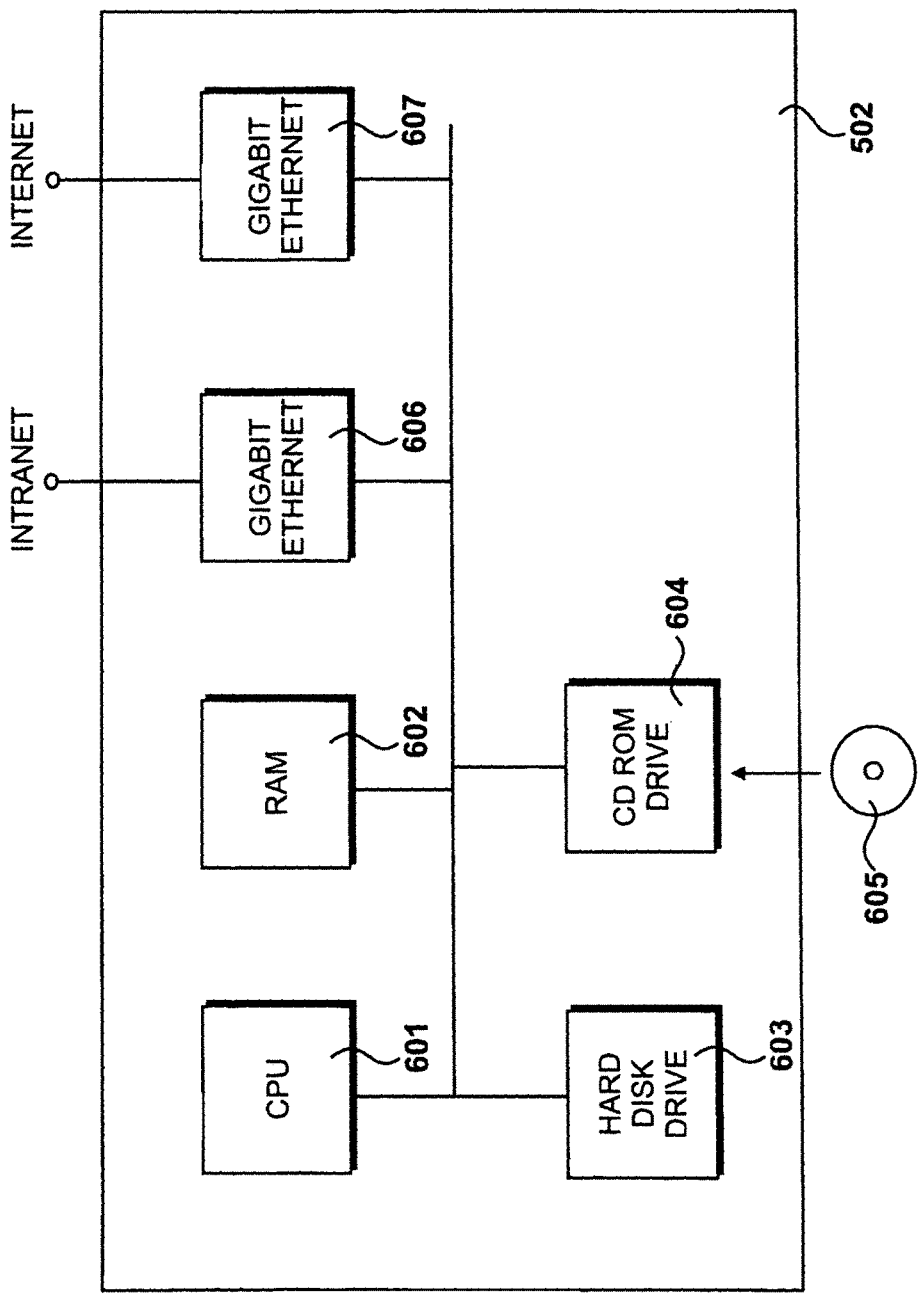
FIG. 6 details a real time data server shown in FIG. 5.

FIG. 6 details real time data server 502. It comprises a central processing unit (CPU) 601 having a clock frequency of three gigahertz (GHz), a main memory 602 comprising two gigabytes (GB) of dynamic RAM and local storage 603 provided by a 60 Gb-disk array. A CD-ROM disk drive 604 allows instructions to be loaded onto local storage 603 from a CD-ROM 605. A first Gigabit Ethernet card 606 facilitates intranet connection to the application server 501. The intranet can also be used for installation of instructions. A second Gigabit Ethernet card 607 provides a connection to Internet 110 using MTP.

FIG. 7

Figure 7:
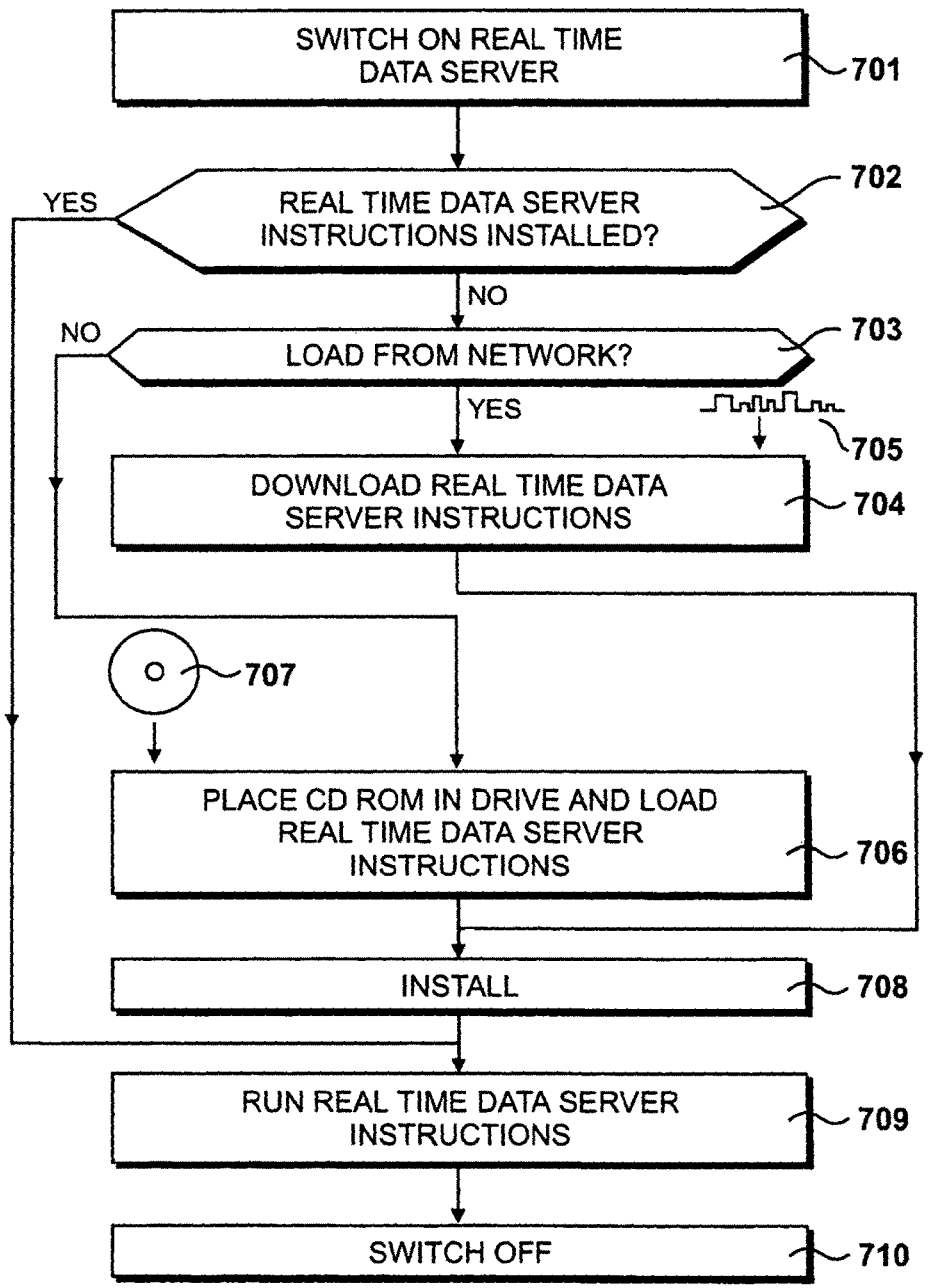
FIG. 7 details steps carried out by the real time data server shown in FIG. 6.

FIG. 7 details steps carried out by real time data server 502. At step 701 the real time data server 502 is switched on and at step 702 a question is asked as to whether the necessary instructions are already installed. If this question is answered in the negative then at step 703 a further question is asked as to whether the instructions should be loaded from the intranet. If this question is answered in the affirmative then at step 704 the instructions are downloaded from a network 705. If it is answered in the negative then at step 706 the instructions are loaded from a CD-ROM 707.

Following either of steps 704 or 706 the instructions are installed at step 708. At this point, or if the question asked at step 702 is answered in the negative, the instructions are executed at step 709. At step 710 the real time data server is switched off. In practice this will happen very infrequently, for example for maintenance.

FIG. 8

Figure 8:
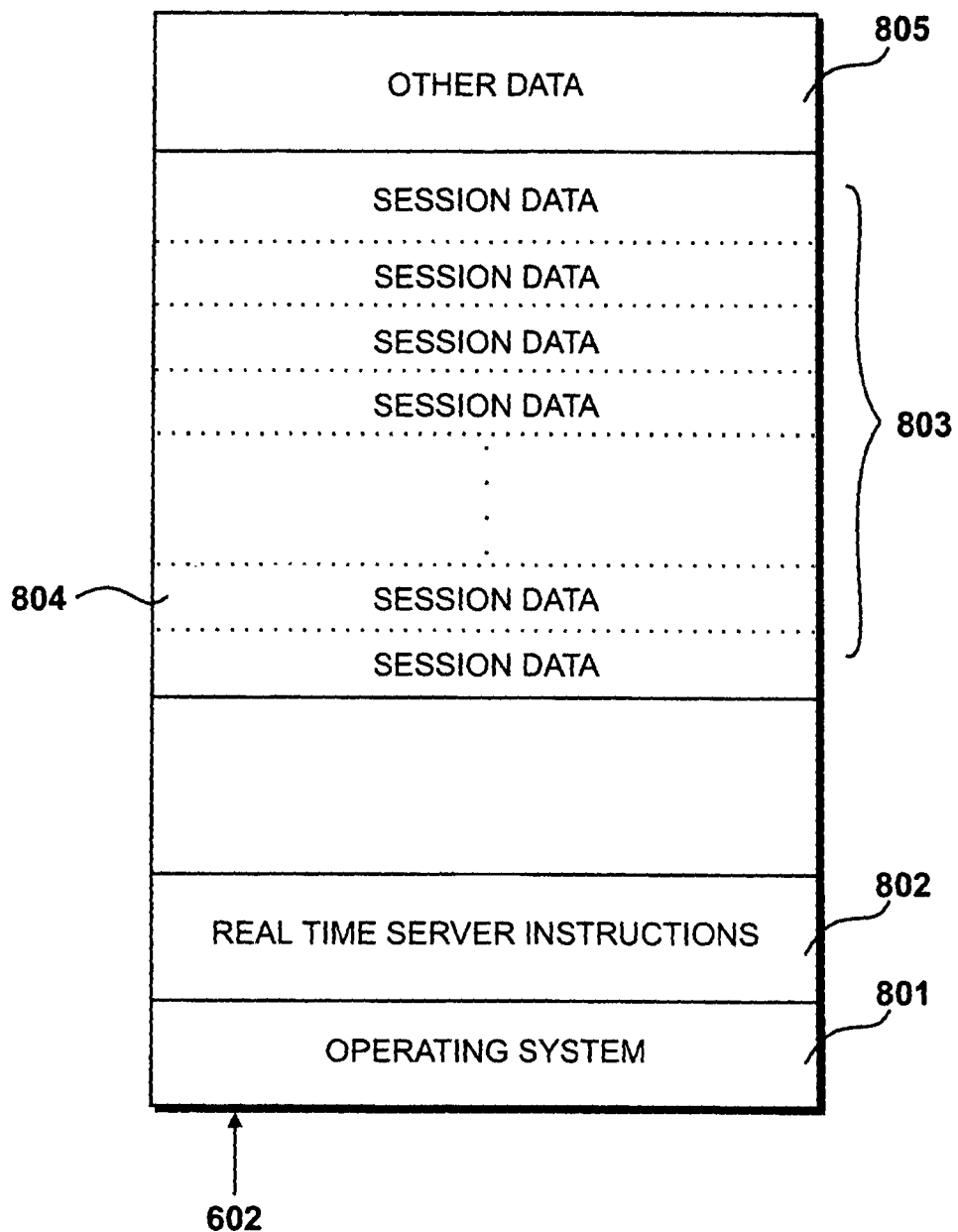
FIG. 8 details the contents of the memory shown in FIG. 6.

FIG. 8 details the contents of memory 602 during the running of real time data server 502. An operating system 801 provides operating system instructions for common system tasks and device abstraction. The Wndows™ XP™ operating system is used. Alternatively, a Macintosh™, Unix™ or Linux™ operating system provides similar functionality. Real time data server instructions 802 include MTP instructions and instructions for providing MTP status information to the application server 501. Session data 803 comprises the details of every session, such as session item 804, currently maintained by the server 502. Each client terminal that is currently logged on has a session, and when a session starts an area of memory is allocated to it in which variables, specific to each user, are stored. Other data includes data used by the operating system and real time data server instructions.

FIG. 9

Figure 9:
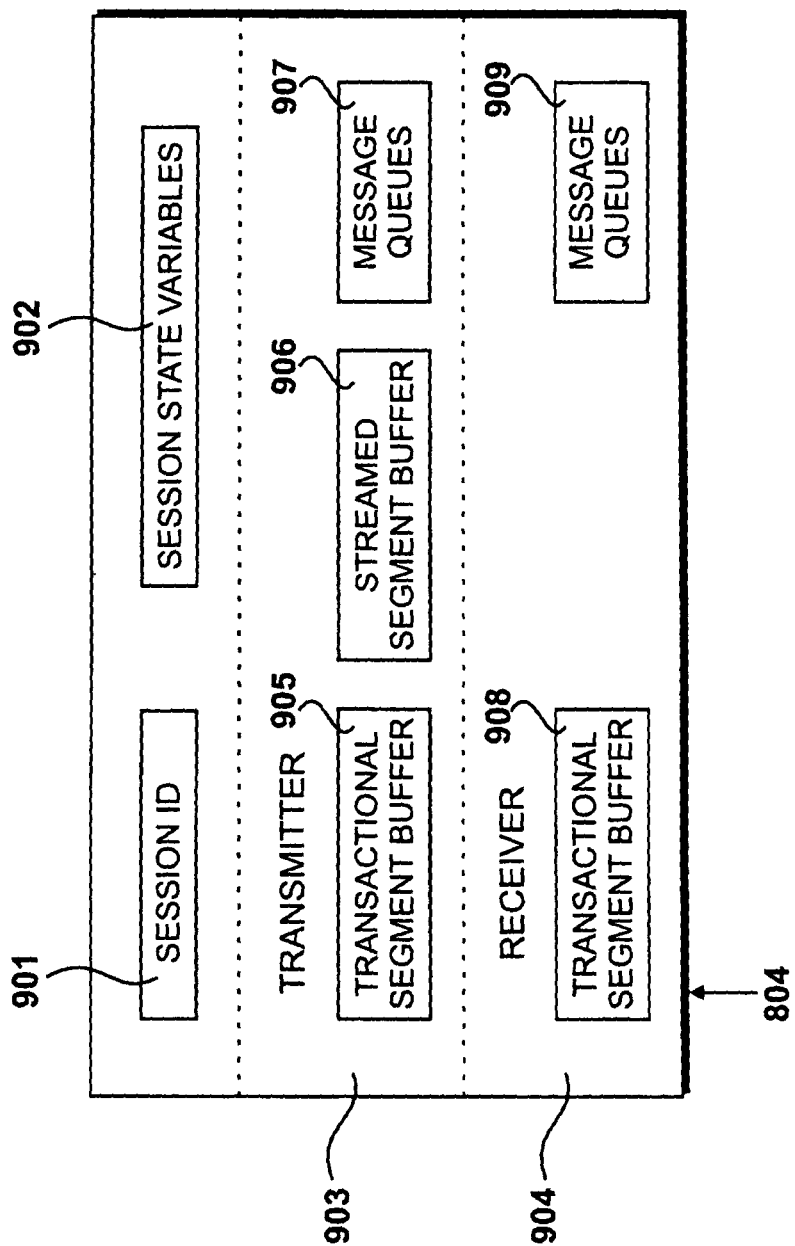
FIG. 9 details a session item shown in FIG. 8.

FIG. 9 details an individual session item 804 shown in FIG. 8. Each session item includes a session ID 901 and session state variables 902, indicating whether the session is starting, ongoing, stalled, reconnecting or disconnecting. Each item also includes transmitter data 903 and receiver data 904, since MTP provides two-way communication. Transmitter data 903 includes a transactional segment buffer 905, a streamed segment buffer 906 and prioritised message queues 907. Receiver data 904 includes a transactional segment buffer 908 and prioritised message queues 909.

FIG. 10

Figure 10:
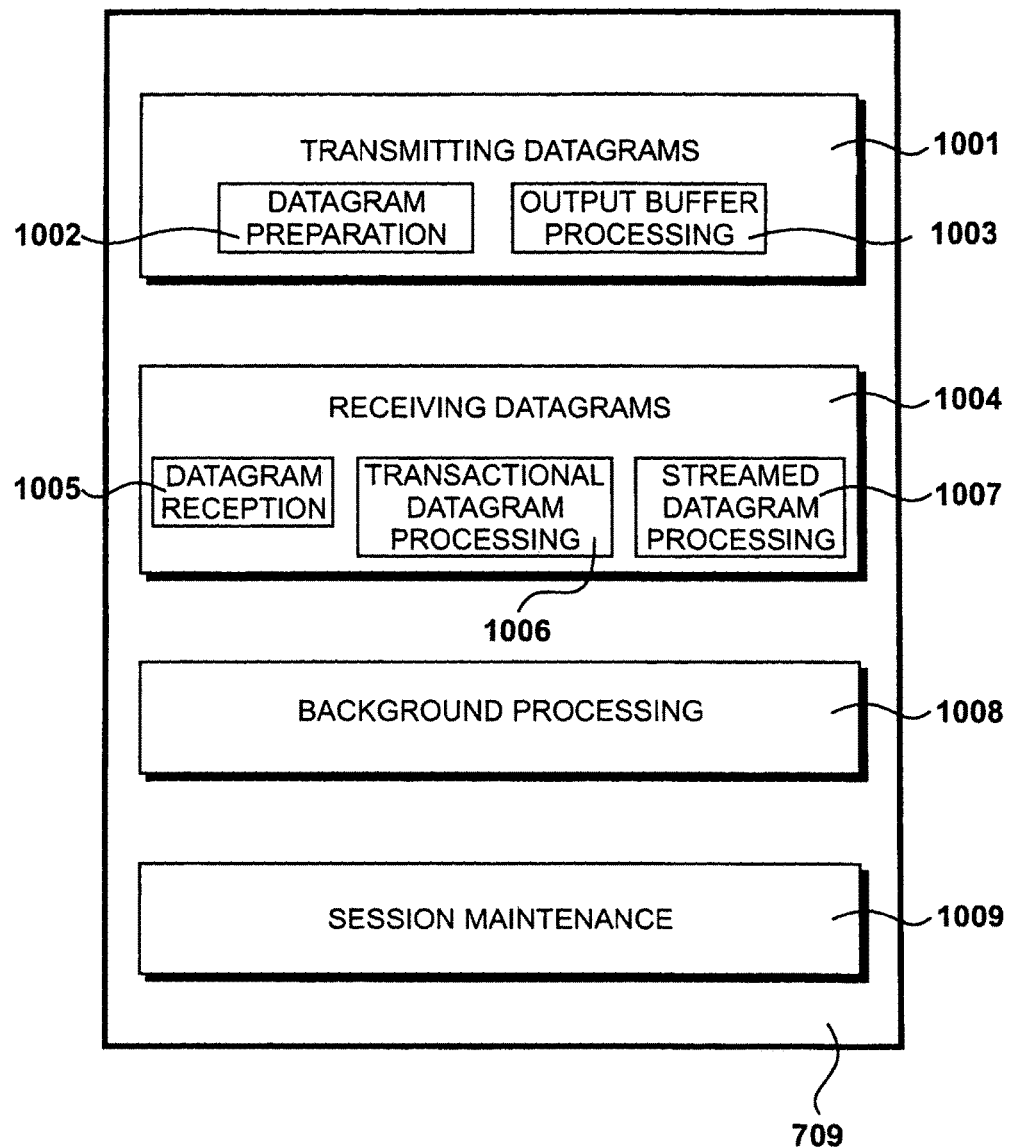
FIG. 10 details steps carried out during FIG. 7 to execute real time data server instructions.

FIG. 10 illustrates step 709 at which the real time data server instructions are executed. This step comprises a number of separate processes that effectively occur in parallel. The concurrency of these processes is achieved by a mixture of concurrent threads and sequential processing, details of which will be known to those skilled in the art. In particular, although the processes may be described in terms of communications with a single client, PDA 511, they should be understood to be relevant to all the clients that the real time data server 502 is communicating with.

Process 1001 transmits datagrams from the real time data server 502 to a client 511. Each packet includes an IP header, a user datagram protocol (UDP) header and an MTP header. For convenience each packet is referred to as a datagram. Process 1001 comprises two separate processes: datagram preparation 1002 and output buffer processing 1003. Process 1002 prepares data for transmission. Data received from application server 501 can be from several applications having different data characteristics and priorities and it must be processed before it can be sent to terminals such as PDA 511.

Process 1004 receives datagrams from client terminals such as PDA 511 and comprises three separate processes: datagram reception 1005, transactional datagram processing 1006 and streamed datagram processing 1007.

Process 1008, which will be described further with reference to FIG. 27, performs background processing, which includes various processes required to be performed while transmitting and receiving data, such as identifying timeout conditions.

Figure 30:
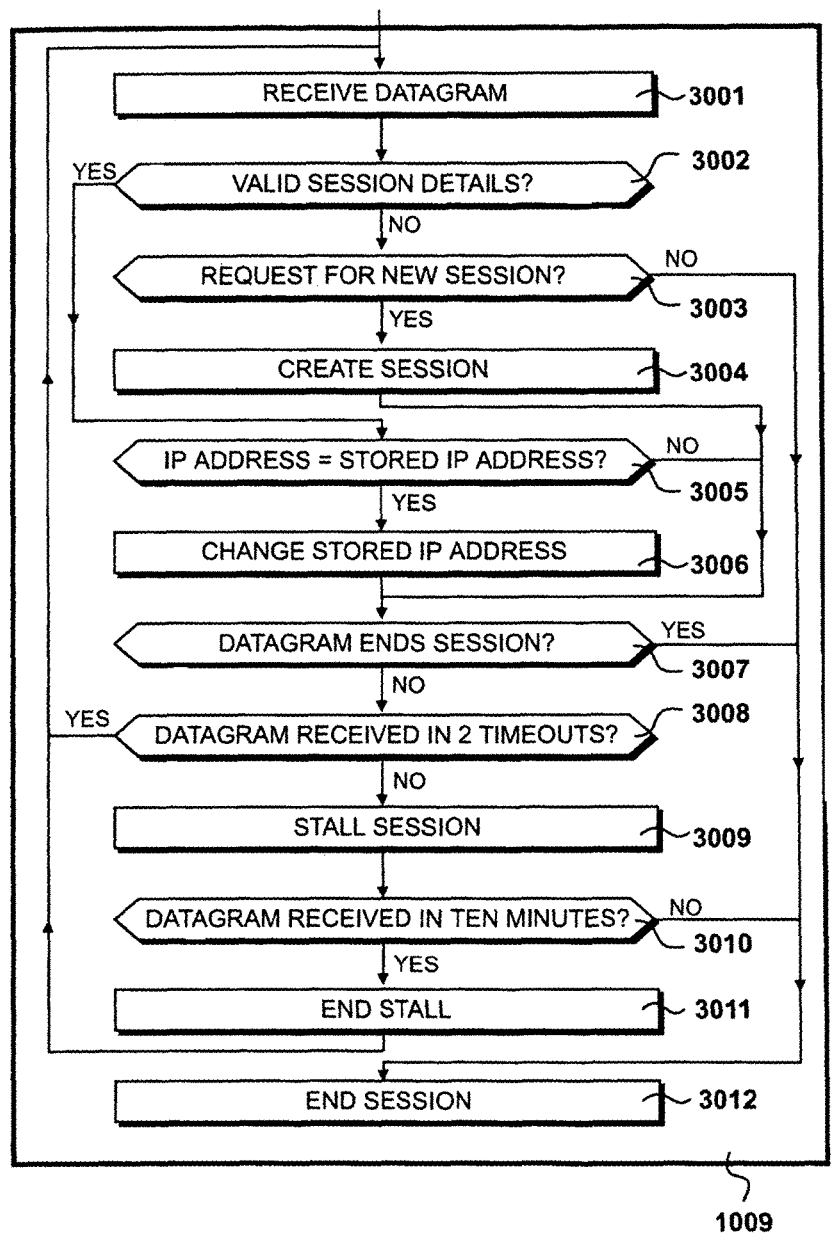
FIGS. 30 and 30A detail steps carried out during FIG. 10 to perform session maintenance.

Process 1009 provides session maintenance, which includes operations performed when PDA 511 is temporarily disconnected. This process, which will be described further with reference to FIG. 30, is the first to start, with processes 1001, 1004 and 1008 being performed once the user session is established.

FIG. 11

Figure 11:
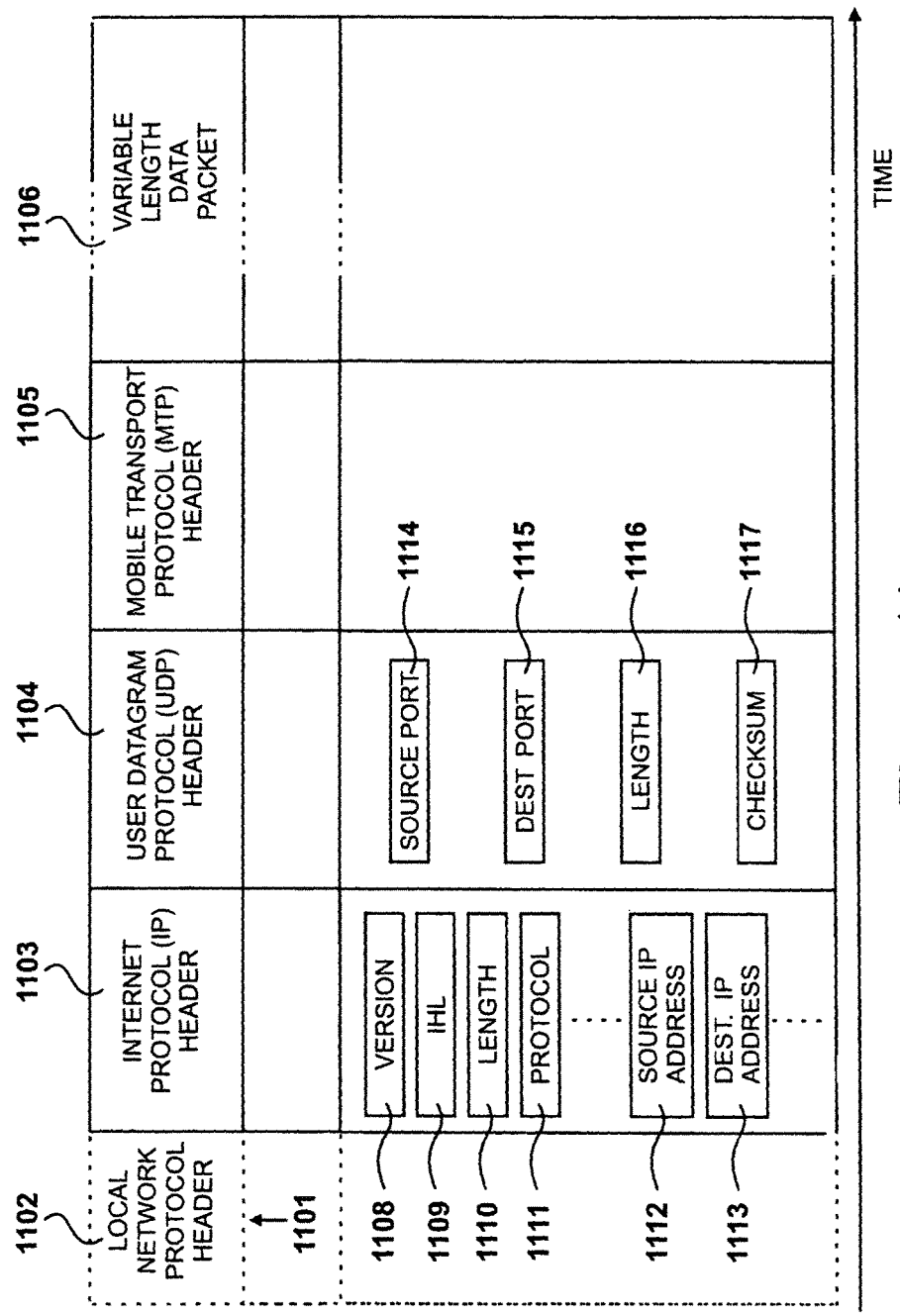
FIG. 11 illustrates the structure of a typical datagram.

FIG. 11 illustrates the structure of a typical datagram 1101 sent between the real time data server 502 and PDA 511. A local network protocol header 1102 changes as the datagram passes from network to network across the Internet 110. An IP header 1103 defines the destination of the packet, as well as other characteristics. A UDP header 1104 precedes an MTP header 1105, which implements several features for efficiently supplying real time data to clients over mobile wireless links, as well as other data links of varying degrees of quality. The MTP header 1105 is followed by data 1106 that has a maximum length, in this embodiment, of approximately 500 bytes. This limit is chosen to avoid packet fragmentation and to avoid overloading the terminals, and could be varied.

The IP header 1103 includes several fields. Version field 1108 indicates the version of IP being used, for example IPv4 or IPv6. Internet Header Length field 1109 indicates the length, in 32-bit words, of the IP header. Its minimum value is 5. Length field 1110 gives the total length, in bytes, of the datagram, including the IP header (but not including the local network protocol header 1102). Protocol field 1111 is set to a value indicating that UDP is being used. Source IP address field 1112 gives the return address of the datagram, while destination IP address field 1113 gives its destination.

The UDP header 1104 has the following fields. Source port field 1114 gives the port on the computer sending the datagram, while destination port field 1115 gives the port number on the computer receiving the datagram. Length field 1116 gives the length of the datagram in bytes, including the UDP header but not including the previous headers 1102 and 1103. Checksum field 1117 contains a value computed from the IP header 1103, UDP header 1104 and the remainder of the datagram, enabling data integrity to be confirmed.

FIG. 12

Figure 12:
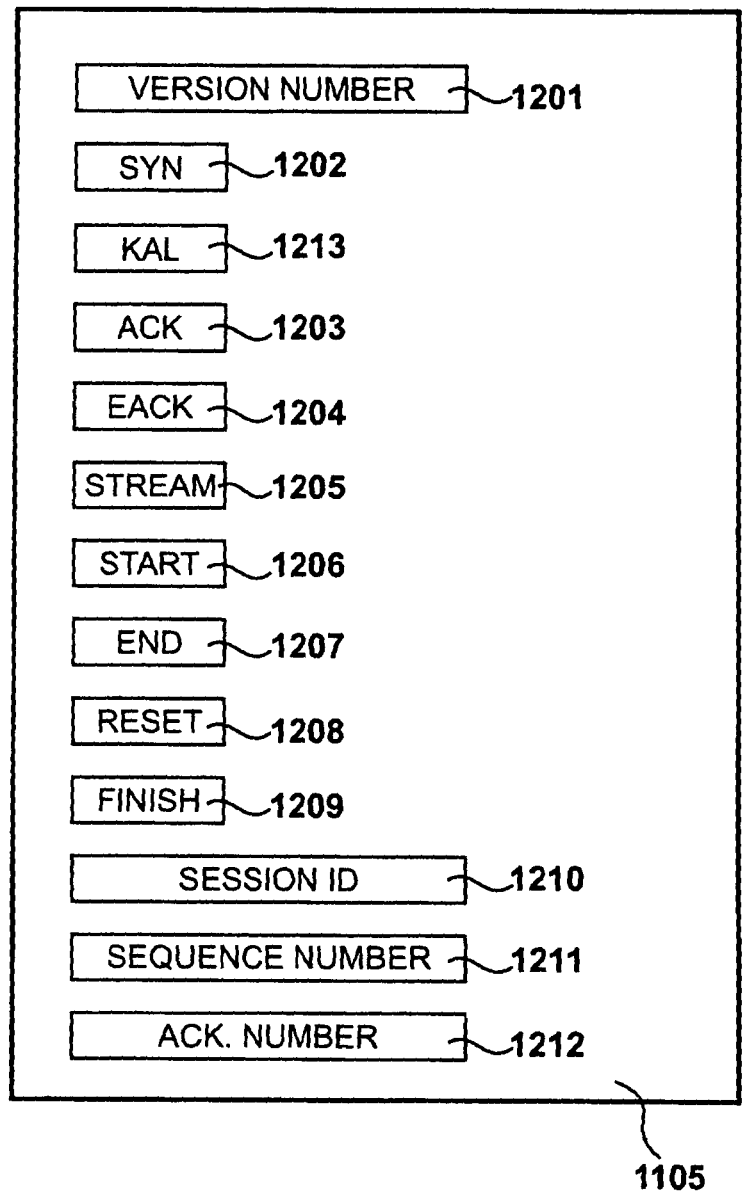
FIG. 12 details a mobile transport protocol (MTP) header shown in FIG. 11.

FIG. 12 details MTP header 1105. It contains a number of fields. Firstly, version number field 1201 gives the version of MTP being used.

Fields 1202 to 1209 are single-bit fields that are considered to be "set" if their value is one, and not set if it is zero. SYN field 1202 and KAL field 1213 are used for signalling. At the start and end of a session, SYN field 1202 is used for handshaking, but it is also used to perform various connection timing procedures. KAL field 1213 is used to send "keep alive" datagrams that indicate that a connection is open. ACK field 1203 indicates that the datagram is being used to acknowledge a received datagram, while EACK field 1204 indicates an extended acknowledgement. STREAM field 1205 is used to differentiate between streamed and transactional data. When set, it indicates that the datagram contains streamed data.

START field 1206 and END field 1207 are used to indicate that a datagram contains data and that it is the first or last of a set. If a datagram is too large to be sent as a single datagram then it may be split, and so START field 1206 indicates the first datagram and END field 1207 indicates the last. A datagram that has not been split has both fields set. An empty datagram does not have these fields set.

RESET field 1208 is used for session handshaking when restarting a session, and FINISH field 1209 is used to close an MTP session.

Session ID field 1210 is a number indicating which session the MTP datagram relates to. Sequence number field 1211 is a number indicating the datagram sequence. Each datagram that is sent out and that requires acknowledgement is given its own effectively unique number, which is then used in an acknowledgement by the client. (Since streamed and transactional datagrams are numbered using a different sequence, and since the sequence numbering loops at a number that is greater than the number of acknowledgements that will be outstanding at any time, the sequence number is not strictly unique but is effectively unique.) An acknowledgement is itself a datagram, which may contain data, and so acknowledgement number field 1212 is the sequence number of the datagram being acknowledged in a datagram that has the ACK field 1203 set. This datagram is probably otherwise unconnected with the datagram being acknowledged.

FIG. 13

Figure 13:
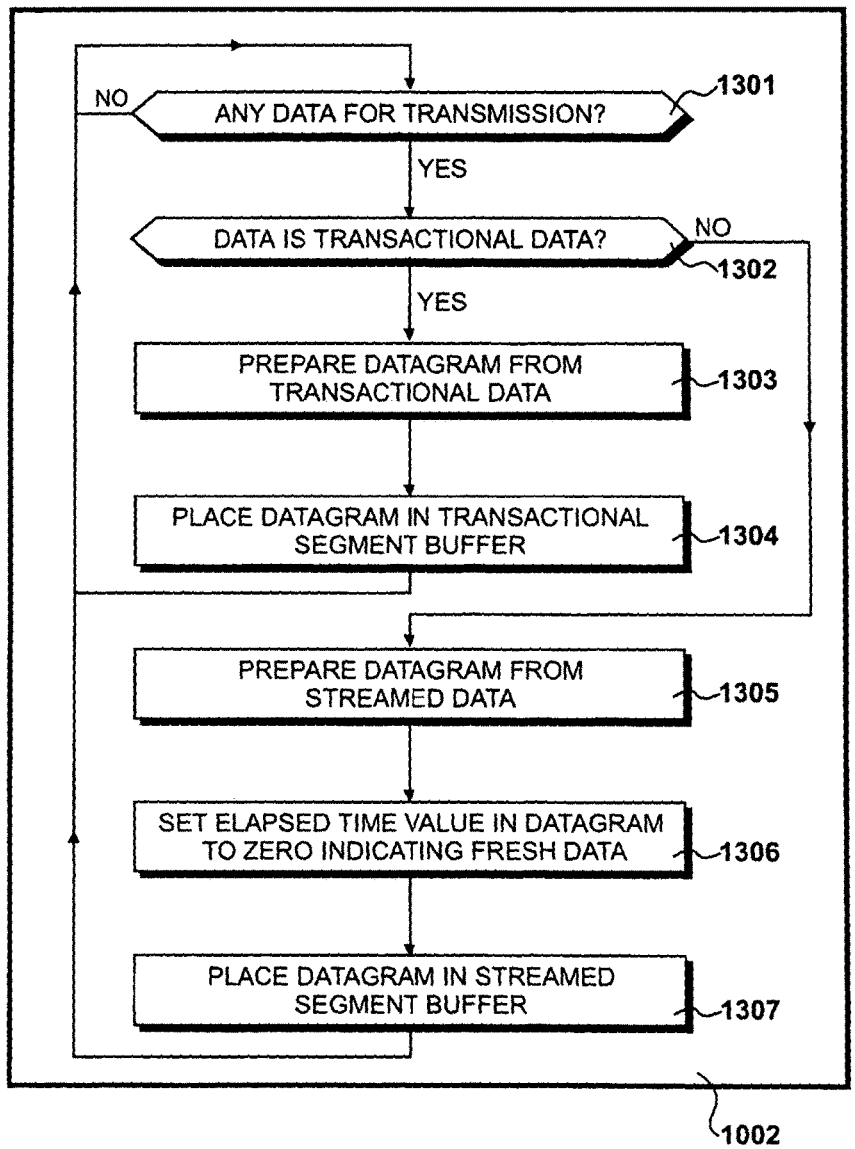
FIG. 13 details steps carried out during FIG. 10 to transmit datagrams.

FIG. 13 details process 1002 at which datagrams are transmitted. Process 1001 comprises two, effectively concurrent processes 1002 and 1003. Process 1002 fills up the transactional and streamed segment buffers 905 and 906, while process 1003 looks in the buffers and marks the datagrams for sending.

Process 1002 commences with step 1301 at which a question is asked as to whether there is any data for transmission. If this question is answered in the affirmative then a further question is asked at step 1302 as to whether the data is transactional data. If this question is answered in the affirmative then at step 1303 a datagram is prepared and at step 1304 it is placed in the transactional segment buffer 905. Alternatively, if the question asked at step 1302 is answered in the negative, a datagram of streamed data is prepared at step 1305. The elapsed time value in the datagram is set to zero, indicating fresh data, at step 1306 and at step 1307 the datagram is placed in the streamed segment buffer 906.

Following steps 1303 or 1307, or if the question asked at step 1301 is answered in the affirmative, control is returned to step 1301 and the question is asked again as to whether there is any data for transmission.

FIG. 14

Figure 14:
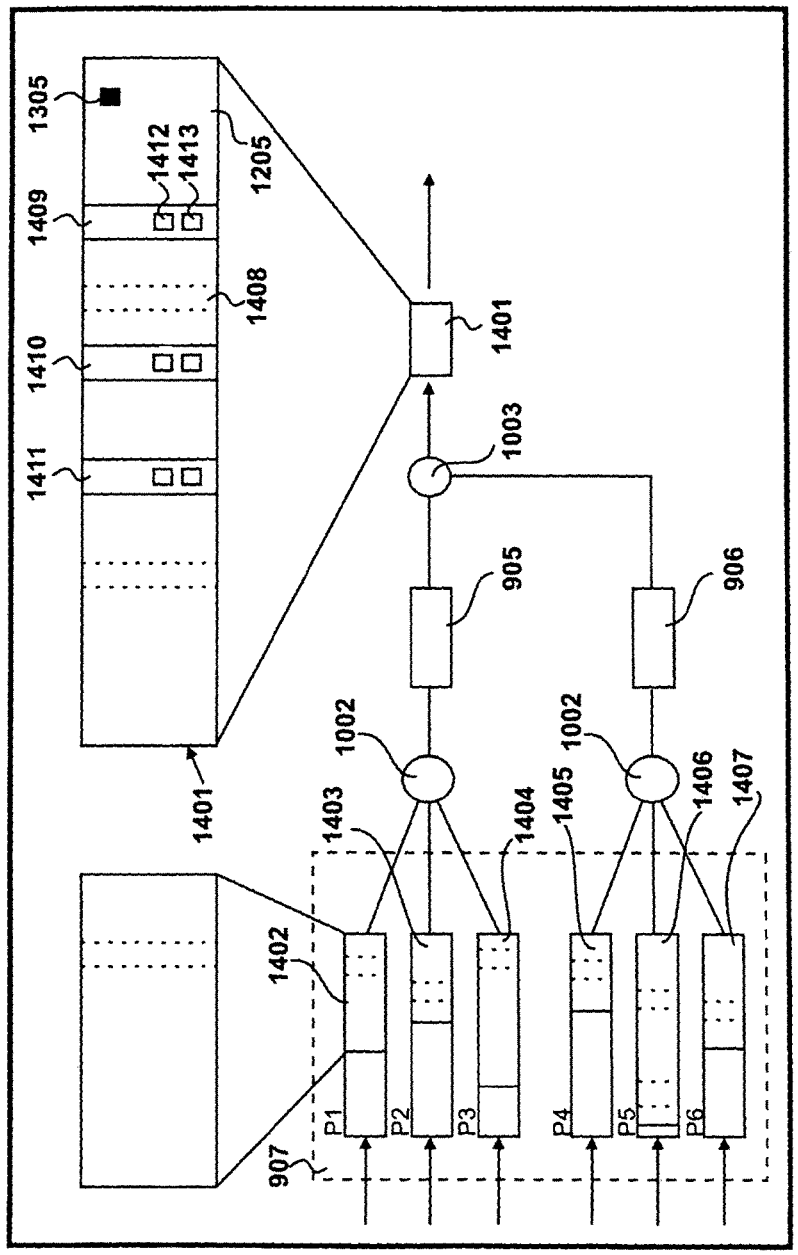
FIG. 14 illustrates the process of transmitting data.

FIG. 14 illustrates the process performed during steps 1303 to 1307, in which data is prepared for transmission. A datagram 1401 can comprise transactional data or streamed data, which is determined by whether or not STREAM field 1205 is set in the MTP header 1105. Each of the two types of data has its own buffer, transactional segment buffer 905 and streamed segment buffer 906, from which datagrams are sent. Once acknowledged, a datagram can be deleted from its location in segment buffer 905 or 906. Each segment buffer stores a number of datagrams.

Transmission is facilitated by supplying a datagram to the operating system 801, which facilitates its electronic transmission using the Internet Protocol.

Transactional and streamed datagrams are generated from data stored in prioritised message queues 907. This data is supplied to message queues 907 by applications running on application server 501. An application may supply all its outgoing messages to a particular message queue, or may pass messages to different queues depending upon the nature of the data.

Transactional data is supplied to prioritised message queues 1402, 1403 and 1404. Streamed data is supplied to prioritised message queues 1405, 1406 and 1407. Each message queue may contain a number of messages supplied from applications on application server 501. These messages are delineated by level one message headers, such as header 1408, that specify the length of the data and the application from which it was supplied.

The amount of data taken from each message queue and combined into a single datagram depends upon proportions defined for each message queue. For example, default proportions of fifty percent, thirty percent and twenty percent may be assigned to prioritised message queues 1405 to 1407 respectively. If message queue 1407 has no data then its allocation will be equally reallocated between queues 1406 and 1407, giving queue 1408 thirty-five percent and queue 1407 sixty-five percent. If only one queue contains data then it will have one hundred percent of the allocation.

The way the data is allocated also depends upon the type of message queue. Transactional messages may be broken up over a number of datagrams, and so the process only considers the amount of data in the queue. However, streamed messages must be wholly contained within one datagram, and so only entire messages are taken from these message queues, even if this means that the message queue's priority allocation is not used up.

Datagrams are created from the message queues and placed in segment buffers 905 and 906. These are then sent, with the first message being taken from each segment buffer in turn.

The example in FIG. 14 shows datagram 1401, which is made up from transactional data. The amount of data that can be included in the datagram is calculated, and data is taken from each of queues 1402 to 1404 according to their priority levels. Data from different prioritised message queues is delineated within a datagram by level two message headers, such as headers 1409, 1410 and 1411. These headers include a length field 1412 and a message queue field 1413.

Thus the example datagram 1401 does not contain a single message but in fact contains portions of five messages, since the data from each of queues 1402 to 1404 includes a message header and thus includes the end of one message and the beginning of another.

The number of prioritised message queues shown here and their proportions are provided as an example only. There could be fewer queues, for example only one transactional queue and two streamed queues, or any other number. The proportions will vary according to the kinds of real time data provided and the realities of each individual system. Additionally, it is not necessary that unused allocation be equally divided between the remaining queues. It could be divided according to their own allocations, or in some other way.

FIG. 15

Figure 15:
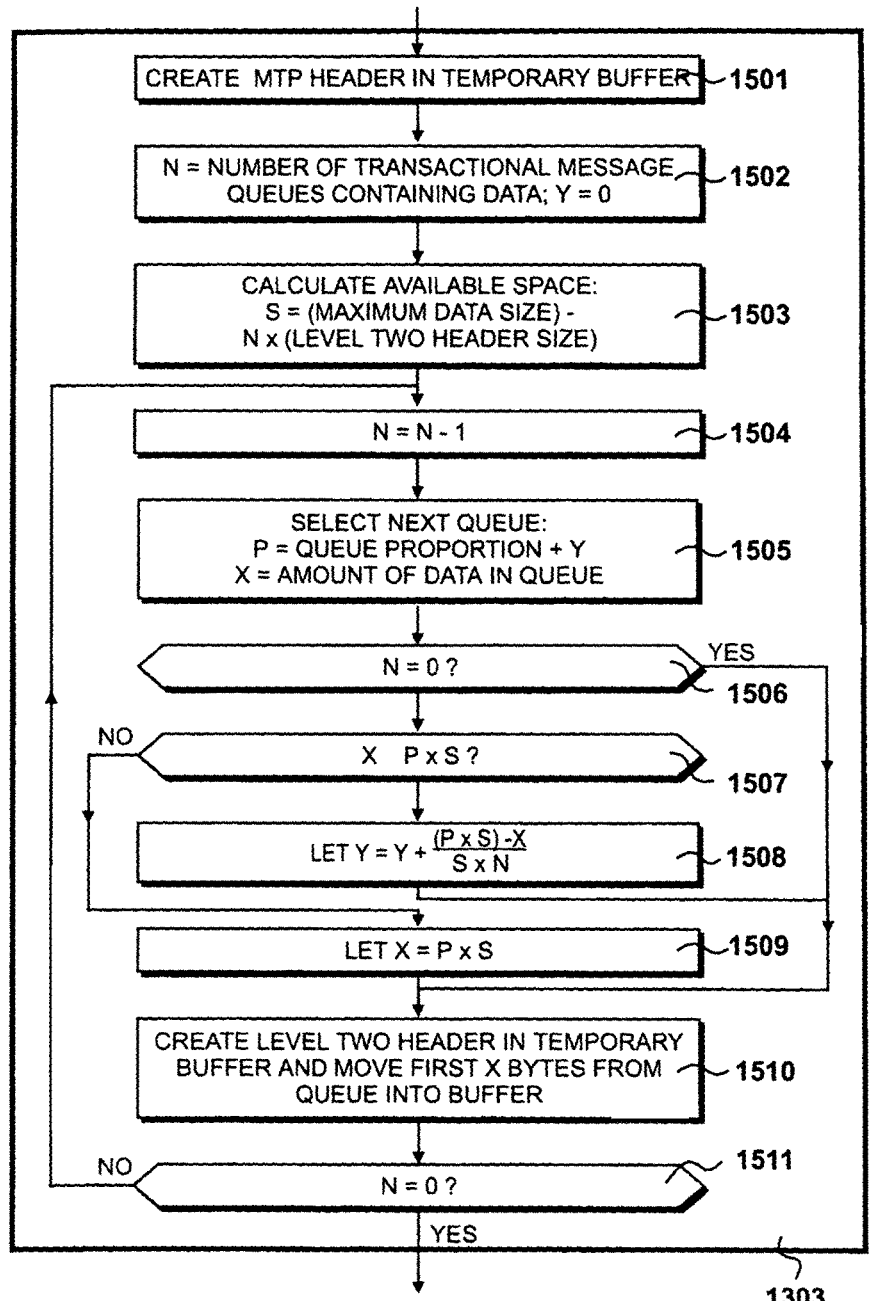
FIG. 15 details steps carried out during FIG. 13 to prepare a transactional datagram.

FIG. 15 details step 1303, at which a transactional datagram is prepared. At step 1501 an MTP header is created in a temporary buffer. This is a default header that as yet does not contain any information specific to the datagram being considered. This information is added by buffer processing process 1003, which will be described with reference to FIG. 17. At step 1502 a variable N is set to be the number of transactional prioritised message queues 1402 to 1404 that contain data, and a variable Y is initialised to zero. At step 1503 the number of bytes available for data, indicated by variable S, is calculated by subtracting the product of N and the level two header size from the maximum data size. For example, the maximum data size may be 500 bytes.

At step 1504 the variable N is decremented by one and at step 1505 the highest message queue is selected. A variable P is set to be the sum of the proportion of the datagram that the data in that queue may use, for example 0.3 for queue P1, and variable Y (zero on the first iteration), and a variable X is set to be the amount of data, in bytes, in the queue. At step 1506 a question is asked as to whether the variable N is equal to zero. If this question is answered in the affirmative then the queue under consideration is the last one containing data and so the following steps need not be carried out, control being directed to step 1513.

However, if it is answered in the negative then at step 1507 a further question is asked as to whether the variable X is less than the product of the variables S and P; that is, whether the amount of data in the queue is less than the amount of data that may be used. If this question is answered in the affirmative then at step 1508 the variable Y is calculated as the variable X subtracted from the product of P and S, all divided by the product of S and N, all added to the previous value of Y. Thus Y is a proportion that is to be added to the proportions of the remaining queues in order to allocate to them the unused space allocated to the queue under consideration. For example, if the available space is 400 bytes and all three queues contained data, then P1 is allocated 120 bytes. If it only contained 100 bytes then a further 10 bytes would be allocated to each of the remaining queues. Y would thus be 0.05. Alternatively, if the question asked at step 1507 is answered in the negative, to the effect that the variable X is not less than the product of X and S, then at step 1509 the variable X is set to be the product of the variables P and S.

Following either step 1508 or step 1509, or if the question asked at step 1506 is answered in the affirmative, at step 1510 a level two header is created in the temporary buffer and the first X bytes are moved from the queue into the temporary buffer. The question is then asked at step 1511 as to whether the variable N is equal to zero. If this question is answered in the negative then control is then returned to step 1504 where N is decremented again before the next queue is selected. If it is answered in the affirmative then step 1303 is over and a datagram has been prepared. The step at 1304 of placing this datagram in the transactional segment buffer 905 consists of moving the data from the temporary buffer to the transactional segment buffer 905.

FIG. 16

Figure 16:
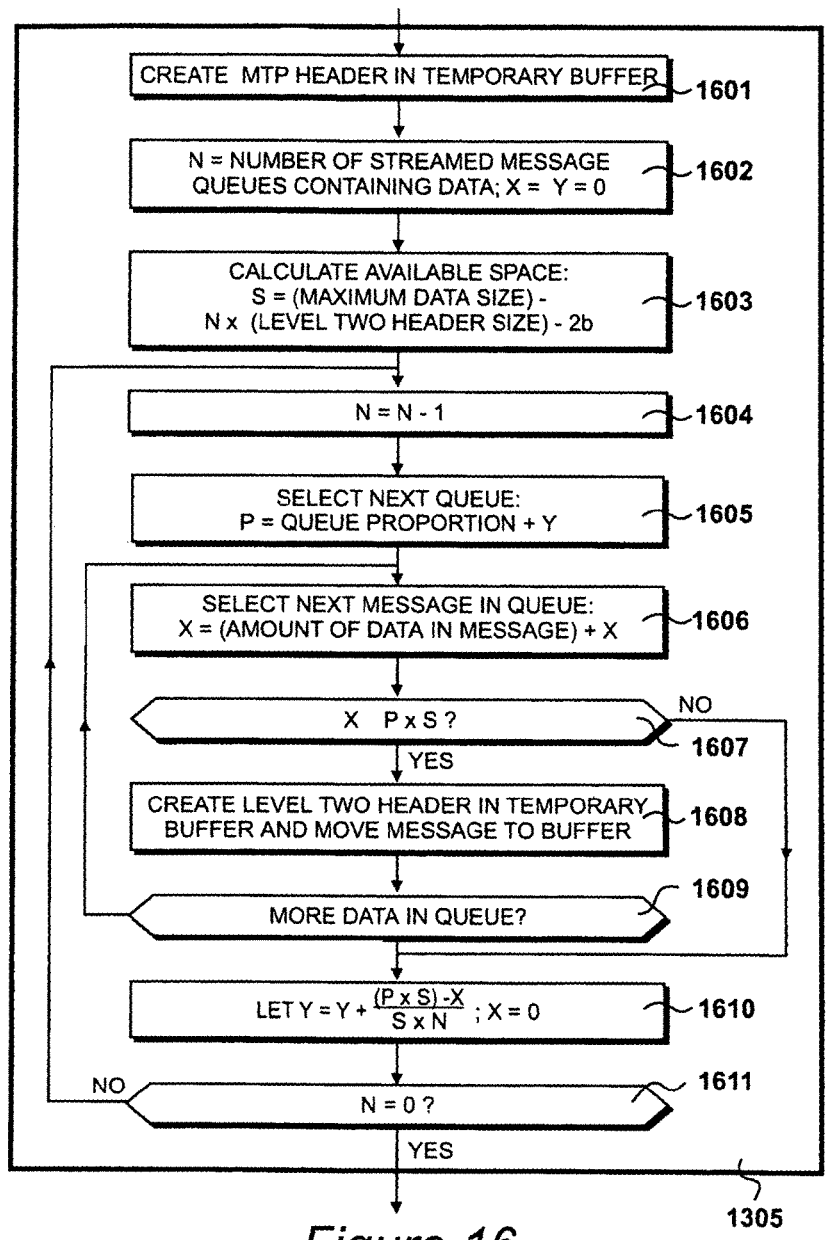
FIG. 16 details steps carried out during FIG. 13 to prepare a streamed datagram.

FIG. 16 details step 1305, at which a streamed datagram is prepared from the data in streamed prioritised message queues 1405 to 1407. At step 1601 an MTP header is created in a temporary buffer, and at step 1602 a variable N is set to be the number of streamed message queues that contain data, while variables X and Y are set to be zero.

At step 1603 the available space S is calculated in the same way as at step 1503, except that a further two bytes are subtracted, which will be used to store the elapsed time. At step 1604 the variable N is decremented by one.

At step 1605 a level two header is created in the temporary buffer, and at step 1606 the first message queue is selected, and a variable P set to be the sum of the queue's priority proportion and the variable Y. At step 1607 the first message in the queue is selected, and the variable X is set to be the sum of the message's length in bytes and the previous value of X. At step 1608 a question is asked as to whether the variable X is less than the product of the variables P and S.

If this question is answered in the affirmative then at step 1609 the message is moved to the temporary buffer and a further question is asked as to whether there is more data in the queue. If the question is answered in the negative then control is returned to step 1607 and the next message is selected.

If the question asked at step 1608 is answered in the affirmative, or the question asked at step 1610 is answered in the negative, then at step 1611 the variable X is reset to zero, and the variable Y is updated to be the previous value of the variable X subtracted from the product of P and S, all divided by the product of S and N, all added to the previous value of Y. A question is then asked at step 1612 as to whether N is equal to zero. If this question is answered in the negative then control is returned to step 1604 if it is answered in the affirmative then step 1605 is concluded.

Thus only entire messages are included in a streamed datagram, although more than one message may be contained in a single datagram. A streamed datagram may contain more than one message from a single queue, as long as it does not exceed its priority allocation, but may not contain a fragment of a datagram.

As discussed above, the algorithm presented in FIGS. 15 and 16 is only one possibility for prioritising data.

Additionally, in another embodiment (not shown) this prioritisation and mixing of data does not take place. In that embodiment datagrams only contain data from a single application, and the START field 1206 and END field 1207 are used to indicate the beginning and end of messages, instead of the level one headers described with reference to FIG. 14.

FIG. 17

Figure 17:
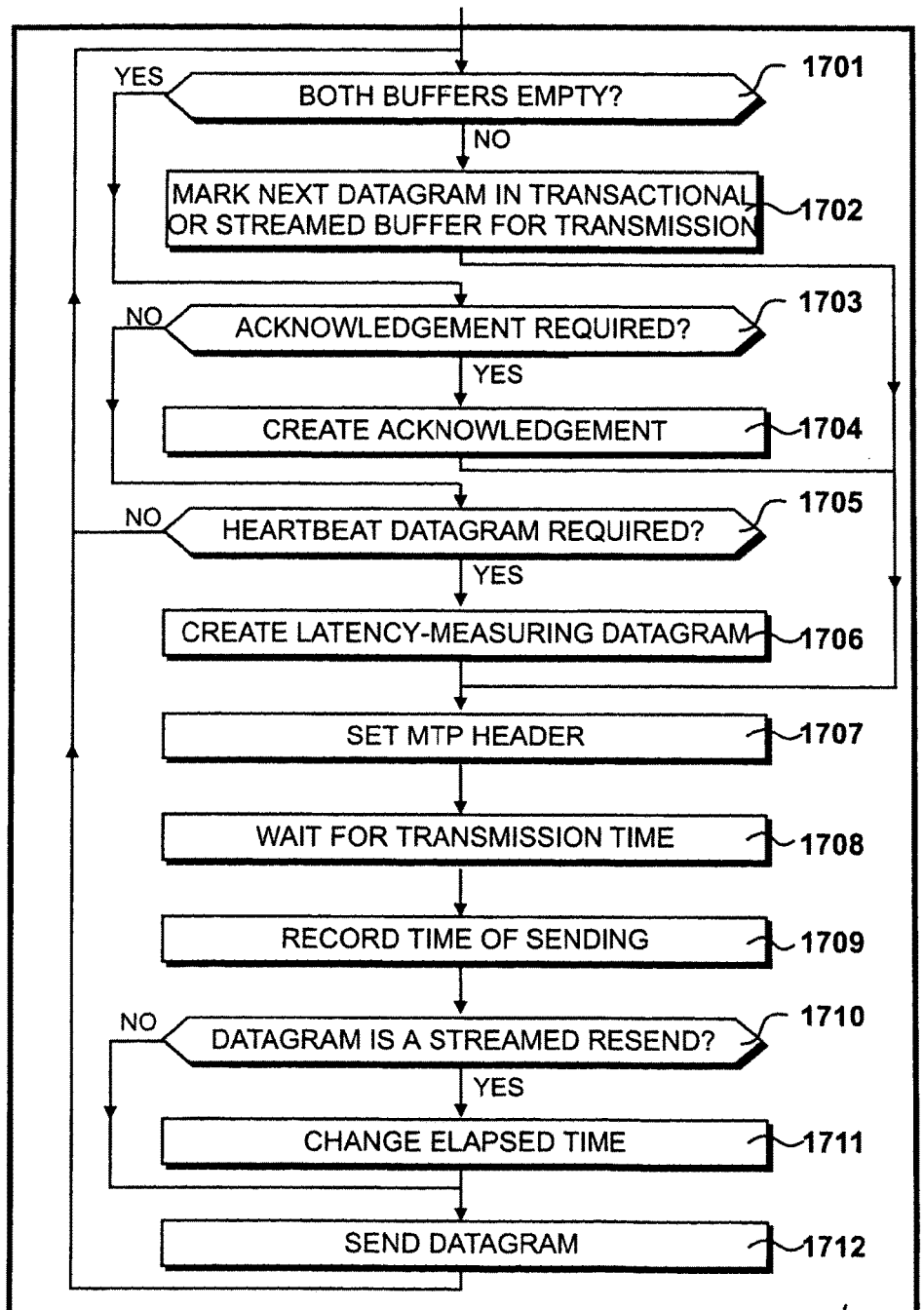
FIG. 17 details steps carried out during FIG. 10 to perform output buffer processing.

Output buffer processing 1003 is detailed in FIG. 17. At step 1701 a question is asked as to whether both the transactional segment buffer 905 and the streamed segment buffer 906 are empty, and if this question is answered in the negative then the next datagram to be sent in either buffer 905 or 906 is marked for transmission (the process alternates between the two buffers) at step 1702. This may be the next newest datagram, or it may be an unacknowledged datagram that has been marked to be resent.

If the question asked at step 1701 is answered in the negative then at step 1703 a further question is asked as to whether an acknowledgement is required. If this question is answered in the affirmative then at step 1704 an empty acknowledgement datagram is created. If the question asked at step 1703 is answered in the negative then at step 1705 a further question is asked as to whether a heartbeat datagram is required, and if this question is answered in the affirmative then a latency-measuring datagram is produced at step 1706 (this will be described more fully with reference to FIG. 20). If the question asked at step 1705 is also answered in the negative then control is returned to step 1701 and the question is asked again as to whether the buffers are empty.

Following any of steps 1702, 1704 or 1706, the MTP header as described in FIG. 12 is set at step 1707. At step 1708 the process waits for a transmission time, since the rate of datagram transmission is controlled, as will be described with reference to FIG. 29. When this transmission time is reached, the time of sending is internally recorded for the purposes of delaying the next transmission. It is recorded with the datagram stored in the segment buffer, along with an indication of how many times the datagram has already been sent. At step 1710 a question is asked as to whether this datagram is being resent and is also a datagram containing streamed data, as indicated by the setting of both STREAM field 1205 and START field 1206; if so the elapsed time is changed at step 1711 to reflect the amount of time since the first attempt at sending the datagram, as can be calculated from the time of the last sending and any previous value of the elapsed time. This is to facilitate the calculation of resend latency, as will be described with reference to FIG. 41. Finally, at step 1712, the datagram is sent.

FIG. 18

Figure 18:
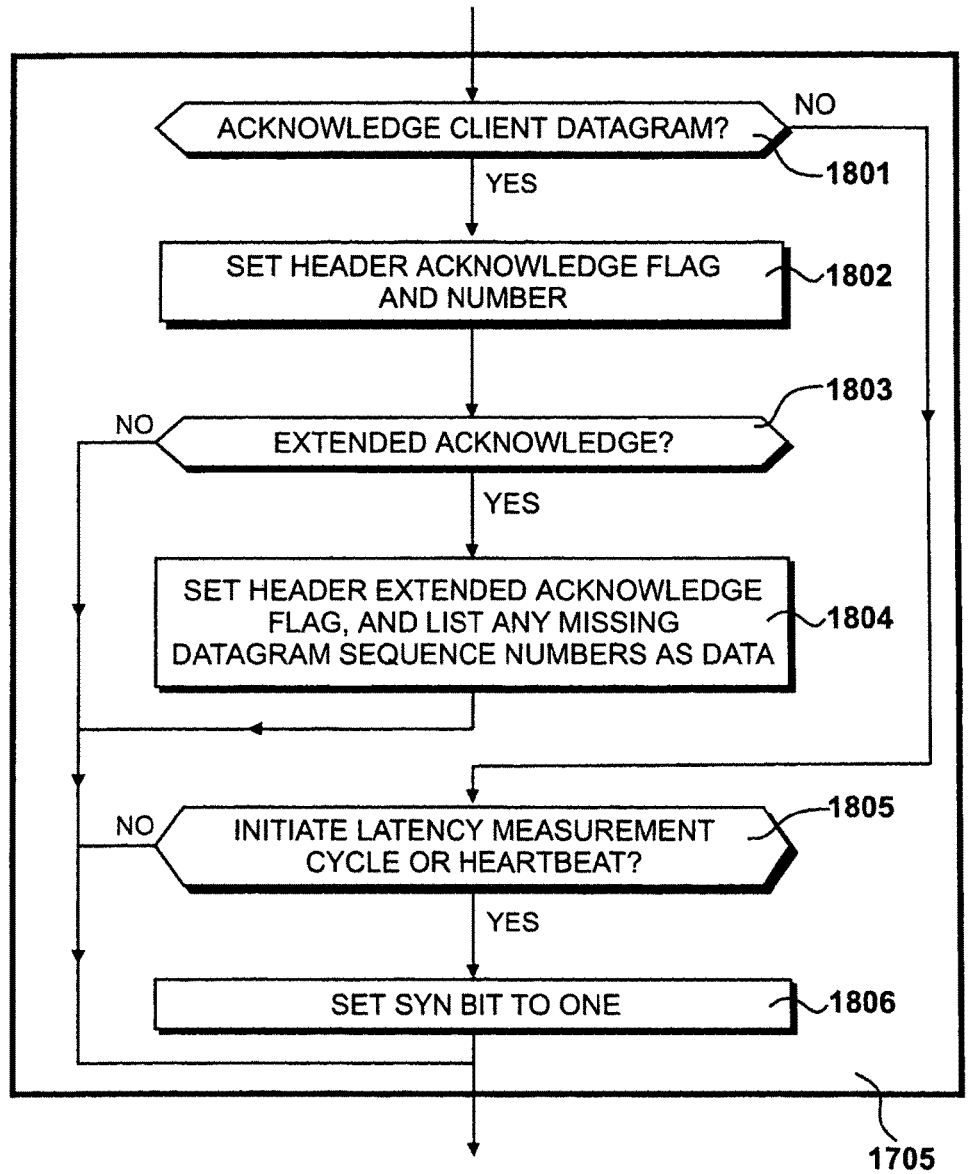
FIG. 18 details steps carried out during FIG. 17 to set an MTP header.

FIG. 18 details step 1705, at which the MTP header is set. At step 1801 a question is asked as to whether there is a datagram received from the client that needs to be acknowledged. The answer to this question depends not only on whether a datagram has been received from PDA 511 but also what kind of datagram it is. A datagram containing transactional data is acknowledged immediately, as is any datagram being used for timing purposes, and so if either of these have been received but not acknowledged the question is answered in the affirmative. Streamed data, being less critical, is acknowledged using an extended acknowledge, in which multiple packets are acknowledged in order to lower network traffic. Thus if only streamed datagrams have been received then the question will be answered in the affirmative only if a suitable period of time has elapsed. Otherwise, or if no datagrams have been received at all, the question is answered in the negative.

If the question asked at step 1001 is answered in the affirmative then at step 1802 ACK field 1203 is set and the sequence number of the datagram being acknowledged is entered in acknowledgement number field 1212. At step 1803 a question is asked as to whether this acknowledgement is an extended acknowledgement. If this question is answered in the affirmative then at step 1804 the EACK field 1204 is also set, and any datagrams that have not been received but have lower sequence numbers than the sequence number contained in field 1212 are listed as data in part 1106 of the datagram. Thus these datagrams are negatively acknowledged. Since the IP header 1103 and UDP header 1104 both contain length fields indicating the total length of the datagram the recipient of an extended acknowledgement knows implicitly how many datagrams are being negatively acknowledged. At this point, and if the question asked at step 1803 is answered in the negative, step 1705 is completed. (Note that because transactional datagrams have a separate sequence number from streamed datagrams, the extended acknowledgement process does not interfere with the acknowledgement of transactional datagrams.)

However, if the question asked at step 1801 is answered in the negative, to the effect that an acknowledgement is not due, at step 1805 a further question is asked as to whether a latency measurement or heartbeat should be initiated. If this question is answered in the affirmative then at step 1806 SYN field 1202 is set to one. A datagram having this field set initiates a latency measurement. When an acknowledging datagram is received from PDA 511 it is used to measure round-trip latency (further described with reference to FIG. 17). (Thus the SYN field cannot be set in an acknowledging datagram. For this reason step 1805 is only initiated if the question asked at step 1801 is answered in the negative.) Alternatively, if no data is being sent, a datagram having this field set, in addition to being used to measure latency, provides a heartbeat that confirms that the connection is still open.

Following step 1806, or if the question asked at step 1805 is answered in the negative, step 1705 is completed.

This figure highlights one of the few ways in which the server and the client are not symmetrical. While a session is stalled, the server will not send heartbeat datagrams, but the client will. This is because the receipt of a datagram from the client by the server ends the stall. This is provided by the suspension of background processing process 1008, which makes the decision as to whether to send a heartbeat datagram, during a stalled session. However, process 1003 sends the datagram, if instructed to, in exactly the same way on both the server and the client.

FIG. 19

Figure 19:
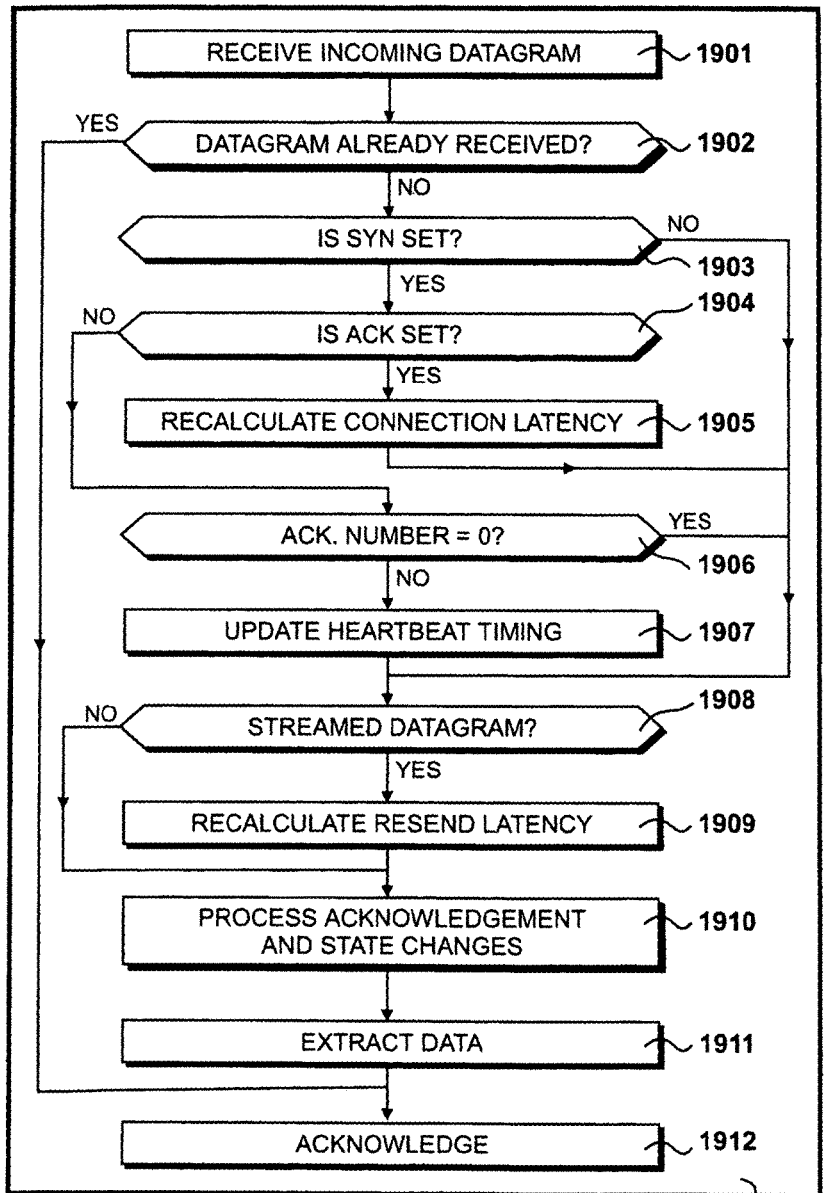
FIG. 19 details steps carried out during FIG. 10 to receive datagrams.

FIG. 19 details process 1005 that receives datagrams sent by PDA 511. At step 1901 an incoming datagram is received and the receive time logged. A question is then asked at step 1902 as to whether the datagram has a sequence number identical to a recently received datagram of the same type (i.e. streamed or transactional). This can happen when acknowledgements and resends "cross" and when acknowledgements are lost over the network. Thus if this question is answered in the affirmative then control is directed to step 1912 and the datagram is acknowledged without being processed. Alternatively, if it is answered in the affirmative, then at step 1903 a question is asked as to whether the SYN field 1202 is set, indicating that the datagram is a latency-measurement datagram. Thus if this question is answered in the affirmative then at step 1904 a further question is asked as to whether ACK field 1203 is also set. If this question is also answered in the affirmative then the datagram is a returned latency-measurement datagram and so the latency is calculated at step 1905.

Alternatively, if it is answered in the negative, then at step 1906 a question is asked as to whether the acknowledgement number field 1212 is zero. If this question is answered in the affirmative then the ACK field is not set but an acknowledgement number is given. This indicates that the acknowledgement field does not contain a sequence number but indicates a new heartbeat rate, measured in milliseconds, and thus the heartbeat timing rate contained in the session data 804 is updated at step 1907. This process will be described further with reference to FIG. 42.

Following either of steps 1907 or 1905, or if either the question asked at step 1903 is answered in the negative or that asked at step 1906 is answered in the affirmative, then control is directed to step 1908, at which a question is asked as to whether the datagram contains streamed data, as indicated by the setting of STREAM field 1205. If this question is answered in the affirmative then the resend latency is recalculated at step 1909. Resend latency, in combination with connection latency, is used to estimate the age of data received, and is described further with reference to FIG. 41.

Following this, or if the question asked at step 1908 is answered in the negative, acknowledgements and state changes are processed at step 1910, as will be further described with reference to FIG. 21.

Finally the data 1106 is extracted at step 1911, as will be further described with reference to FIG. 23 and FIG. 24 and the datagram acknowledged at step 1912. The processing steps 1901 to 1910 relate only to the information contained within the MTP header 1105, much of which is not connected with the data in any way.

FIG. 20

Figure 20:
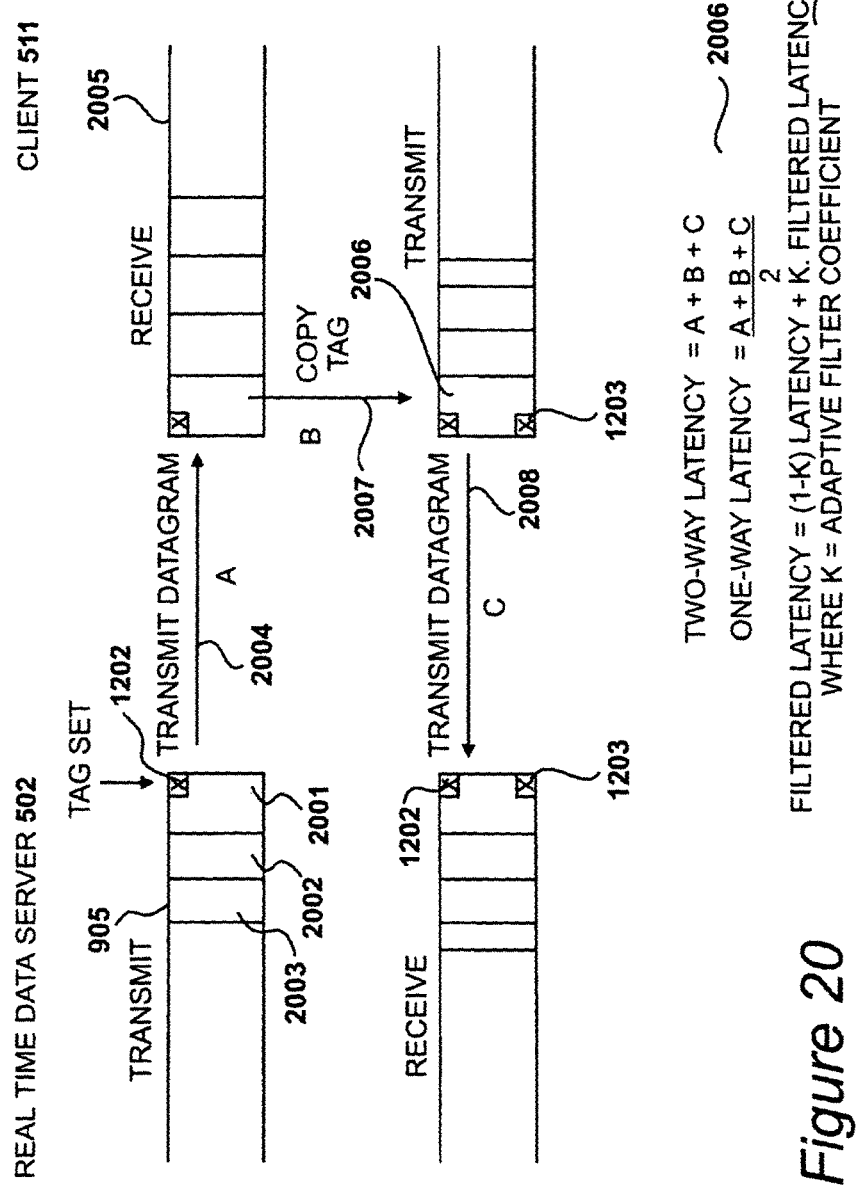
FIG. 20 illustrates the use of an MTP header field to measure connection latency.

FIG. 20 illustrates the use of the SYN field 1202 to measure connection latency. It is necessary that at all times the client terminals are aware of exactly how old the data is. This is not possible using traditional methods such as, for example, clock synchronisation, because there may be thousands of terminals. Thus the system described herein provides a method of measuring the connection latency between the RTDP 101 and each of its terminals.

A latency-measurement datagram is sent at regular intervals by setting the SYN field 1202 in an outgoing datagram in either transactional segment buffer 905 or streamed segment buffer 906 and noting the time at which it was sent. As an example, transactional segment buffer 905 is shown, containing several packets 2001, 2002 and 2003. The question asked at step 1805 is answered in the affirmative, to the effect that a latency measurement should be initiated, and so the SYN field 1202 of the next datagram to be sent, which is datagram 2001, is set.

Datagram 2001 takes a number of milliseconds, shown by arrow 2004 and identified by the variable A, to be transmitted to PDA 511, whose receive buffer 2005 is shown. A process running on PDA 511, which is substantially identical to process 1005, sets the SYN field 1202 and the ACK field 1203 in its next outgoing datagram 2006. This process takes a time indicated by arrow 2007 and identified by the variable B. Finally, transmission of datagram 2006 back to real time data server 502 takes a time indicated by arrow 2008 and identified by the variable C. When datagram 2002 is received at real time data server 502 the fact that both the SYN and ACK fields are set triggers latency calculation at step 1905.

The round trip time, which is obtained by comparing the receive time of datagram 2002 with the transmission time of datagram 2001, is equal to the sum of the variables A, B and C. Since network conditions are, on average, symmetric, A is assumed to be approximately equal to C. B is very small because it is possible to directly acknowledge packet 2001 without waiting for any out-of-order datagrams that would have to be received if the latency was measured using a cumulative acknowledgement, as with TCP. Thus, as shown by equation 2006, the two-way latency is approximately equal to the round trip time, and the one-way latency, or connection latency, is half the round trip time.

Having obtained a value for the round trip time, it is filtered using equations 2007. K is an adaptive filter coefficient that is varied in order to optimise the ability of the filtered latency to follow quick changes when these are consistently observed. Thus the filtered latency is equal to the sum of the following factors: K subtracted from one all multiplied by the measured latency; and K multiplied by the previous filtered latency calculation. Other filtering or weighting methods may be used in order to smooth the variability of the latency calculation.

The round trip time is used by both the server and the client to determine the length of time that should be waited for an acknowledgement before a transactional datagram is resent (timeout). Since streamed datagrams may be acknowledged using an extended acknowledgement, the time that a process waits before sending an extended acknowledgement is added to the latency value to produce the timeout for streamed datagrams. The constant measurement of the latency described above ensures that the timeout settings are as accurate as possible. A fixed timeout setting can be set too high, in which case the wait before resend would be too long, thus degrading the timeliness of the data, or it can be too low, resulting in too many resends. This dynamic timeout creates a compromise.

Thus data is transmitted in packets from the real time data server 502 to the PDA 511, and vice versa. A first data packet 2001 transmitted from real time data server 502 is modified to measure connection latency. This modified data packet is identified by PDA 511 and a second data packet 2006 sent from PDA 511 to real time data server 502 is also modified. Connection latency is determined at the real time data server 502 with reference to the time at which the real time data server 502 transmitted the first modified packet 2001, and the time at which the second modified packet 2006 was received.

Figure 41:
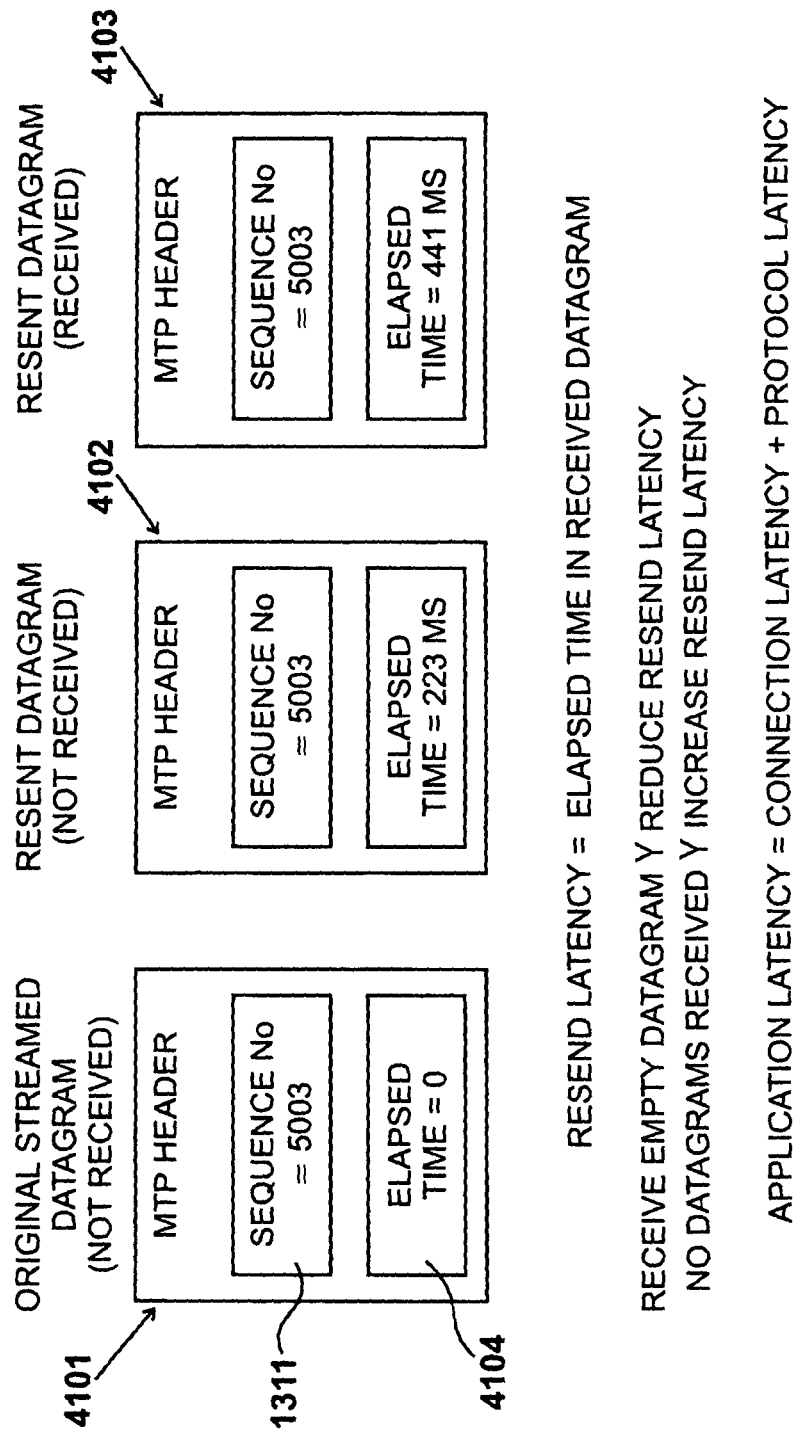
FIG. 41 illustrates the calculation of resend latency.

The round trip time may be halved to give a connection latency, which indicates the approximate time taken by a datagram to be sent from the server to the client. This value is used by the client to indicate the timeliness of received data, and will therefore be described further with reference to FIG. 41. Resend latency measurement, which will be described with reference to FIG. 41, is also calculated at both the client and the server end but in this embodiment is only used by the client. It will therefore not be discussed at this stage.

FIG. 21

Figure 21:
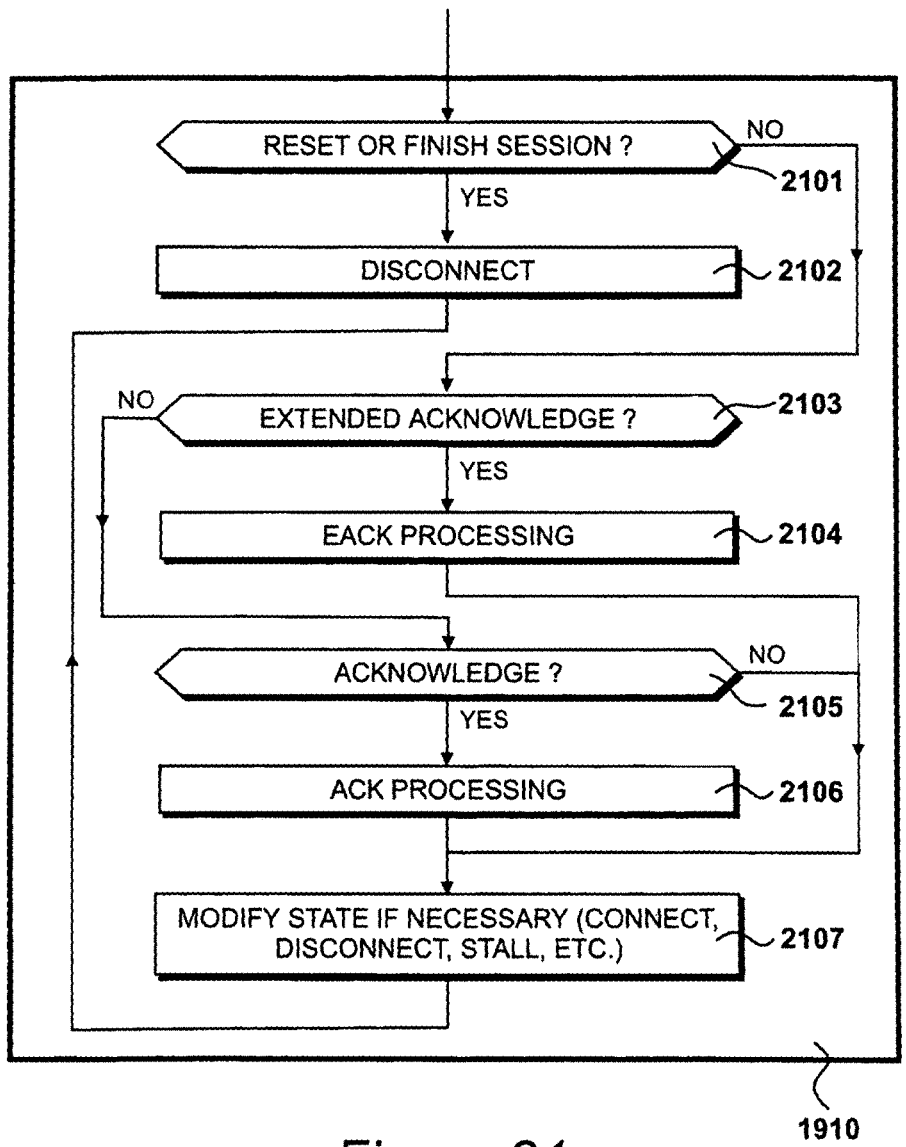
FIG. 21 details steps carried out during FIG. 19 to process acknowledgements and state changes.

FIG. 21 details step 1910 at which acknowledgements and state changes are processed. At step 2101 a question is asked as to whether the RESET field 1208 or FINISH field 1209 (as contained in the MTP header 1105 of the datagram received at step 1901) is set, indicating that the session should be reset or ended. If this question is answered in the affirmative then a disconnect takes place at step 2102. This concludes step 1910 if this route is taken.

If the question asked at step 2101 is answered in the negative then at step 2103 a question is asked as to whether EACK field 1204 is set, indicating that the datagram contains an extended acknowledge. If this question is answered in the affirmative then at step 2104 the extended acknowledgement is processed. If it is answered in the negative then at step 2105 a further question is asked as to whether ACK field 1203 is set, indicating that the datagram contains an acknowledgement. If this question is answered in the affirmative then at step 2106 the acknowledgement is processed by removing the datagram that has the sequence number contained in SEQUENCE NUMBER field 1211 from the relevant segment buffer 905 or 906. If it is answered in the negative, or following step 2104, the session state variables 902 for PDA 511 are modified if necessary.

FIG. 22

Figure 22:
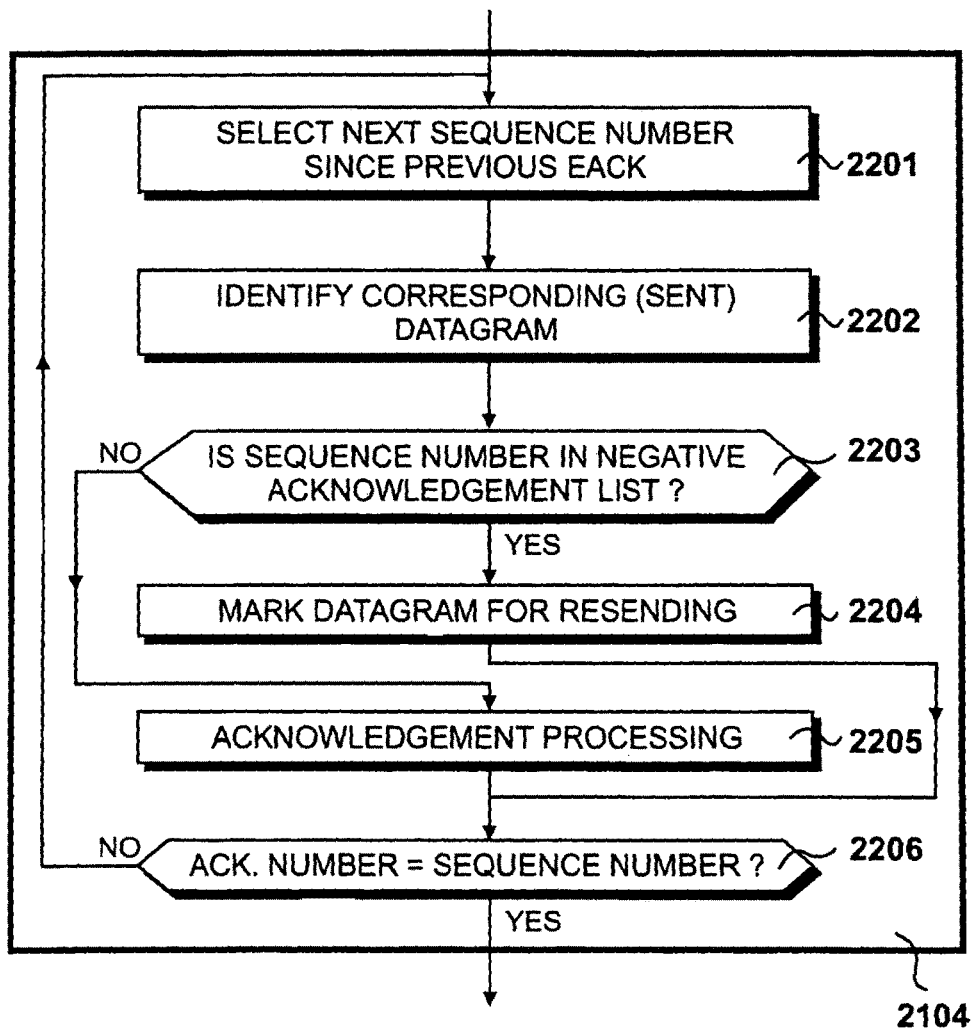
FIG. 22 details steps carried out during FIG. 21 to process an extended acknowledgement.

FIG. 22 details step 2104, at which an extended acknowledgement is processed. As described previously with reference to step 1804, an extended acknowledgement is in the form of a datagram with EACK field 1204 set, a streamed datagram sequence number contained in acknowledgement number field 1212, and possibly a list of streamed datagram sequence numbers that have not been received by PDA 511 as data 1106. Thus the process has a range of datagram sequence numbers to consider. This range starts at the number following the sequence number contained in the last extended acknowledgement and finishes at the number contained in the extended acknowledgement currently being considered.

Thus at step 2201 the first sequence number in this range is selected. At step 2202 the streamed datagram corresponding to this sequence number is identified and at step 2203 a question is asked as to whether the sequence number identified at step 2201 is in the list of negatively acknowledged datagrams contained in data 1106 of the datagram. If the question is answered in the negative then the sequence number is being acknowledged and this is processed at step 2205. If the question is answered in the affirmative then, since the identified datagram is still stored in its relevant segment buffer 905 or 906, it is marked to be resent at step 2204.

At step 2206 a question is asked as to whether the sequence number being considered is the same as the number contained in the acknowledgement number field 1212 of the datagram. If this question is answered in the negative then control is returned to step 2201 and the next sequence number is selected. If, however, it is answered in the affirmative, then the extended acknowledgement has been fully processed and step 2104 is completed.

FIG. 23

Figure 23:
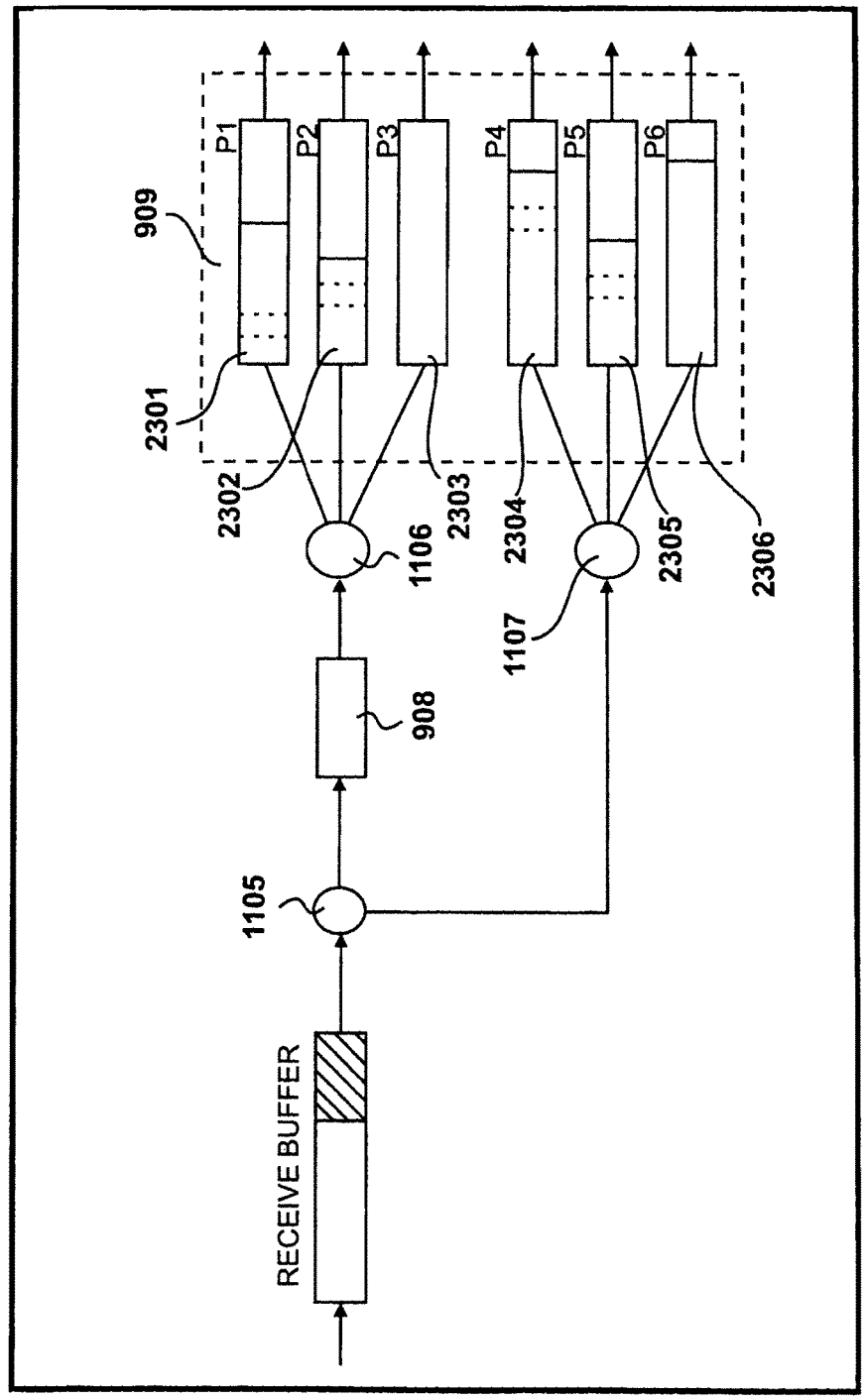
FIG. 23 illustrates the reception of a datagram.

FIG. 23 illustrates the reception of a datagram from PDA 511. A receive buffer is provided by the operating system 801, which supplies a datagram to receiving transactional segment buffer 908 or to process 1007, via process 1005. Once datagrams are ordered within transactional segment buffer 908, process 1006 decodes the level two message headers in the datagrams to split the data up and place it in the correct one of prioritised message queues 910. There are three transactional queues 2301, 2302, and 2303, corresponding to the message queues 1402 to 1404. Process 1007 performs the same function for streamed datagrams. There is no streamed segment buffer for incoming datagrams because there is no ordering necessary. There are three streamed queues 2304, 2305 and 2306. These correspond to the prioritised message queues 1405 to 1407. Once the data is placed in the queues, level one headers indicate to the applications that a message is complete and can be used.

In the alternative embodiment described with reference to FIG. 16, wherein mixing of the data is not used, only the transactional data need be ordered in the segment buffer 908. In this embodiment every streamed message is contained in a single datagram and so need not be ordered. If an old update arrives after a new one then the old one is simply discarded by the relevant application. However transactional data, which usually stretches over more than one datagram, must be ordered. The START and END fields 1206 and 1207 are used to indicate when a message is finished and can be transferred to the relevant message queue.

FIG. 24

Figure 24:
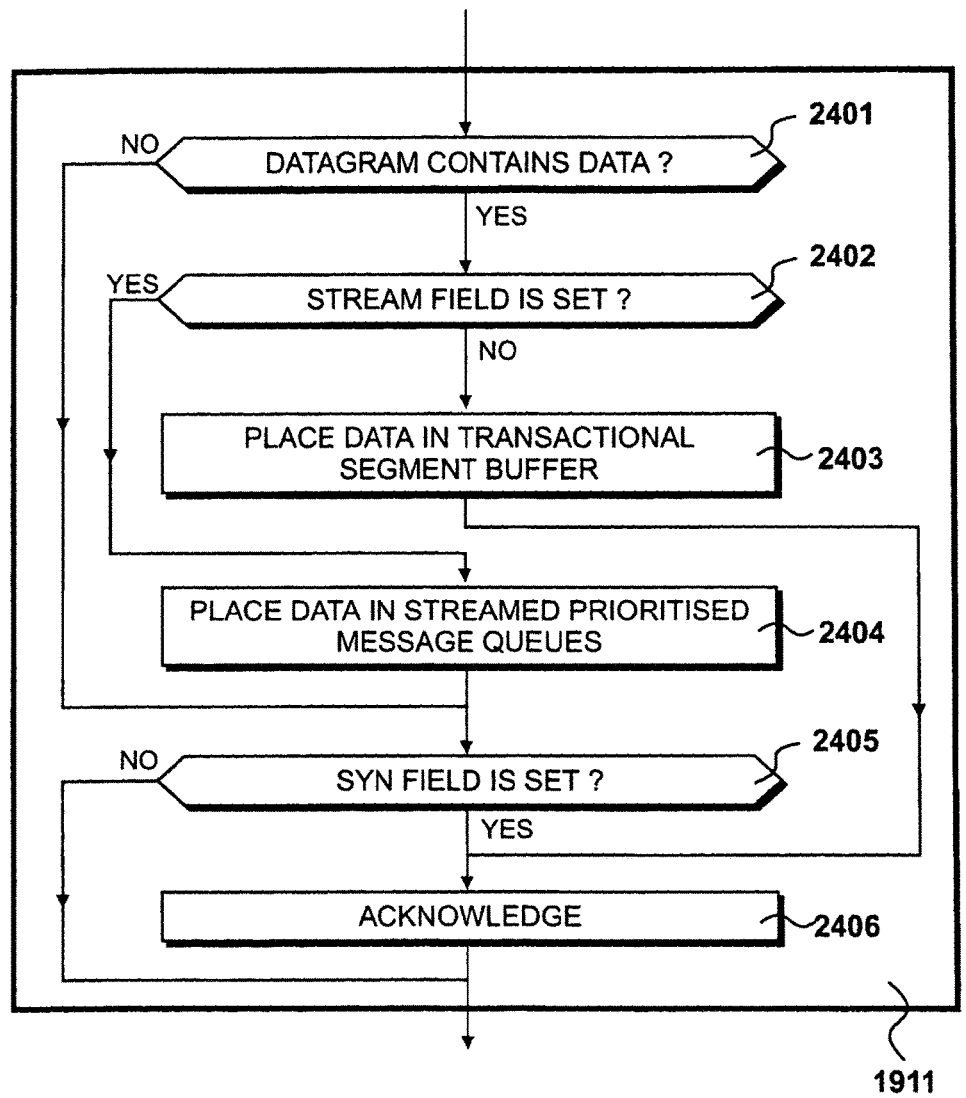
FIG. 24 details steps carried out during FIG. 19 to extract the data contained in a received datagram.

FIG. 24 details step 1911, at which the data contained in a received datagram is extracted and acknowledged. At step 2401 a question is asked as to whether the received datagram contains data in portion 1106. If this question is answered in the negative then a further question is asked at step 2402 as to whether STREAM field 1205 is set, indicating that the datagram contains streamed data. If this question is answered in the negative then at step 2403 the data is placed in transactional segment buffer 908, while if it is answered in the affirmative then the data is passed to process 1007 at step 2404.

Following step 2404, or if the question asked at step 2401 is answered in the negative, to the effect that the datagram contains no data, then a question is asked at step 2405 as to whether SYN field 1202 is set, indicating that the datagram is a latency measurement or heartbeat datagram. If this question is answered in the affirmative, or following step 2403, the datagram is immediately acknowledged at step 2406. This step involves flagging the sequence number in order that process 1003 acknowledges it in the next available outgoing datagram at step 1707 as described with reference to FIG. 18. (If there is no outgoing datagram, then an empty streamed datagram is created.) At this point, or if the question is answered in the negative, step 1911 is concluded. Thus transactional and latency-measurement datagrams are acknowledged immediately. Streamed datagrams are acknowledged using an extended acknowledgement, and empty datagrams that are not tagged, for example an acknowledgement containing no data, are not themselves acknowledged.

FIG. 25

Figure 25:
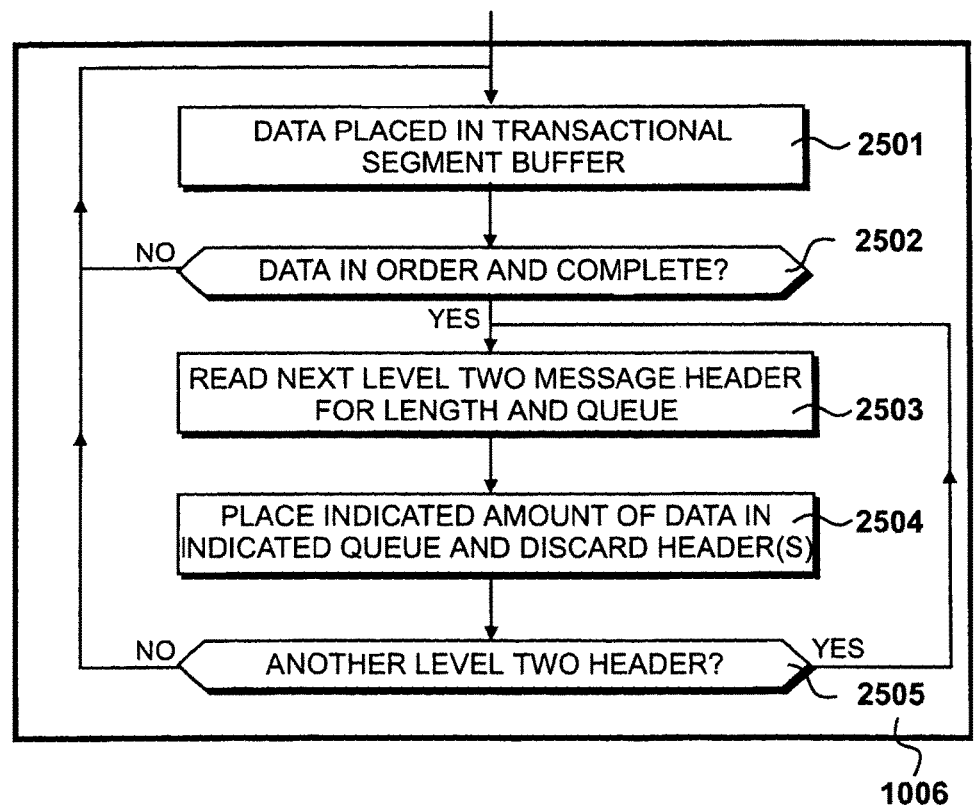
FIG. 25 details steps carried out during FIG. 10 to process datagrams placed in the transactional segment buffer.

FIG. 25 details process 1006 which processes the datagrams placed in the transactional segment buffer 908. At step 2501 a question is asked as to whether there is data in the transactional segment buffer, and if this is answered in the negative then the question is asked again until it is answered in the affirmative, when at step 2502 a question is asked as to whether the first datagram in the segment buffer has the next expected sequence number and is complete (as described with reference to FIG. 12, a datagram can be split over more than one datagram, and if this happens then the full set of datagrams must be received before they can be processed). If this question is answered in the affirmative then the datagram can be processed, and at step 2504 the first level two message header in the datagram is read to obtain the length of the data following it and the message queue into which it is to be placed. The indicated amount of data is then removed from the segment buffer and placed in the correct queue at step 2505, with the level two header and MTP header being discarded. At step 2506 a question is asked as to whether there is another level two header, and if this question is answered in the affirmative then control is returned to step 2504. If it is answered in the negative, or if the question asked at step 2503 is answered in the negative, to the effect that the next datagram in segment buffer 908 is not the next expected one, control is returned to step 2501 and the process waits for more data.

FIG. 26

Figure 26:
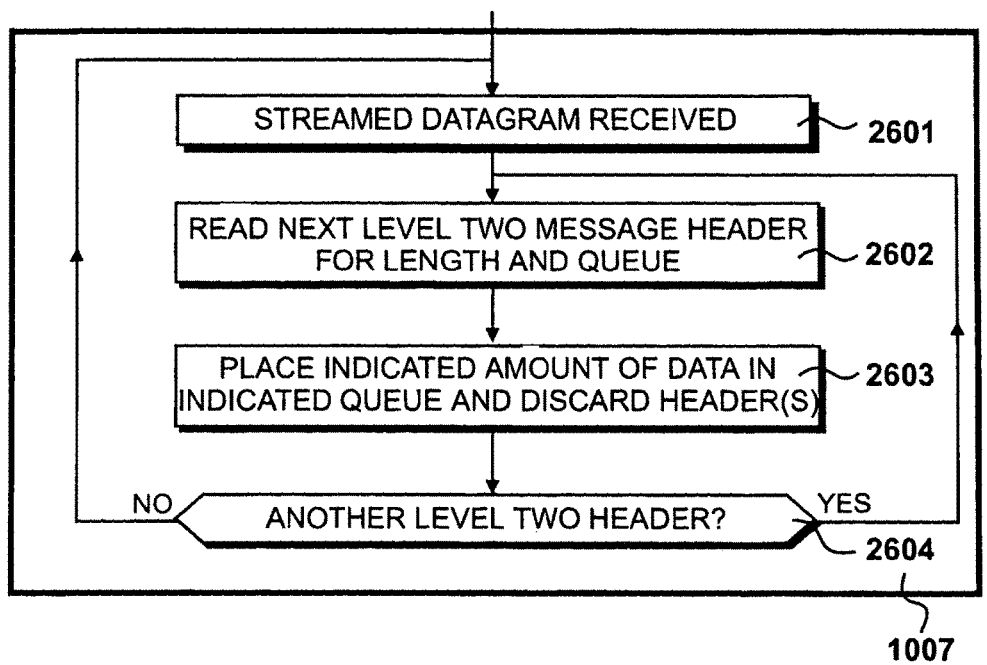
FIG. 26 details steps carried out during FIG. 10 to process incoming streamed datagrams.

FIG. 26 details process 1007, which processes incoming streamed datagrams. Since streamed datagrams do not have to be ordered, there is no necessity for an incoming streamed segment buffer. Thus at step 2601 a streamed datagram is received from process 1005, and at step 2602 the first level two message header in the datagram is read to obtain the length of the data following it and the message queue into which it is to be placed. The indicated amount of data is then removed from the datagram and placed in the correct queue at step 2603, with the level two header and MTP header being discarded. At step 2604 a question is asked as to whether there is another level two header, and if this question is answered in the affirmative then control is returned to step 2602. If it is answered in the negative, control is returned to step 2601 and the process waits for more data.

FIG. 27

Figure 27:
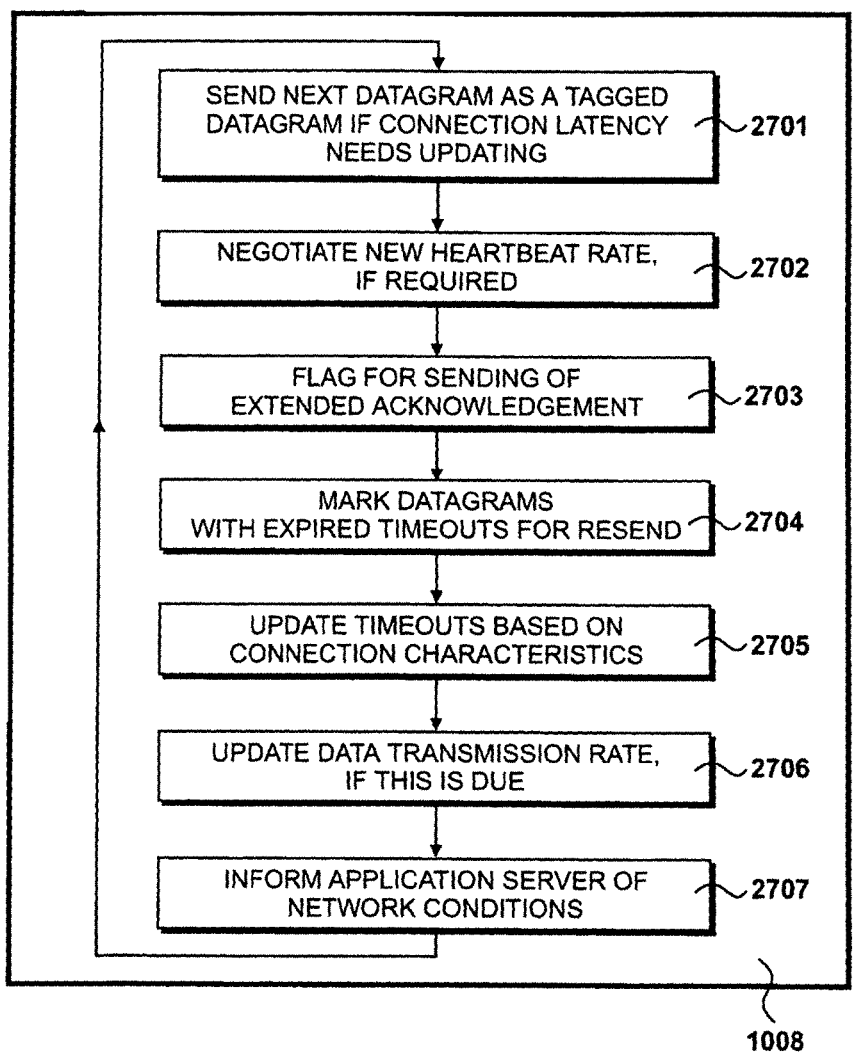
FIG. 27 details steps carried out during FIG. 10 to perform background processing.

FIG. 27 details background processing process 1008. (This process is suspended on the server if the session is stalled. It is never suspended on the client.) At step 2701 the process considers whether or not a latency-measurement datagram needs to be sent. If so, a flag is set which triggers the question asked at step 1805, as to whether such a datagram should be sent, to be answered in the affirmative. It also triggers the question asked at step 1702 as to whether a heartbeat datagram is needed, which is asked only if both segment buffers are empty, to be answered in the affirmative. Thus if there is an outgoing datagram at the point where a latency-measurement datagram is required, then that datagram has its SYN field 1202 set. However, if there is no outgoing datagram then process 1003 creates one at step 1703. This is referred to as a heartbeat, but it is also a latency-measurement datagram. (It is also possible to use the KAL field 1213 as a heartbeat. A datagram with this field set is not acknowledged and not used as a latency-measuring datagram, but merely indicates that the connection is open.)

At step 2702 the process negotiates a new heartbeat rate, if required. This is the maximum interval that should pass without data being sent on either the server or client side. If no data is sent, then a heartbeat datagram, which is an empty streamed datagram with the SYN field 1202 set, is sent. The server does not send heartbeats during stalling of a session. This is achieved by the suspension of process 1008 when a session is stalled. The negotiation of a heartbeat rate, although available to both client and server, is in this embodiment predominantly initiated by the client and will therefore be described with reference to FIG. 42.

At step 2703 the process flags the necessity for an extended acknowledgement, if one is due, which leads to the question asked by process 1003 at step 1803 being answered in the affirmative. At step 2704 the process marks for resending any datagrams that have not been acknowledged within a timeout, and are thus still within their respective segment buffer 905 or 906. This is done by flagging the datagram for resending, and it also increments the value in resend field 1119 by one, to indicate the number of times the datagram has been resent.

At step 2705 the process updates the timeouts based on connection characteristics. The timeout for a transactional datagram is equal to (or slightly larger than) the round trip time calculated at step 1905. The timeout for a streamed datagram is equal to (or slightly larger than) the round trip time calculated at step 1905 plus the time that the process will wait before sending an extended acknowledgement.

At step 2706 the process recalculates the data transmission rate, if necessary. This recalculation is done at specified intervals, and thus may not be carried out on every cycle.

At step 2707 the process sends an update of network characteristics to the application server, for use by the applications. In this embodiment this update includes the amount of data currently being sent per second (in datagrams or in bytes), the amount of data in the segment buffer that has the most data, or alternatively in both segment buffers, and the round trip time; in other embodiments the update could include more or less information.

Control is then returned to step 2701 and the process cycles until terminated.

FIG. 28

Figure 28:
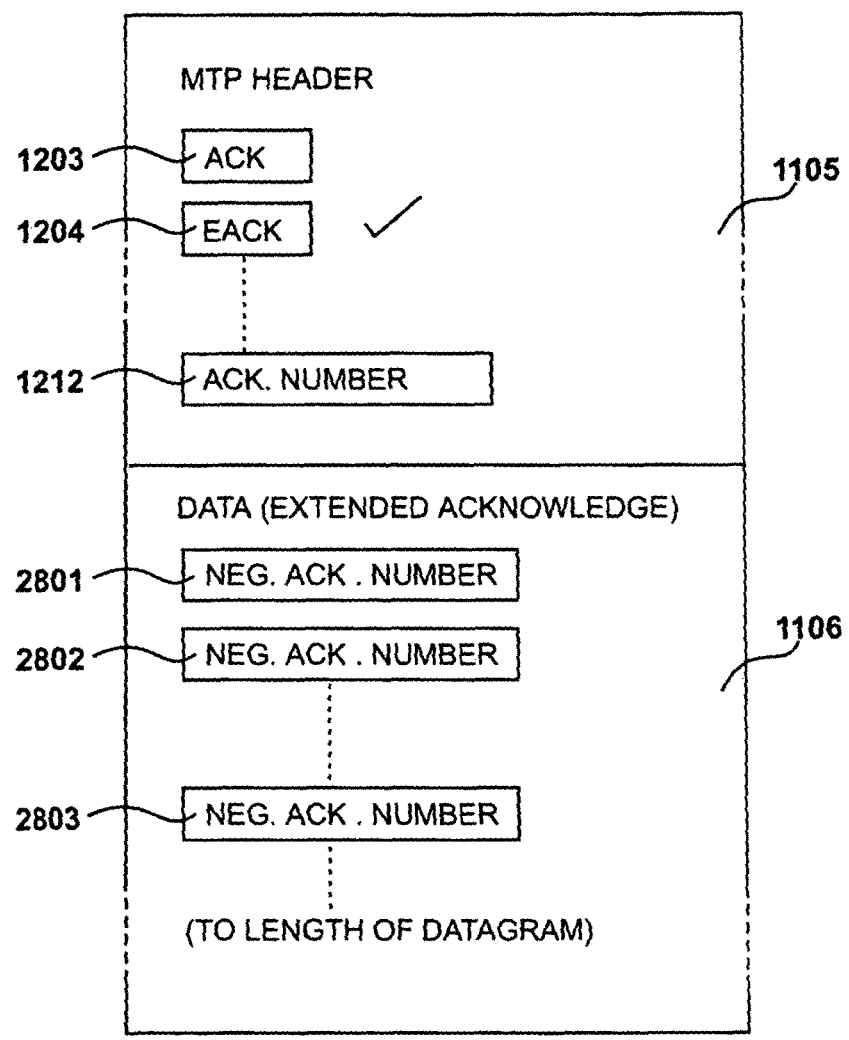
FIGS. 28 and 28A illustrate an extended acknowledgement.

FIG. 28 illustrates an extended acknowledgement. The MTP header 1105 and data 1106 of a datagram are shown. In the header 1105 the EACK field 1204 is set. The acknowledgement number field 1212 contains the sequence number of the most recent streamed datagram received. The data portion 1106 contains a list of sequence numbers 2801, 2802 and 2803 that are lower than the number contained in field 1212 but which have not been received. The datagrams corresponding to these numbers are therefore negatively acknowledged.

FIG. 28A

Figure 28A:
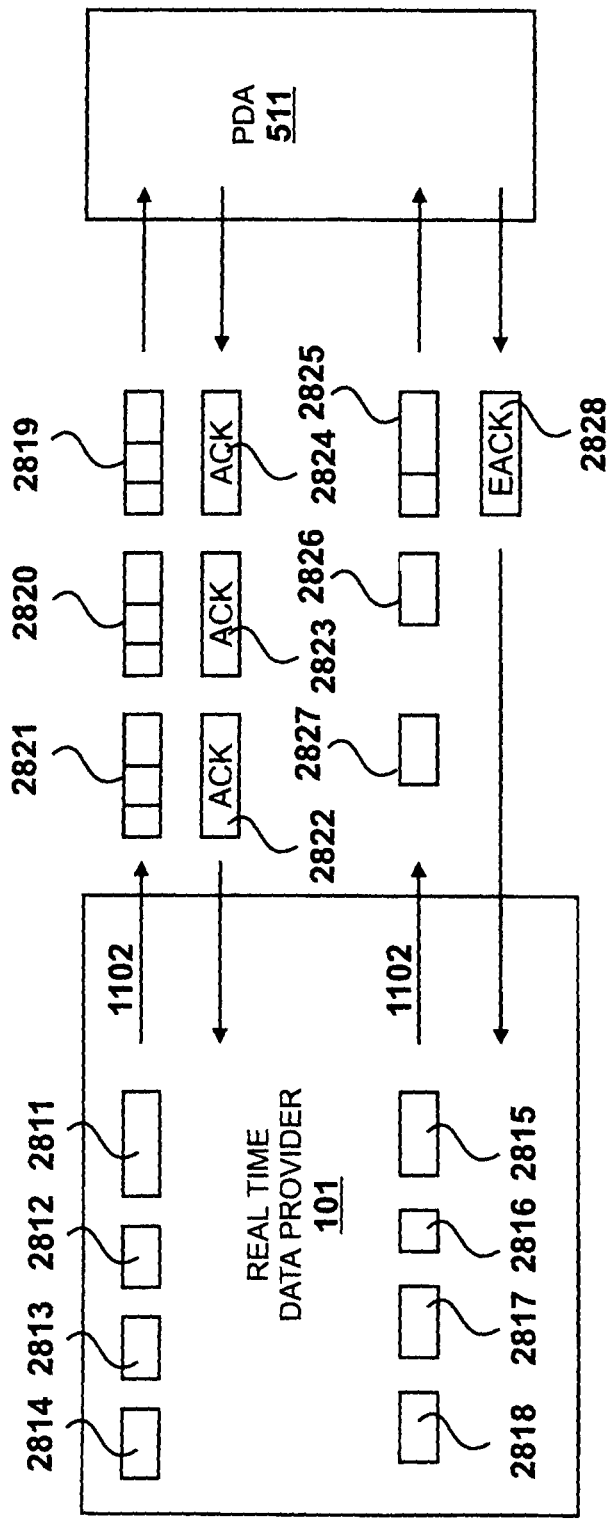

FIG. 28A illustrates two of the different ways in which transactional and streamed data is treated. The word data is herein applied to all kinds of data, including the information received from feeds 503 to 507, the messages containing the information produced by application server 501 and the datagrams that contain a part or whole of these messages produced by real time data server 502, the messages received by a terminal and the information displayed by that terminal to the user.

Application server 501, part of real time data provider 101, produces transactional messages 2811, 2812, 2813 and 2814 and streamed messages 2815, 2816, 2817 and 2818. Process 1102 on real time data server 502 sends these messages to a terminal such as PDA 511 in the form of datagrams. Transactional messages 2811 to 2814 are split and sent as part of datagram 2819, 2820 and 2821. For example, datagram 2819 may consist of a part of message 2811, a part of message 2812 and a part of message 2814. Streamed messages 2815 to 2818 are not split. Thus datagram 2825 consists of the whole of messages 2815 and 2816. Datagram 2826 consists of message 2817. The whole of message 2818 cannot also fit into the datagram, and so it is sent even though it is not at the maximum size. Datagram 2827 contains message 2818. Thus transactional messages may be split over at least two datagrams, while streamed messages must be contained within a datagram.

Another difference in the treatment of transactional and streamed data is the method of acknowledgement. Thus each of transactional datagrams 2819 to 2821 is individually acknowledged using acknowledgements 2822, 2823 and 2824. However, streamed datagrams 2825 to 2827 may be acknowledged by PDA 511 using a single extended acknowledgement 2828, unless they are control datagrams that have a field such as SYN 1202, RESET 1208 or FINISH 1209 set, in which case they are individually acknowledged.

FIG. 29

Figure 29:
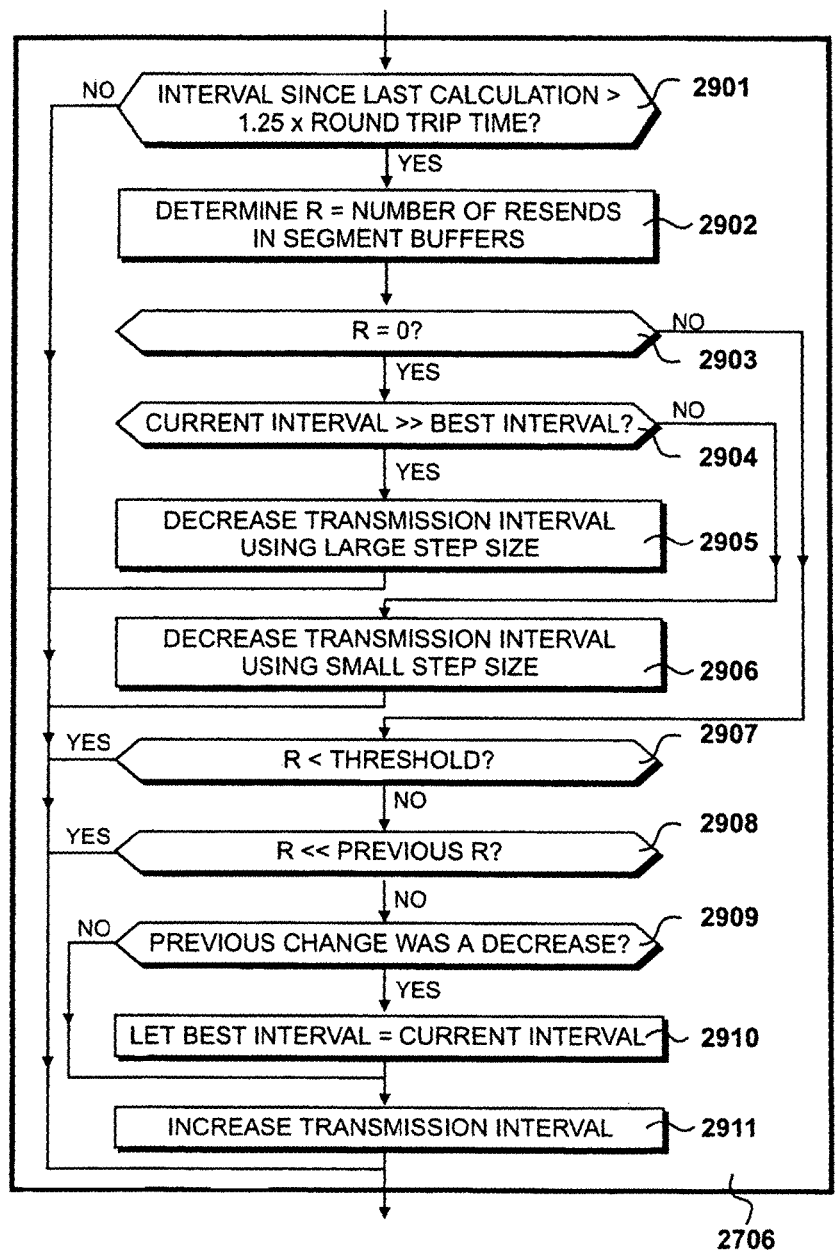
FIG. 29 details steps carried out during FIG. 27 to update the datagram transmission rate.

FIG. 29 details step 2706, at which the data transmission rate is calculated by updating the transmission interval (the time that process 1003 waits after sending a datagram before sending another datagram). Although each of the streamed and transactional data being sent from the RTDP 101 to each of its clients is relatively small in data terms, it must be provided in a timely fashion. Congestion should therefore be avoided. Existing protocols such as TCP merely react to congestion rather than preventing it, and as shown in FIG. 4 have a very slow restart when a connection is cut off.

This problem is solved by having a separate transmission rate for each terminal, and constantly monitoring each of these rates to keep it optimum. Thus at step 2901 a question is asked as to whether the interval since the last update is less than the product of 1.25 and the round trip time calculated at step 1905. If this question is answered in the negative then it is not yet time to perform the calculation and step 2706 is concluded. This is because the effect of a previous update to the transmission rate is not felt until at least one round trip time later, and thus the calculation interval is a small amount more than the round trip time—a quarter of the round trip time in this embodiment.

However, if the question is answered in the affirmative then at step 2902 the total number of resends in the streamed segment buffer 906 is determined and set as the value of a variable R. The number of resends is a sum of the number of datagrams in the buffer that are tagged to be resent, with an indication that a datagram is on its second resend adding two to the total, an indication that a datagram is on its third resend adding three to the total, and so on.

At step 2903 a question is asked as to whether the value of R is zero, meaning that there are no datagrams in the buffer that are being resent. This indicates that the rate of transmission can be increased. Thus if this question is answered in the affirmative then a further question is asked at step 2904 as to whether the current interval between transmissions is significantly larger than a value saved as the "current best interval". If this question is answered in the affirmative then the transmission interval is decreased by a first, larger amount at step 2905, while if it is answered in the negative then the transmission interval is decreased by a second, smaller amount at step 2906. This means that when the transmission interval is much larger than the last known achievable interval, the transmission interval is decreased much faster than when it is close to it.

If the question asked at step 2903 is answered in the negative, to the effect that R is not zero, then at step 2907 a question is asked as to whether R is less than a certain threshold. If this question is answered in the affirmative then the transmission rate is not changed. If, however, it is answered in the negative then a further question is asked at step 2908 as to whether R is significantly smaller than the previous value of R. If this question is answered in the affirmative then the rate is not altered, even though R is above the threshold, because this value of R may be an anomaly.

If R is above the threshold and not significantly smaller than the previous R, then this indicates that there are too many resends and the interval between datagram transmissions needs to be increased. However, first a question is asked at step 2909 as to whether the last change in the interval was a decrease. If this question is answered in the affirmative then the current transmission interval is the lowest known achievable interval at the current time, and so it is saved as the current best at step 2910. The transmission interval is then increased at step 2911 (the step size used in this embodiment is larger than both of the step sizes used for decreasing the transmission interval).

The algorithm described herein is a robust method of attempting to increase the rate of datagram transmissions while minimising the number of resends, using continual and rapid adjustment. It provides a quick response to decreases in the available network bandwidth and a fast restart when transmission is temporarily cut off or after a congestion spike. Clearly the implementation details of the algorithm, such as the number of step sizes and what is meant by "significantly large" could be changed.

In this embodiment, due to the small receive buffer of PDA 511, it is only possible to send one datagram at a time. However, in other embodiments, the method could be altered by sending more than one datagram at once when the transmission interval reaches a certain low threshold. It can be more efficient to send two packets at once at a larger interval than to continue decreasing the transmission interval.

Additionally, in another embodiment it could be the transactional segment buffer or both segment buffers that are considered when summing the resends.

FIG. 30

FIG. 30 details process 1009, which performs session maintenance. This process notes certain information available in the headers of datagrams as they arrive and maintains the client sessions accordingly, but does not interfere with the processing of the datagrams. Thus at step 3001 a datagram is received, and at step 3002 a question is asked as to whether the datagram header contains valid session details, for example session number, encryption and so on.

If this question is answered in the negative, meaning either that the datagram has no session number or that it contains invalid session details, then at step 3003 a further question is asked as to whether the datagram is requesting a new session, indicated by the lack of a session number and the setting of SYN field 1202. If this question is answered in the affirmative then at step 3004 a new session is created for the client that sent the datagram. This includes creating session data 803 and validating the new session, i.e. checking whether a valid account number for an active account, valid name and correct password have been supplied, and is in practice performed by calling a subroutine on application server 501, on which the user details are stored.

An answer in the negative to the question asked at step 3003 means that there is a problem of some kind with the datagram, for example it relates to a terminated session or the session details do not match, and so the session is ended at step 3012 by sending a reset datagram (a datagram in which the RESET field 1108 is set) to the originating IP address and removing the session data, if there is any.

If the question asked at step 3002 is answered in the affirmative, to the effect that the session details are valid, then a further question is asked at step 3005 as to whether the IP address from which the datagram was sent matches the IP address held in the session variables. If this question is answered in the negative then at step 3006 the IP address is updated in the session variables. The client could change IP addresses for a number of reasons. The main ones are that a client that has moved between networks or cells, thus changing its mobile IP address, or that a client deliberately terminated its IP connection in order to fully use bandwidth for another function, for example to make a telephone call. In this case the client would probably be assigned a different IP address on reconnection, even if it is in the same cell of the same network. However, this functionality of MTP allows the client to immediately restore the session without visible delay to the user.

At step 3007 a question is asked as to whether the datagram is terminating the session, indicated by a setting of FINISH field 1209. If this question is answered in the affirmative then the session is ended at step 3012, but if it is answered in the negative then at step 3008 a question is asked as to whether another datagram has been received for this session within two timeouts and if is answered in the affirmative then control is returned to step 3001. This timeout is different from the resend timeouts discussed with reference to FIG. 27, and is set by the heartbeat rate. The heartbeat rate is the maximum interval which should pass without receiving data from a client.

Thus, if the question is answered in the affirmative, indicating that since the receipt of the last datagram a period of time equal to two timeouts has passed with no further communication from the client, then at step 3009 the session is placed in a stalled state. This involves noting in the session variables that the session is stalled, which prevents any more datagrams from being sent to the client. In this embodiment, this involves suspending datagram reception process 1104 and background processing process 1109. A stalled session can occur because the network connection to the client has been broken, because the PDA 511 does not currently require the real time data and has therefore stopped communicating, because the PDA 511 has been switched off without ending the session, and so on.

At step 3010 a question is asked as to whether a datagram has been received for this session within ten minutes of the session being placed in a stalled state, and if this question is answered in the affirmative then the stall is ended and control is returned to step 3001. Ending a stall involves changing the session state and restarting any suspended processes. This will then have the effect of resending any datagrams that have not been acknowledged. However, in an alternative embodiment the streamed data buffer 906, and possibly the streamed message queues 1405 to 1407, could be flushed on the ending of a stall.

If, however, the question asked at step 3010 is answered in the negative then at step 3012 the session is ended. The session is closed after a long stall firstly for security measures, because the user may have left his terminal unattended, and secondly to prevent memory space being used for an unwanted session, for example if the terminal has been switched off.

Stalling as described above solves the problem with spoofing—that on reconnection the telecoms gateway sends a large amount of data all at once to the terminal, thus negating any value obtained by managing data transmission rate as described with reference to FIG. 29. Instead, when the connection is broken and the real time data server 502 stops receiving datagrams from PDA 511 the session is stalled and the real time data server 502 sends no more datagrams. Thus the telecoms gateway builds up a very small amount of data, if any, to send on when the connection is re-established.

The second problem solved here is the maintenance of a session when the PDA 511 moves between cells in a telecoms network or indeed between networks. As soon as an incoming datagram that has the correct session ID and encryption but a different IP address is received, the IP address in the session data 804 is immediately updated so that datagrams intended for PDA 511 are sent to that IP address. The user therefore perceives very little, if any, delay when moving between IP addresses.

FIG. 30A

Figure 30A:
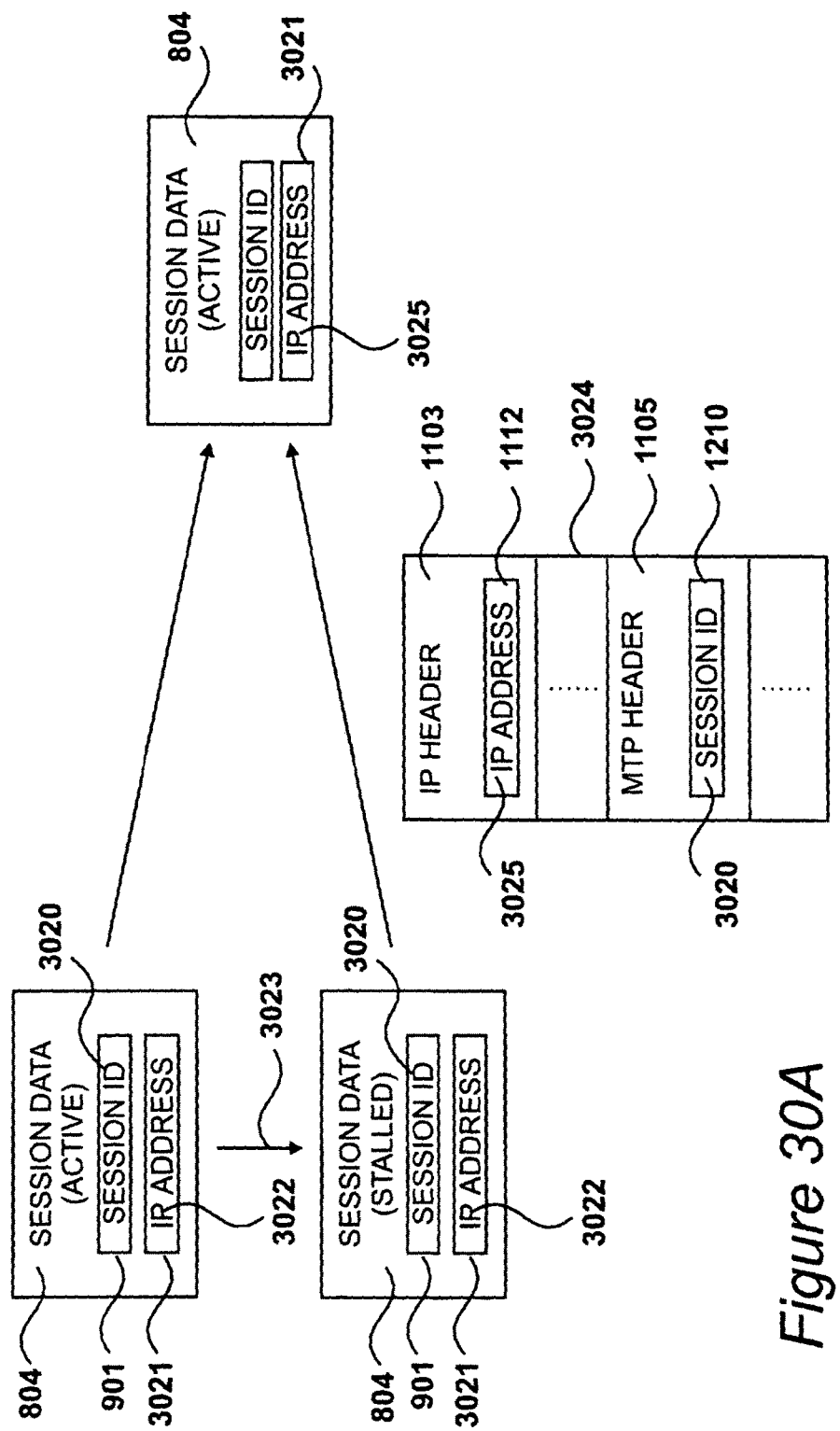

The updating of IP addresses described with respect to step 3006 is illustrated in FIG. 30A. A session is described by its session data 804 stored on application server 501. It includes a session ID field 901 containing a session ID 3020 and an IP address field 3021 containing an IP address 3022. The session may be in an active state or may move to a stalled state, as shown by arrow 3023, when no communication is received from the client within two timeouts as set by the heartbeat rate.

A datagram 3024 is received by real time data server 502. It includes a source IP address field 1112 in its IP header 1103 and a session ID field 1210 in its MTP header 1210.

The session ID 3020 matches the session ID in field 901. However, the IP address 3025 does not match the IP address 3021 in the IP header 3022. The session data 804 is therefore updated immediately by replacing the IP address in field 3021 with IP address 3025. All datagrams produced are now sent to this new address. Receipt of datagram 3024 also ends any stall, if one existed, and so the session is shown as active.

FIG. 31

Figure 31:
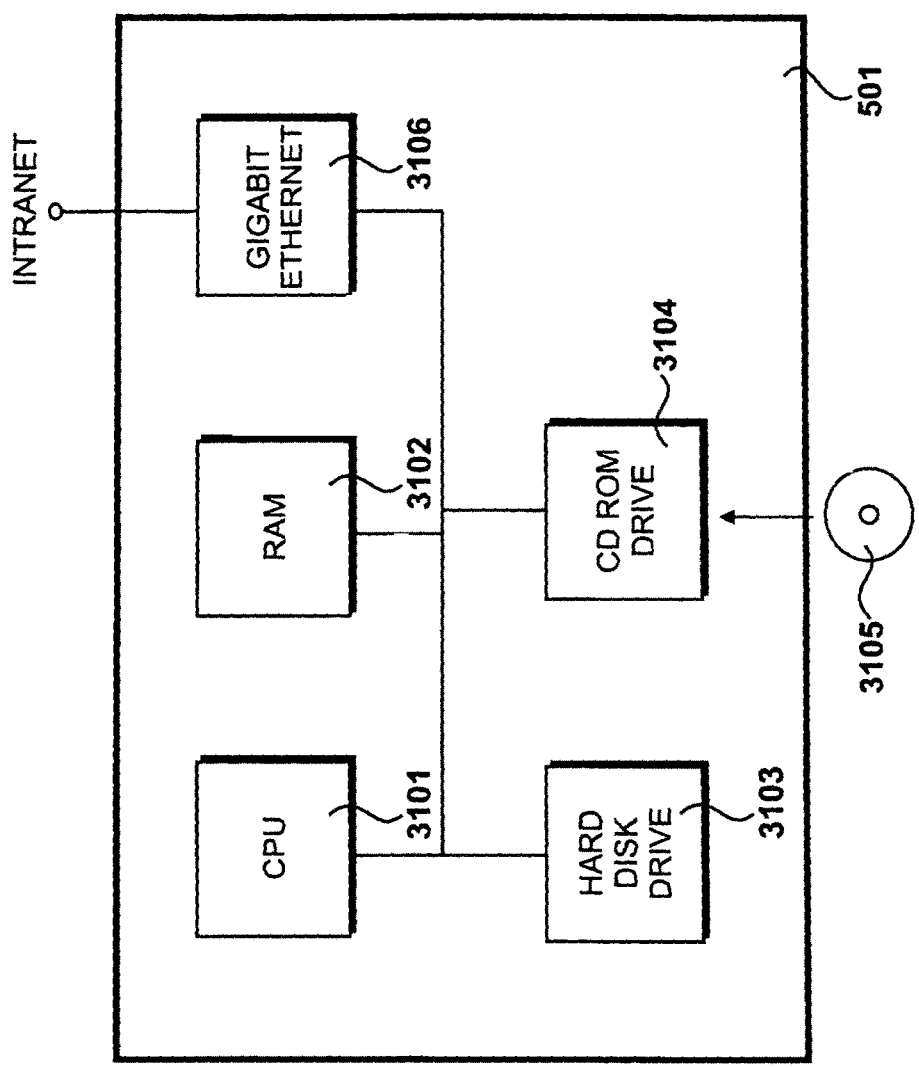
FIG. 31 details an application server shown in FIG. 5.

FIG. 31 details application server 501. It comprises a central processing unit (CPU) 3101 having a clock frequency of 3 GHz, a main memory 3102 comprising 2 GB of dynamic RAM and local storage 3103 provided by a 130 GB disk array. A CD-ROM disk drive 3104 allows instructions to be loaded onto local storage 3103 from a CD-ROM 3105. A Gigabit Ethernet card 3106 facilitates intranet connection to the real time data server 502 and the feeds 503 to 507.

FIG. 32

Figure 32:
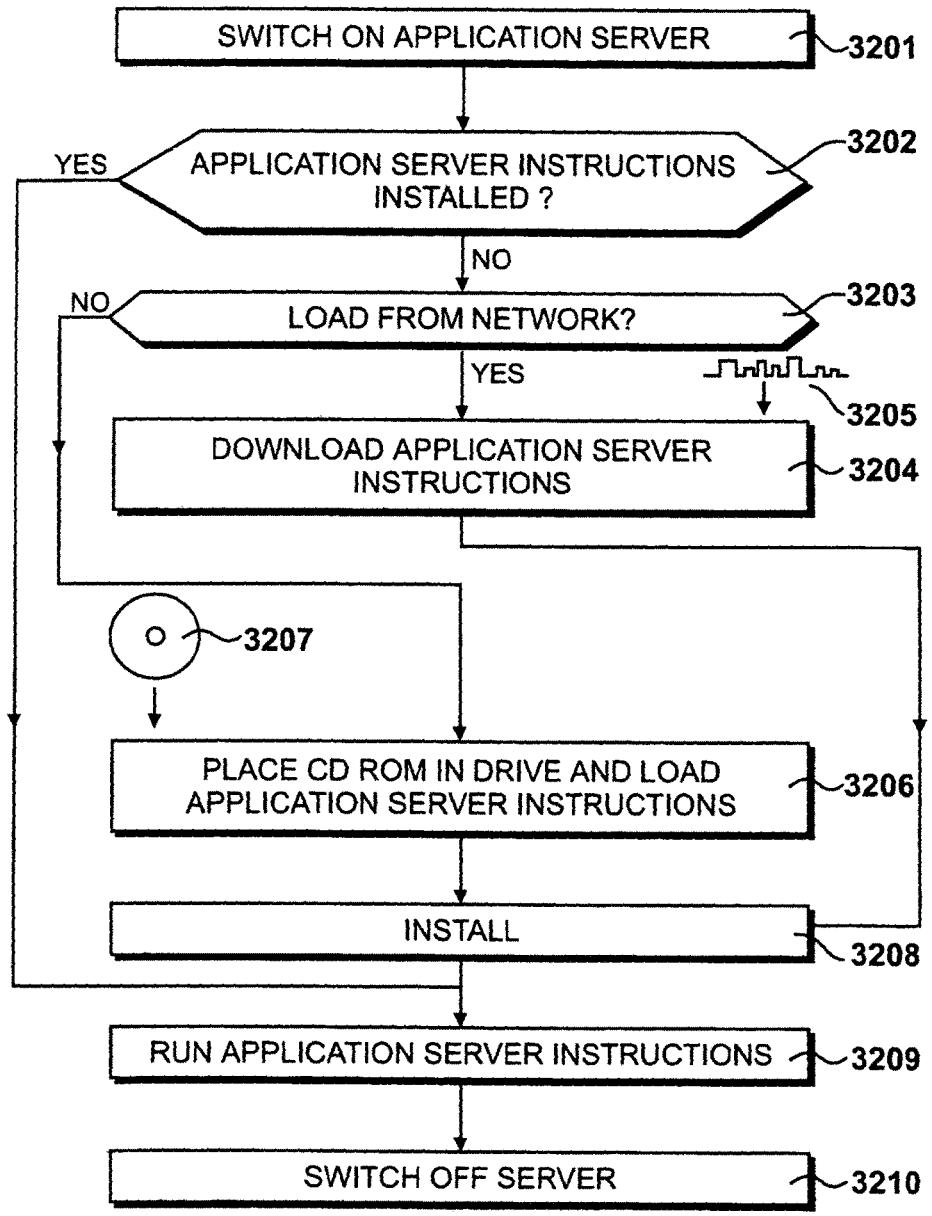
FIG. 32 details steps carried out by the application server shown in FIG. 31.

FIG. 32 details steps carried out by application server 501. At step 3201 the application server 501 is switched on and at step 3202 a question is asked as to whether the necessary instructions are already installed. If this question is answered in the negative then at step 3203 a further question is asked as to whether the instructions should be loaded from the intranet. If this question is answered in the affirmative then at step 3204 the instructions are downloaded from a network 3205. If it is answered in the negative then at step 3206 the instructions are loaded from a CD-ROM 3207.

Following either of steps 3204 or 3206 the instructions are installed at step 3208. At this point, or if the question asked at step 3202 is answered in the negative, the instructions are executed at step 3209. At step 3210 the application server is switched off. In practice this will happen very infrequently, for example for maintenance.

FIG. 33

Figure 33:
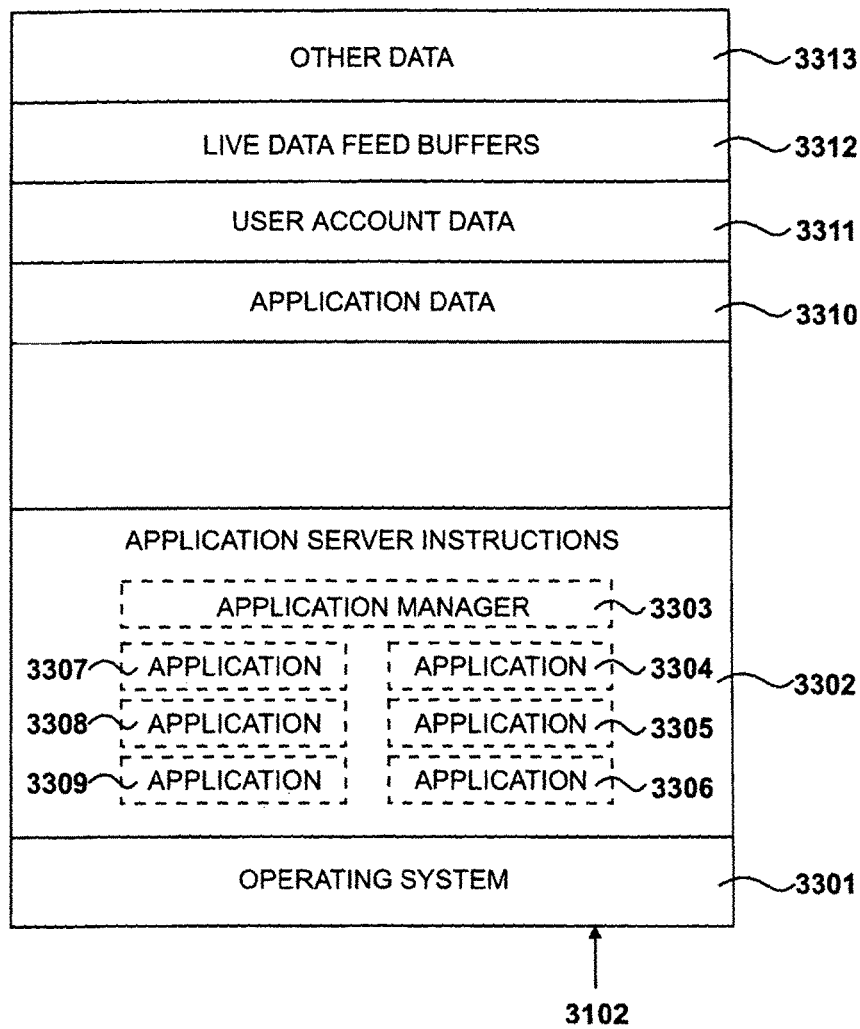
FIG. 33 details the contents of the memory shown in FIG. 32.

FIG. 33 details the contents of memory 3002 during the running of application server 501. An operating system 3301 provides operating system instructions for common system tasks and device abstraction. The Windows™ XP™ operating system is used. Alternatively, a Macintosh™, Unix™ or Linux™ operating system provides similar functionality. Application server instructions 3302 include an application manager 3303 and applications 3304, 3305, 3306, 3307, 3308 and 3309, including an application for each of data feeds 503 to 507. Application data 3310 is data used by the applications 3304 to 3309 and user account data 3311 comprises details of users' accounts, including the validation data information required when starting a session. Live data feed buffers 3312 are buffers for feeds 503 to 507. Other data includes data used by the operating system and application server instructions.

FIG. 34

Figure 34:
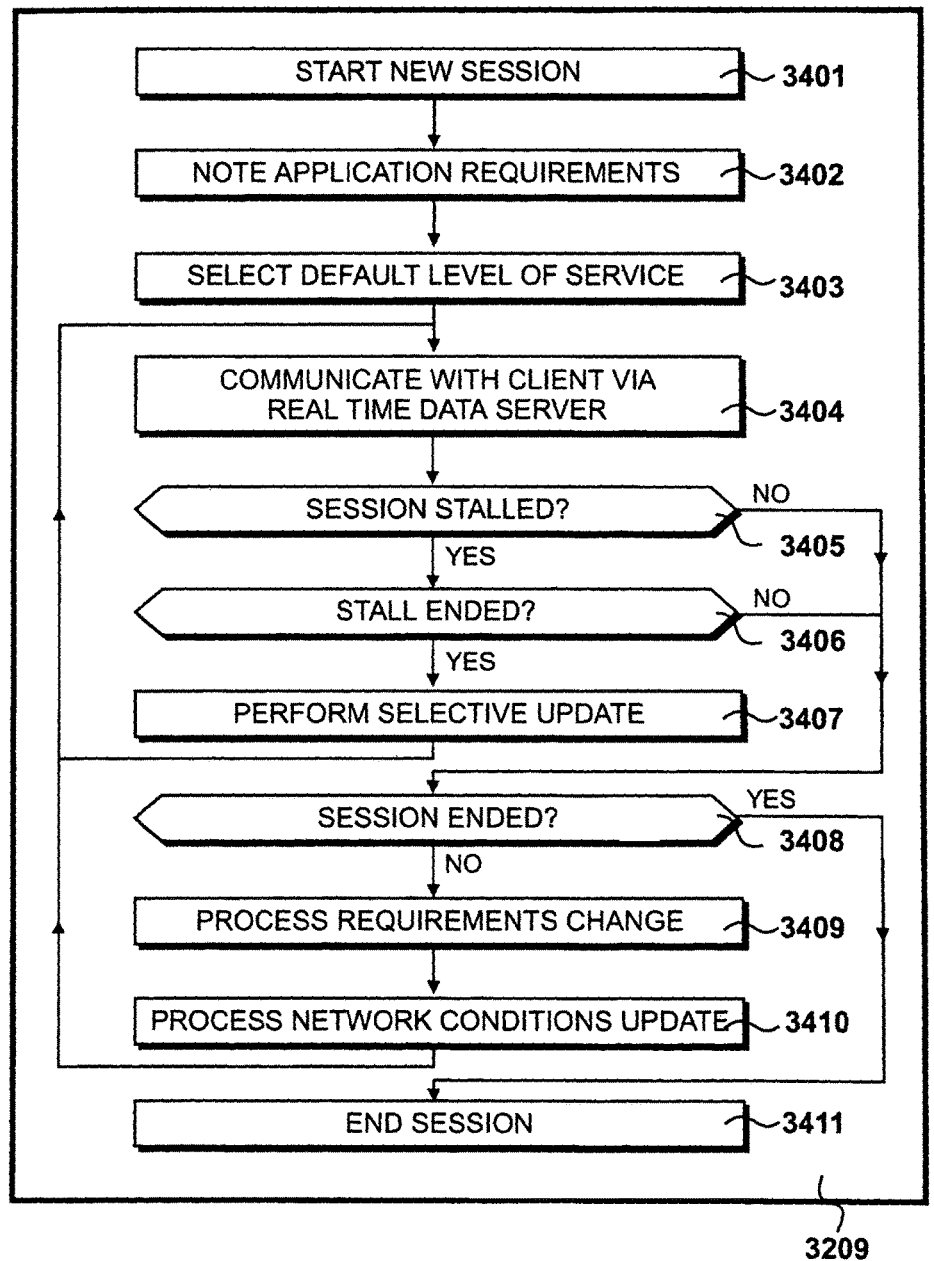
FIG. 34 details instructions executed by a process shown in FIG. 32.

FIG. 34 details the instructions executed by application manager 3303 at step 3209. At step 3401 a client logs on successfully to start a session, and at step 3402 the user's application requirements, as stored in his account, are noted. These include the exact data in which the user is interested, for example stocks updates and news stories. At step 3403 a default level of service is selected, which is also retrieved from the user account. Levels of service will be discussed further with reference to FIG. 36.

At step 3404 the application server 501 communicates with the client via real time data server 502 by sending messages. The content of these messages is determined by the user's application requirements and the current level of service.

At step 3405 a question is asked as to whether the session is stalled, which will be indicated to the application server 501 by real time data server 502, and if this question is answered in the affirmative then at step 3406 a question is asked as to whether the stall has ended. If this question is answered in the affirmative then at step 3407 a selective update of data is performed and control is returned to step 3404. While the session is stalled, the application server 501 does not send any messages to real time data server 502.

If either of the questions asked at steps 3405 or 3406 is answered in the negative, to the effect that the session is not stalled or that the stall has not ended, then at step 3408 a further question is asked as to whether the session has ended. If this question is answered in the affirmative then the session ends at step 3411. If, however, it is answered in the negative then at step 3409 any change in application requirements received from the client via real time data server 502 is processed, and at step 3410 any received network conditions update is processed to change the level of service, if necessary. Control is then returned to step 3404.

Although this process is described here in terms of a single client and session, the skilled user will appreciate that step 3209 involves application server 501 performing these steps for every session.

FIG. 35

Figure 35:
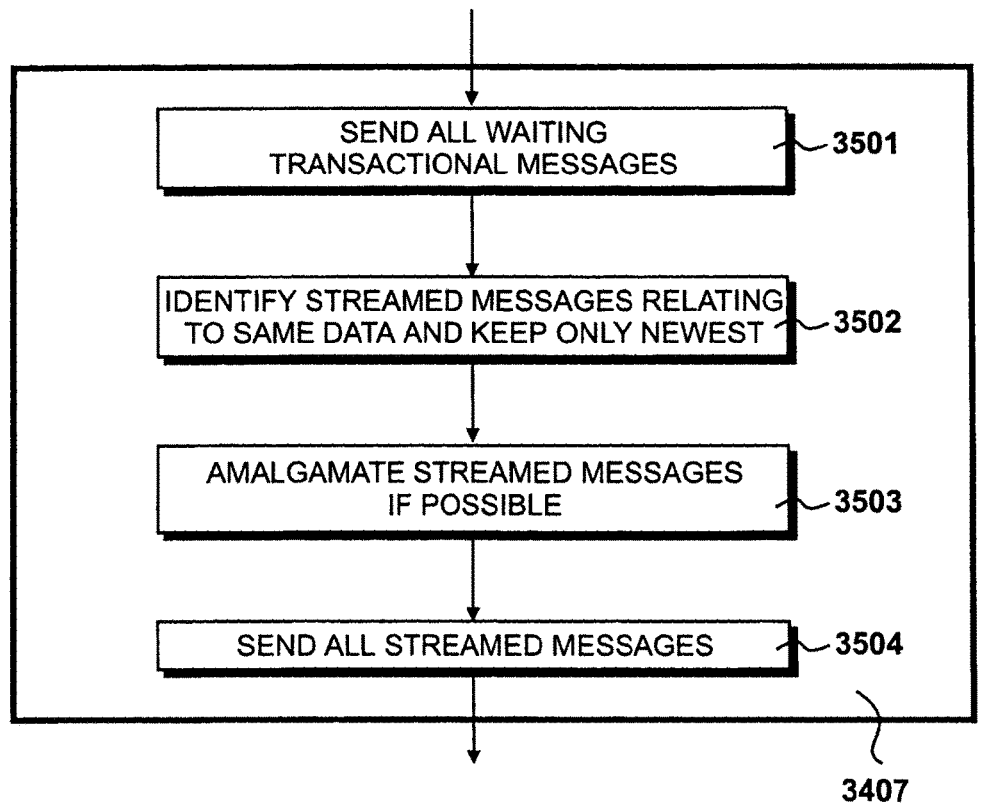
FIG. 35 details steps carried out during FIG. 34 to send a selective update.

FIG. 35 details the selective update performed at step 3407. At step 3501 all waiting transactional messages are sent. At step 3502 the waiting streamed messages are examined to identify messages that relate to the same data. If any are found, then the older ones are deleted. This means that if during a stall two or more updates have been produced for the same data, as is particularly likely with stock prices, then only the newest update is sent. At step 3503 concatenation of messages is performed if possible. This means that updates for data that have the same priority level could be amalgamated into one message, instead of being sent as individual messages. Finally, at step 3504, the streamed messages are sent.

Thus, on a selective update, transactional messages are all sent, whereas only the newest streamed data is sent in order to avoid overloading the network and the client.

FIG. 36

As described with respect to FIG. 27, the real time data server 502 periodically supplies to application server 501 updates of certain network condition indicators, which in this example comprise the current effective bandwidth, given by the amount of data being sent per second, the amount of data in one or more buffers, and the current round trip time. (In this sense, network includes the real time data server and the client, as well as the Internet, mobile telephony network or LAN, or any other networks in between.) The values of these indicators provide to the application server 502 information regarding the amount of data that can be sent to this client. The applications 3304 to 3309 then use this information to determine how much information of what type should be sent and at what speed.

Figure 36:
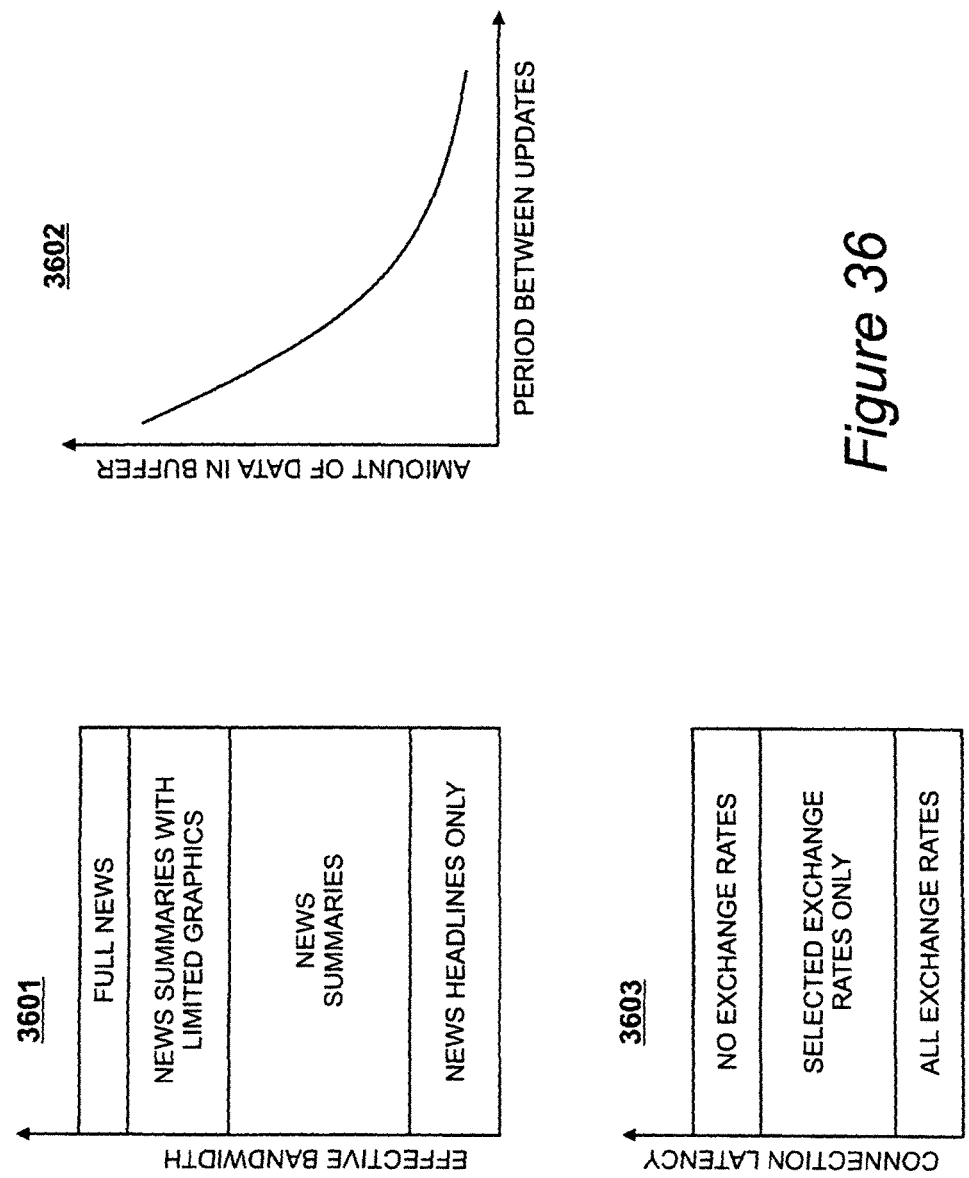
FIG. 36 illustrates examples of providing varying levels of service dependent upon network conditions.

FIG. 36 thus illustrates different ways in which the level of service can be changed. Graph 3601 shows how a news application supplies different information dependent upon the effective bandwidth measurement supplied. When the effective bandwidth is low, then only news headlines are supplied. More effective bandwidth allows news summaries to be supplied, while even more allows limited graphics. When the effective bandwidth is very high, the full stories are sent. This is an example of how the level of service sets the type of data sent.

Graph 3602 shows how a stock prices application could increase the interval between sending messages as the amount of data in the buffers increases. The application can then supersede data that is waiting to be sent with a newer update to the same data, and amalgamate messages if necessary. This is an example of how the level of service sets the amount of data sent.

Graph 3603 shows how an exchange rate application could stop sending updates altogether if the connection latency is too high, send only some exchange rates if the connection latency is about normal, and send all the rates that the user is interested in if the latency gets very low. This could be valuable if the user has indicated that he does not want to trade on, and is therefore not interested in, certain exchange rates if the latency is known to be above a certain threshold. This is an example of how the amount and type of data sent could be set by the level of service.

These graphs are only examples of ways in which network condition indicators could be used to vary the level of service. The exact way in which the level of service varies depends upon the application requirements of the user, the particular type of application, the data that the application supplies, and so on. Also, although these graphs indicate thresholds and linear correlations, the network conditions could be used so that an increase or decrease in a value triggers an increase or decrease in level of service, such that a particular value does not necessarily indicate a particular level of service. The values of two or more network condition indicators could be combined to indicate whether the level of service should increase or decrease. Additionally, the application manager 3303 could make the necessity to consider network conditions more binding on some applications than others.

Thus MTP provides an additional advantage over other protocols. Because of its management of transmission rate, as described with reference to FIG. 29, networks with high bandwidth and low latency are used just as effectively as those with low bandwidth and high latency, but if network conditions are better then more information is sent. Thus if, for example, the user of PDA 511 moves into transmission range of WiFi gateway 118 and the PDA detects this and starts using WiFi instead of a telecoms network, not only does the session maintenance described with reference to FIG. 30 enable the session to be continued seamlessly over the higher capacity network, but the user may immediately perceive a higher level of service, depending upon the application being used. Thus the protocol makes the best possible use of low bandwidth and high latency connections, but also provides high bandwidth, low latency users with a high level of service and perceived functionality.

FIG. 37

Figure 37:
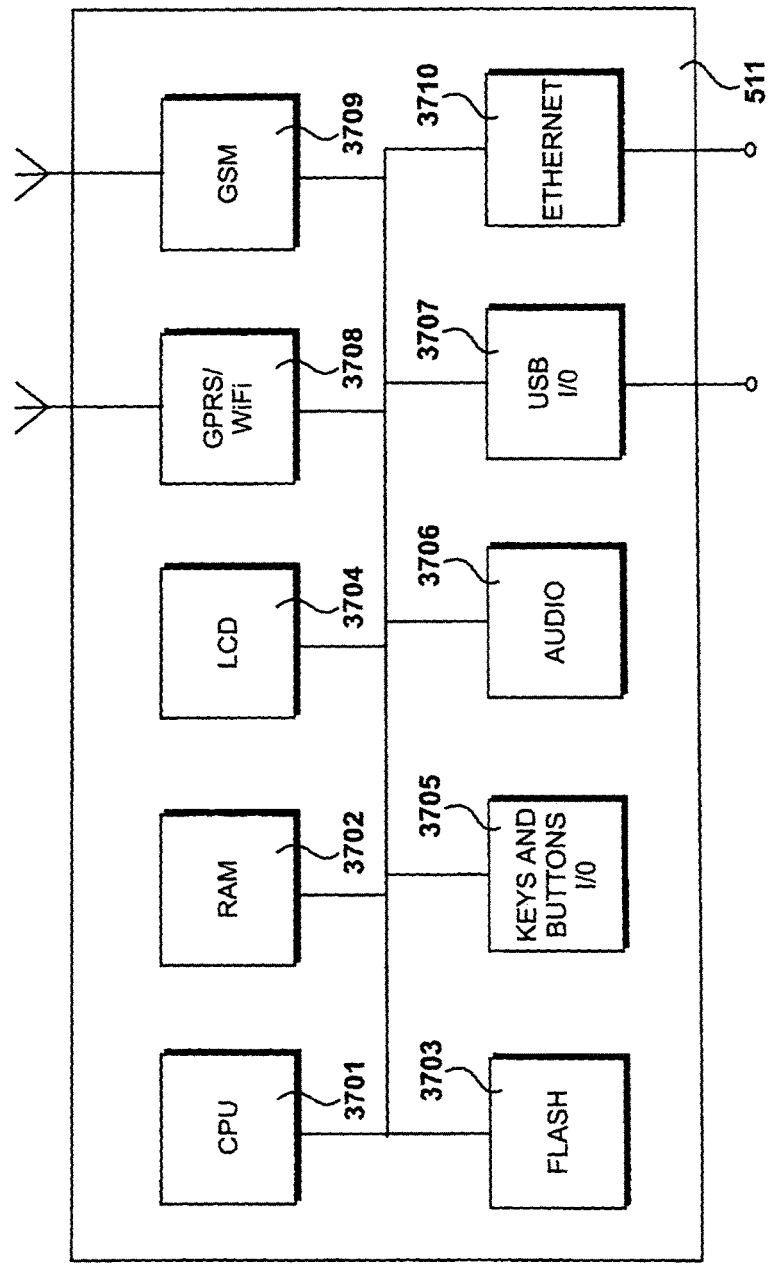
FIG. 37 details a PDA shown in FIG. 5.

FIG. 37 details PDA 511. As described above, this is an example of a terminal that could be used in a system embodying the invention. It includes a CPU 3701 with a clock speed of 370 megahertz (MHz) with memory 3702 being provided by 64 megabytes (MB) of RAM. 256 MB of non-volatile FLASH memory 3703 is provided for program and data storage. Liquid crystal display 3704 is used to display information to the user. Input/output 3705 processes the input of the keys and buttons 513 while audio input/output 3706 provides a microphone and speaker interface for use with the telephone facility. Universal Serial Bus (USB) input/output 3707 is used to connect PDA 511 to another computer, or to the Internet 110 via a wired connection. GPRS/WFi connection 3708 and GSM connection 3709 enable PDA 511 to connect to wireless networks, while Ethernet card 3710 enables PDA 511 to connect to a wired network, for example via a docking station on a computer.

FIG. 38

Figure 38:
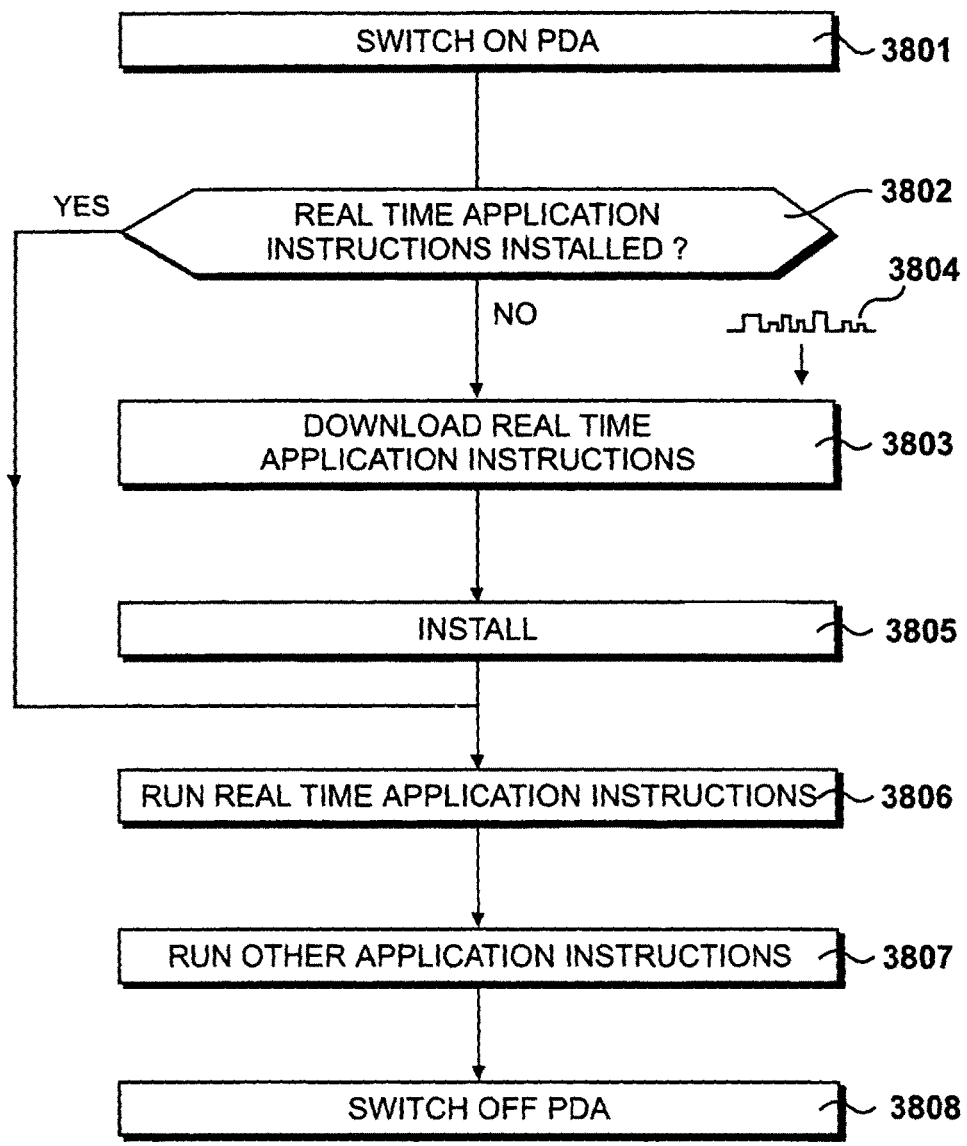
FIG. 38 shows steps carried out by the PDA shown in FIG. 37.

FIG. 38 details steps carried out by PDA 511. At step 3801 PDA 511 is switched on and at step 3802 a question is asked as to whether the real time application instructions are already installed. If this question is answered in the negative then at step 3803 the instructions are downloaded from a network 3804. The instructions are then installed at step 3805.

At this point, or if the question asked at step 3802 is answered in the negative, the instructions are executed at step 3806. Instructions for other applications on PDA 511 are executed at step 3807. At step 3808 the PDA is switched off.

FIG. 39

Figure 39:
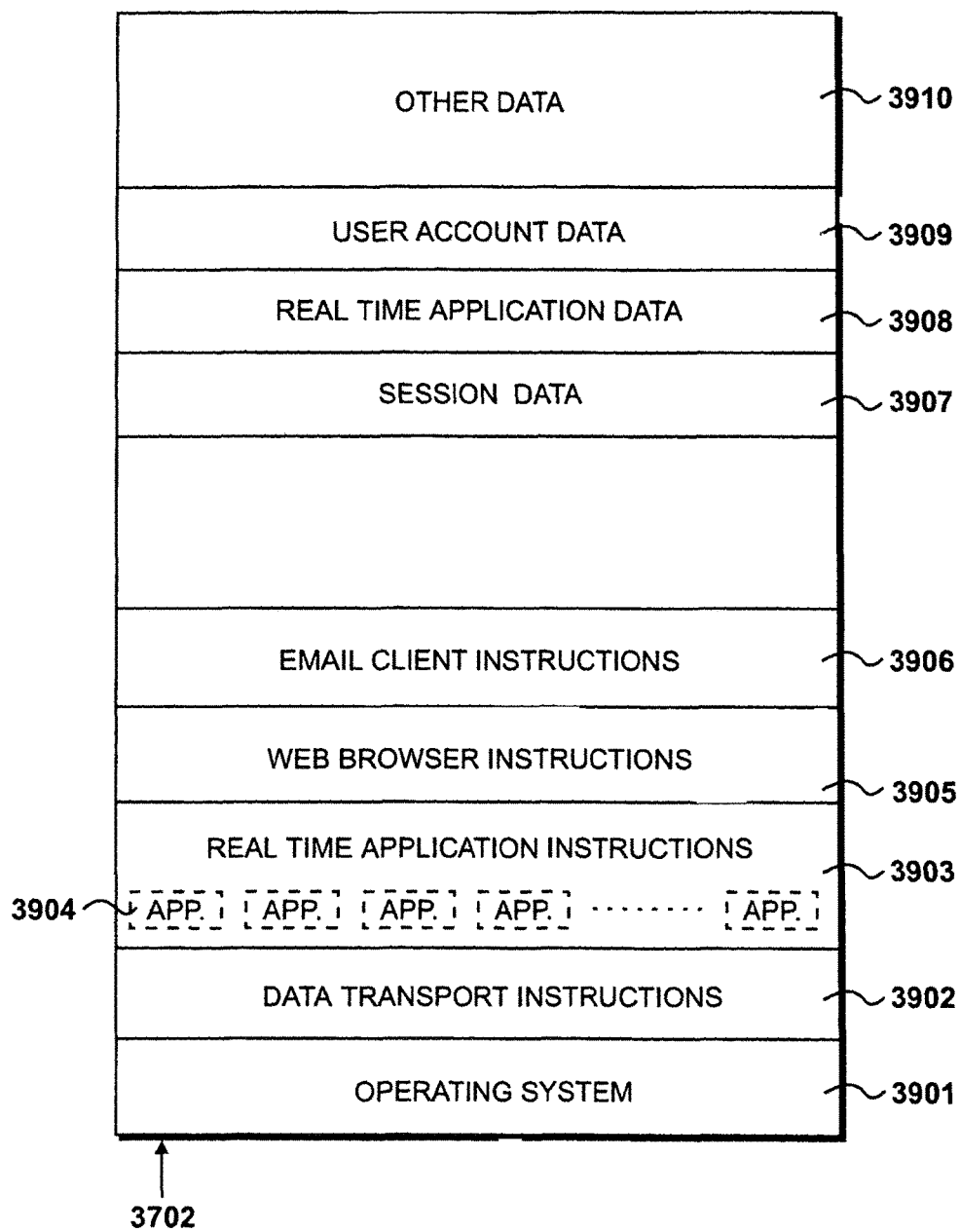
FIG. 39 details the contents of memory shown in FIG. 38.

FIG. 39 details the contents of memory 3702 during step 3806. An operating system 3901 provides operating system instructions for common system tasks and device abstraction. The Windows™ CE™ operating system is used, but a different PDA-suitable operating system could be used. Data transport instructions 3902, substantially like those described for the real time data server 502 except that there is only a single session, include MTP instructions. Real time application instructions 3903 include individual real time applications such as financial data application 3904. Application 3904 takes information provided via datagrams into a message queue and displays it on display 3704 according to its interface and user setups. For example, it may provide stocks prices in a grid with news headlines scrolling along the bottom.

Web browser instructions 3905 and email client instructions 3905 are provided. These applications could also use MTP to communicate via the real time application provider 101. RTDP 101 can forward information from and to a third party using TCP and from and to a terminal using MTP. This emphasises that the protocol described herein for providing real time data could be used for communication of many types.

Session data includes segment buffers, priority buffer and state variables as shown for session data 804 in FIG. 9. Real time application data 3908 is data used by the application instructions 3903 and user account data 3909 comprises the user's password, name, billing details and so on. Other data includes data used by the operating system and other applications.

FIG. 40

Figure 40:
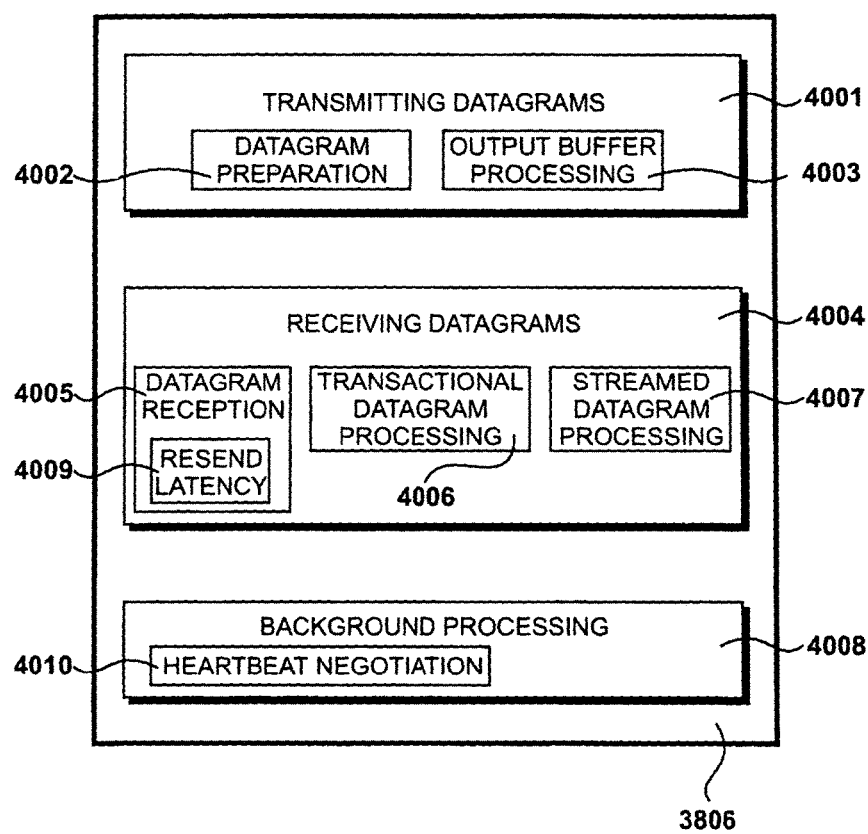
FIG. 40 details steps carried out during FIG. 38 to execute real time application instructions.

Since MTP is a substantially symmetrical protocol there is no need to describe in detail much of the real time application instructions executed at step 3806. Datagrams are produced, transmitted and received in substantially the same way as the processes described with reference to FIG. 10. Thus, as shown in FIG. 40, step 3806 where the client runs the application instructions comprises the following processes running substantially in parallel. Process 4001 transmits datagrams from the client 511 to the real time data server 502. It comprises two separate processes: datagram preparation 4002 and output buffer processing 4003. Processes 4002 and 4003 are substantially identical to processes 1002 and 1003 respectively.

Process 4004 receives datagrams from the real time data server 502 and comprises three separate processes: datagram reception 4005, transactional datagram processing 4006 and streamed datagram processing 4007. These processes are substantially identical to processes 1005, 1006 and 1007 respectively.

Process 4008 performs background processing. This is similar to process 1008, except that process 4008 has no step corresponding to step 2707, at which the real time data server 502 informs the application server 501 of the network conditions. The only substantial difference between the client and the server is that the client does not perform a process corresponding to session maintenance 1009.

An additional difference is that, in general, a session will be requested and terminated by the user of PDA 511.

Datagram reception process 4005 includes step 4009, at which a resend latency value is calculated, and background processing 4008 includes step 4010, at which a heartbeat rate is negotiated. These steps correspond to steps 1909 and 2702 respectively. Although the facility for these steps exists on both the real time data server 502 and PDA 511, in practice, in this embodiment, it is only PDA 511 that uses them. They are thus described in FIG. 41 and FIG. 42 respectively.

FIG. 41

FIG. 41 illustrates resend latency measurement. This is the delay caused by having to resend a datagram, as opposed to the connection latency which is the delay caused by the network. Packets sent across the Internet 110 are not guaranteed to arrive, which is why an additional protocol like MTP must be used to ensure eventual delivery. When an MTP datagram gets "lost", meaning that it is not acknowledged, it will be resent. The data it contains, therefore, is more out-of-date than it would have been had it arrived first time. This resend latency is calculated at step 4009.

In FIG. 41 the original datagram 4101 is transmitted and fails to be delivered. After a time, either through a lack of acknowledgement or a negative acknowledge, the real time data server 502 will resend the datagram. The resent datagram 4102 is also lost. A third attempt 4103 is successful.

Each datagram contains an elapsed time field 4104. In datagram 4101 this is set to zero. In datagram 4102 it is the difference between the transmission time of datagram 4102 and the transmission time of datagram 4101; similarly for datagram 4103. Thus, for example, the elapsed time field for datagram 4103 is 421 milliseconds.

When a resent datagram is received the resend latency is recalculated using a smoothing filter on the elapsed time. If no datagrams are received at all then the resend latency is gradually increased. This occurs in this embodiment once a heartbeat period has passed with no receipt of datagrams. However, receipt of any datagram, including transactional datagrams and empty streamed datagrams, will at this point decrease the latency, since it implies that the reason for non-receipt of streamed data may be that there is no data to send, and thus the last received updates may still be current.

The resend latency is added to the connection latency to give the application latency. This is the actual time delay of the data displayed to the user on PDA 511. Thus the timeliness of the data, according to a function of the length of time taken to reach the client and the possible number of resends it required, is displayed to the user to allow him to make a decision regarding whether or not to use the data. Optionally, when the application latency falls below a certain threshold the screen may "grey out" and transactions may be suspended.

FIG. 42

Figure 42:
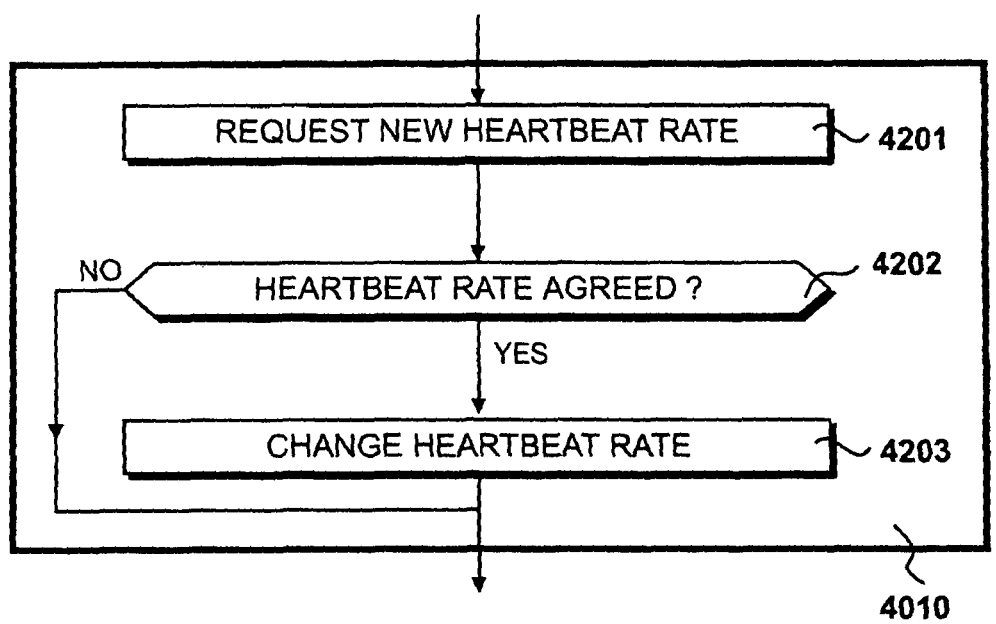
FIG. 42 details steps carried out during FIG. 40 to negotiate a heartbeat rate.

FIG. 42 details step 4010, at which the PDA 511 negotiates a new heartbeat rate with real time data server 502. The heartbeat rate is the maximum interval that is allowed to pass without sending data, both by the server and by the client. If no data has been sent at the end of this interval then an empty streamed datagram is sent. In this embodiment, this is combined with the connection latency measurement by sending the latency measurement datagram at intervals which are the same as the heartbeat rate. If the server does not receive any data from the client for an interval substantially equal to twice the heartbeat interval, then the session will stall. The client, however, does not stall a session on non-receipt of data, but continues to send data, or heartbeats if there is no data. A heartbeat is in this embodiment usually a latency-measurement datagram, but could be an empty datagram with the KAL field 1213 set.

Since latency measurements are sent at the heartbeat rate, the latency is more accurate when the heartbeat is faster. This means that when the user is, for example, trading, the heartbeat should be fast, whereas when he is browsing news stories the heartbeat should be slow. Thus the heartbeat negotiation is triggered by events that occur when the PDA 511 switches applications, minimises or maximises applications or enters a particular state in an application.

At step 4201 a new heartbeat rate is requested by sending a datagram that has SYN field 1202 set and a number in acknowledgement number field 1212, but does not have ACK field 1203 set. At step 4202 a question is asked as to whether the heartbeat rate has been agreed by receiving an acknowledgement of this datagram. If this question is answered in the negative then the heartbeat rate is not changed. Alternatively, if the heartbeat rate is agreed, the rate is changed at step 4203.

Associated with this is the possibility that the client may at any time change its application requirements. For example, on minimising of the display of stock prices the client may, using a transactional datagram, change its application requirements to stop the transmission of stock prices. On using the telephone, which requires as much bandwidth as possible, the client may change its application requirements to cease all transmission of streamed data. When the user returns to the display of stocks then the application requirements can be changed again to indicate that the default requirements apply. However, even when no streamed data is being sent, the client and server continue to send latency measurements at the agreed heartbeat rate. This indicates not only that the connection is still active but allows an immediate display of latency when the user returns to the display of streamed data.

What is claimed is:

1. A system, comprising:
   a first computing device coupled to a network, including:
      a processor; and
      a computer readable medium comprising instructions executable to implement a protocol module, the protocol module configured to:
         receive a first packet from a second computing device over the network, wherein the first packet is received using an unreliable protocol;
         determine that the first packet includes a request for control data;
         in response to the reception of the first packet, generate, at the computing device, a second packet including the control data; and
         send the second packet including the control data to the first computing device using the unreliable protocol in response to allow the first computing device to adjust the sending of data from the second computing device to the first computing device based on the control data sent in the second packet.

2. The system of claim 1, wherein the unreliable protocol is UDP.

3. The system of claim 2, wherein the control data comprises latency information.

4. The system of claim 3, wherein the latency information is an acknowledgment of reception of the first packet.

5. The system of claim 3, wherein generation of the second packet including the control data comprises modifying a header in the second packet.

6. The system of claim 5, wherein the second packet was the next packet in an output queue at the first computing device that was to be sent to the second computing device.

7. The system of claim 6, wherein adjusting the sending of the data to the first computing device comprises determining a data transmission rate corresponding to the first computing device based on a latency determined from the latency information and sending the data to the first computing device according to the data transmission rate.

8. A method, comprising:
   receiving, at a protocol module on a first computing device, a first packet from a second computing device over a network, wherein the first packet is received using an unreliable protocol;
   determining that the first packet includes a request for control data;
   in response to the reception of the first packet, generating, at the computing device, a second packet including the control data; and
   sending the second packet including the control data to the first computing device using the unreliable protocol in response to allow the first computing device to adjust the sending of data from the second computing device to the first computing device based on the control data sent in the second packet.

9. The method of claim 8, wherein the unreliable protocol is UDP.

10. The method of claim 9, wherein the control data comprises latency information.

11. The method of claim 10, wherein the latency information is an acknowledgment of reception of the first packet.

12. The method of claim 10, wherein generation of the second packet including the control data comprises modifying a header in the second packet.

13. The method of claim 12, wherein the second packet was the next packet in an output queue at the first computing device that was to be sent to the second computing device.

14. The method of claim 13, wherein adjusting the sending of the data to the first computing device comprises determining a data transmission rate corresponding to the first computing device based on a latency determined from the latency information and sending the data to the first computing device according to the data transmission rate.

15. A non-transitory computer readable medium, comprising instructions for:
   receiving, at a protocol module on a first computing device, a first packet from a second computing device over a network, wherein the first packet is received using an unreliable protocol;
   determining that the first packet includes a request for control data;
   in response to the reception of the first packet, generating, at the computing device, a second packet including the control data; and
   sending the second packet including the control data to the first computing device using the unreliable protocol in response to allow the first computing device to adjust the sending of data from the second computing device to the first computing device based on the control data sent in the second packet.

16. The non-transitory computer readable medium of claim 15, wherein the unreliable protocol is UDP.

17. The non-transitory computer readable medium of claim 16, wherein the control data comprises latency information.

18. The non-transitory computer readable medium of claim 17, wherein the latency information is an acknowledgment of reception of the first packet.

19. The non-transitory computer readable medium of claim 17, wherein generation of the second packet including the control data comprises modifying a header in the second packet.

20. The non-transitory computer readable medium of claim 19, wherein the second packet was the next packet in an output queue at the first computing device that was to be sent to the second computing device.

21. The non-transitory computer readable medium of claim 20, wherein adjusting the sending of the data to the first computing device comprises determining a data transmission rate corresponding to the first computing device based on a latency determined from the latency information and sending the data to the first computing device according to the data transmission rate.

* * * * *